(12) United States Patent
van Veggel et al.

(10) Patent No.: US 7,550,201 B2
(45) Date of Patent: Jun. 23, 2009

(54) LANTHANIDE (III)—DOPED NANOPARTICLES AND THEIR APPLICATIONS

(75) Inventors: Franciscus Cornelis Jacobus Maria van Veggel, Victoria (CA); Jan Willem Stouwdam, Victoria (CA)

(73) Assignee: University of Victoria Innovation and Development Corporation, Victoria, British Columbia (CA)

( * ) Notice: Subject to any disclaimer, the term of this patent is extended or adjusted under 35 U.S.C. 154(b) by 0 days.

(21) Appl. No.: 10/550,573

(22) PCT Filed: Mar. 24, 2004

(86) PCT No.: PCT/CA2004/000447

§ 371 (c)(1),
(2), (4) Date: Jun. 11, 2007

(87) PCT Pub. No.: WO2004/085571

PCT Pub. Date: Oct. 7, 2004

(65) Prior Publication Data

US 2007/0274664 A1    Nov. 29, 2007

Related U.S. Application Data

(60) Provisional application No. 60/457,226, filed on Mar. 24, 2003.

(51) Int. Cl.
*B32B 5/66*  (2006.01)

(52) U.S. Cl. .................. 428/403; 428/404; 428/405; 428/407; 427/212

(58) Field of Classification Search ............... 428/403, 428/404, 405, 407; 427/212
See application file for complete search history.

(56) References Cited

U.S. PATENT DOCUMENTS

| 5,581,398 A | 12/1996 | van Veggel et al. |
| 5,657,156 A | 8/1997 | van Veggel et al. |
| 6,180,029 B1 * | 1/2001 | Hampden-Smith et al. ....... 252/301.4 R |
| 2003/0032192 A1 | 2/2003 | Haubold et al. |

OTHER PUBLICATIONS

"Written Opinion of the International Searching Authority," from International Application No. PCT/CA2004/000447, filed Mar. 24, 2004, 6 pages. Date of mailing Jul. 26, 2004.

"International Search Report," from International Application No. PCT/CA2004/000447, filed Mar. 24, 2004. 3 pages. Date of mailing Jul. 26, 2004.

* cited by examiner

*Primary Examiner*—Leszek Kiliman
(74) *Attorney, Agent, or Firm*—Klarquist Sparkman, LLP

(57) ABSTRACT

A photonic material comprising a core and an envelope is provided for use in telecommunications, diagnostics, imaging and other applications. In its simplest form, the core comprises at least one nanoparticle. The nanoparticle comprises an inorganic material and at least one luminescent ion, wherein the inorganic material is suitably selected to bind the luminescent ion. The envelope comprises a suitably selected organic stabilizing layer that overlays the core. The core and envelope may have a shell located between them.

44 Claims, 42 Drawing Sheets

LANTHANIDE (III)—DOPED NANOPARTICLES AND THEIR APPLICATIONS

CROSS REFERENCE TO RELATED APPLICATIONS

This is the U.S. National Stage of International Application No. PCT/CA2004/000447, filed Mar. 24, 2004, which was published in English under PCT Article 21(2), which in turn claims the benefit of U.S. Provisional Application No. 60/457,226, filed March 24. 2003. Both applications are incorporated herein in their entirety.

FIELD OF THE INVENTION

The present invention relates to lanthanide-doped nanoparticles, their synthesis and use thereof. More specifically, the invention relates to lanthanide-doped nanoparticles having superior optical properties, including reduced quenching, effective excitation and a broad bandwidth.

BACKGROUND OF THE INVENTION

Lanthanide ions are widely used as the active luminescent material in optical amplifiers and lasers. The major advantages of the lanthanide ions are the long luminescence lifetime and the high quantum efficiency that can be achieved at the major telecommunication wavelengths of 1300 and 1530 nm. The ions are extremely stable under laser action because the optical transitions involve electronic transitions within the ion itself. No chemical bonds are involved so degradation does not occur. The long luminescence lifetime of the lanthanide ions makes laser action relatively easy to achieve with cheap pump sources.

The luminescence of the ions is widely utilized when integrated into inorganic materials, like crystals or glasses. These materials are often fabricated at high temperatures using high-cost materials. For optical glass fiber technology the high costs of integration of the optical components can even exceed the fabrication costs of the components itself. This has disadvantages especially in short range telecommunication where the optical signals have to be processed in a number of optical components.

To be efficient, optical amplifiers and lasers require complex optical signals that cover a broad wavelength range. In order to achieve this, a large number of optical components are needed. For example, the $Er^{3+}$-doped fiber amplifier (EDFA) is the most used amplifier, because the optical transition of the $Er^{3+}$ ion at 1530 nm coincides with the minimum loss window of optical glass fibers. However, there is a low-loss window. To cover the low-loss window, other lanthanide ions also attract a lot of attention, like $Pr^{3+}$ and $Nd^{3+}$ for amplification around 1300 nm and $Tm^{3+}$ for amplification around 1450 nm. Such complexity of optical componentry causes glass fibre technology to be expensive.

The prior art has shown that planar waveguide structures have significant advantages in this technology. They could for instance profit from current lithography and thus be potentially low cost. In addition, planar structure are potentially easy to integrate with other optical components. A disadvantage in the (polymer-based) integrated wavelength structure is that they have relatively high optical losses. This disadvantage could in principle be overcome by integration of an optical amplifiers to compensate for the optical losses occurring during the manipulation of the data signals.

Polymers are materials that attract a lot of attention for the use in planar waveguides, because of the low cost processing and flexibility these polymers offer in the processing. The prior art L. H. Slooff, A. van Blaaderen, A. Polman, G. A. Hebbink, S. I. Klink, F. C. J. M. van Veggel, D. N. Reinhoudt; Rare-earth Doped Polymers for Planar Optical Amplifiers *J. Appl. Phys.* 2002, 91, 3955-3980 incorporated herein by reference) has shown the utility of lanthanide doped organic polymers. Polymers have the advantage that they can be processed at low temperatures.

A further advantage of polymers is that using standard techniques it is relatively easy to make different structures. This makes it possible to integrate a wide variety of optical components like splitters, couplers, multiplexers, and amplifiers. Hence polymers can lower the cost of optical systems. The prior art has shown that organic polymers have a clear potential as low-cost devices, but (intrinsic and extrinsic) optical losses are still relatively high.

Most recently, doped semiconductor nanoparticles have been developed. For example, U.S. Patent Publication No. 20030030067 discloses some $Mn^{2+}$ doped semiconductor nanoparticles. In the application the doped semiconductor nanoparticles are contemplated for us in upconversion luminescence ("UCL") materials and methods of making and using same. In the application, any dopant capable of increasing the fluorescence intensity or quantum efficiency of the bulk material or nanoparticle is contemplated for use. With respect to semiconductor nanoparticles, such as ZnS, a dopant capable of increasing fluorescence intensity or quantum efficiency due to the increase of the oscillator strength and the efficient energy transfer from the host to the dopant upon photoexcitation is contemplated. Typically, the dopant will have a high d-d transition rate—e.g. $Mn^{2+}$ has a d-d transition of $^4T_1 \rightarrow {}^6A_1$. Any dopant having a high d-d transition rate and that is also capable of increasing the luminescence intensity or quantum efficiency of the UCL material is contemplated for use. Hence, the dopants could be broadly classified as rare earth ions—e.g. $Tb^{3+}$, $Ce^{3+}$ or $Eu^{3+}$. The success of these doping procedures has been under discussion. In most of the papers direct prove of the energy transfer of the semi-conductor host to the lanthanide ion is not proven, because an excitation spectrum of the lanthanide ion is missing. O. E. Raola, G. F. Strouse Nano Lett. 2002, 2, 1443., incorporated herein by reference, reported the doping of $Eu^{3+}$ ions in CdSe nanoparticles, starting with $Eu^{2+}$, but no luminescence studies were performed to see if energy transfer from the nanoparticle host to the lanthanide ion takes place. Difficulties in doping most likely arise from the large difference in size between the host cation and the lanthanide ion, the charge mismatch between the cations, and the low affinity of lanthanide ions towards sulfur and selenium.

Problems arise when lanthanide ions are used as the active material in polymer-based optical amplifiers. The luminescence of lanthanide ions, especially the ions emitting at the wavelengths that are of interest for telecommunication, is quenched significantly due to the presence of the organic bonds of the polymer. To increase the luminescence of the lanthanide ions the ion has to be shielded from the polymer environment and one way to do this is by the synthesis of organic complexes, in which an organic ligand is coordinated to the lanthanide ion. Reducing the amount of organic bonds in close proximity to the lanthanide ion has improved the luminescence a little bit, but still quenching is a major constraint to the approach.

It is an object of the present invention to overcome the deficiencies of the prior art.

SUMMARY OF THE INVENTION

The present invention provides photonic materials for use in telecommunications, diagnostics, imaging and lighting, in addition to methods of production of the photonic materials.

A photonic material of the present invention is comprised of a core and an envelope. The core comprises at least one nanoparticle and the nanoparticle comprises an inorganic material and at least one luminescent ion. The inorganic material is suitably selected to bind the luminescent ion. The envelope comprises a suitably selected organic stabilizing layer overlying the core.

In one aspect of the invention, organic stabilizing layer is suitably selected for reducing quenching.

In another aspect of the invention, the organic stabilizing layer comprises a functional group-presenting material and at least one functional group.

In yet another aspect of the invention, the functional group binds an at least one luminescent ion.

In yet a further aspect of the invention, the luminescent ion is a lanthanide ion.

In another aspect of the invention, the functional group-presenting material comprises at least one ligand.

In yet another aspect of the invention, the ligand is selected to be suitable for ligand exchange reactions.

In another aspect of the invention, the functional group-presenting material is a polymer.

In another aspect of the invention the organic stabilizing layer is self-assembled.

In another aspect of the invention the organic stabilizing layer further comprises one of hole conductors, electron conductors or a suitably selected combination of hole conductors and electron conductors.

In another aspect of the invention the hole conductors comprise heterocyclic compounds.

In another aspect of the invention the heterocyclic compounds are aromatic amines.

In another aspect of the invention the electron conductors are aromatic or heterocyclic compounds with suitably selected reduction potentials.

In another aspect of the invention the aromatic or heterocyclic compounds are one of oxadiazoles, 1,2,4-triazoles, 1,3,5-triazines, quinoxalines, oligo- and polythiophenes and oligo- and polypyrroles.

In another aspect of the invention the envelope is suitably selected for preparing a sol-gel derived material.

In another aspect of the invention the envelope is suitably selected for solubility in an aqueous environment.

In another aspect of the invention the envelope is suitably selected to permit modification of the functional groups.

In another aspect of the invention the at least one luminescent ion is a lanthanide ion.

In another aspect of the invention the lanthanide ion is selected from the group consisting of Ce, Pr, Nd, Sm, Eu, Gd, Tb, Dy, Ho, Er, Tm and Yb.

In another aspect of the invention the lanthanide ion is selected from the group consisting of Ce, Pr, Nd, Sm, Eu, Gd, Tb, Dy, Ho, Er, Tm, Yb and combinations thereof such that the photonic material emits in the UV-Vis wavelength range.

In another aspect of the invention the lanthanide ions are selected from the group consisting of Ce, Pr, Nd, Sm, Eu, Gd, Tb, Dy, Ho, Er, Tm, Yb and combinations thereof, such that the photonic material emits in the (near-)infrared wavelength range.

In another aspect of the invention the inorganic material is a semiconductor or an insulator, suitably selected to promote sensitized emissions.

In another aspect of the invention the inorganic material is a semiconductor.

In another aspect of the invention the semiconductor is selected from the group consisting of $Al_2S_3$, $Ga_2O_3$, $In_2O_3$, InP, GaAs, InAs, $Ga_2X_3$ (X=S, Se, Te), $In_2X_3$ (X=S, Se, Te), $Ln_2X_3$ (Ln=lanthanide and X=S, Se, Te), $TiO_2$ and suitably selected alloys thereof.

In another aspect of the invention the semiconductor is $Al_2S_3$ and the luminescent ion is Eu.

In another aspect of the invention the inorganic material is an insulator.

In another aspect of the invention the insulator is selected from the group consisting of $LaPO_4$, $GdPO_4$, $YbPO_4$, $LuPO_4$ and $LaF_3$, $LaVO_4$, YVO4. $LnPO_4$ (Ln=lanthanide or Y), $LnVO_4$ (Ln=lanthanide or Y), $LnX_3$ (Ln=lanthanide and X=Cl, Br, I).

In another aspect of the invention the insulator is $LaF_3$.

In another embodiment of the invention, a suitably selected inorganic shell is provided. The inorganic shell is located between the core and the envelop.

In another aspect of the invention the shell comprises a suitably selected semi-conductor.

In another aspect of the invention the shell comprises a semi-conductor selected from the group consisting of $Al_2S_3$, $Ga_2O_3$, $In_2O_3$, InP, GaAs, InAs, $Ga_2X_3$ (X=S, Se, Te), $In_2X_3$ (X=S, Se, Te), $Ln_2X_3$ (Ln=lanthanide and X=S, Se, Te), $TiO_2$.

In another aspect of the invention the shell comprises an insulator.

In another aspect of the invention the insulator comprises $LnX_3$, wherein X is a halide.

In another aspect of the invention the insulator is $LaPO_4$.

In another aspect of the invention the insulator is $LaF_3$.

In another aspect of the invention the insulator is selected from the group consisting of $GdPO_4$, $LuPO_4$, and $YPO_4$.

In another aspect of the invention the shell further comprises at least one luminescent ion.

In another aspect of the invention the at least one luminescent ion is a lanthanide ion.

In another aspect of the invention the lanthanide ion is selected from the group consisting of Ce, Pr, Nd, Sm, Eu, Gd, Tb, Dy, Ho, Er, Tm and Yb.

In another aspect of the invention the lanthanide ion is selected from the group consisting of Ce, Pr, Nd, Sm, Eu, Gd, Tb, Dy, Ho, Er, Tm, Yb and combinations thereof such that the photonic material emits in the UV-Vis wavelength range.

In another aspect of the invention herein the lanthanide ions are selected from the group consisting of of Ce, Pr, Nd, Sm, Eu, Gd, Tb, Dy, Ho, Er, Tm, Yb and combinations thereof, such that the photonic material emits in the (near-) infrared wavelength range.

In another embodiment of the invention, a method of preparing a photonic material is provided comprising selecting a suitable inorganic material and a suitably luminescent ion, preparing an at least one nanoparticle therefrom to provide a core, and enveloping the core with a suitably selected organic material to provide an envelope.

In another aspect of the invention the method further comprises selecting the organic stabilizing layer to reduce quenching.

In another aspect of the invention, the organic stabilizing layer comprises a functional group-presenting material and at least one functional group and the functional groups are exchanged.

In another aspect of the invention the method further comprises selecting a suitable inorganic material to provide a shell, covering the core with the shell and enveloping the shell with the envelope.

DESCRIPTION OF THE INVENTION

Definitions

Figure 1:
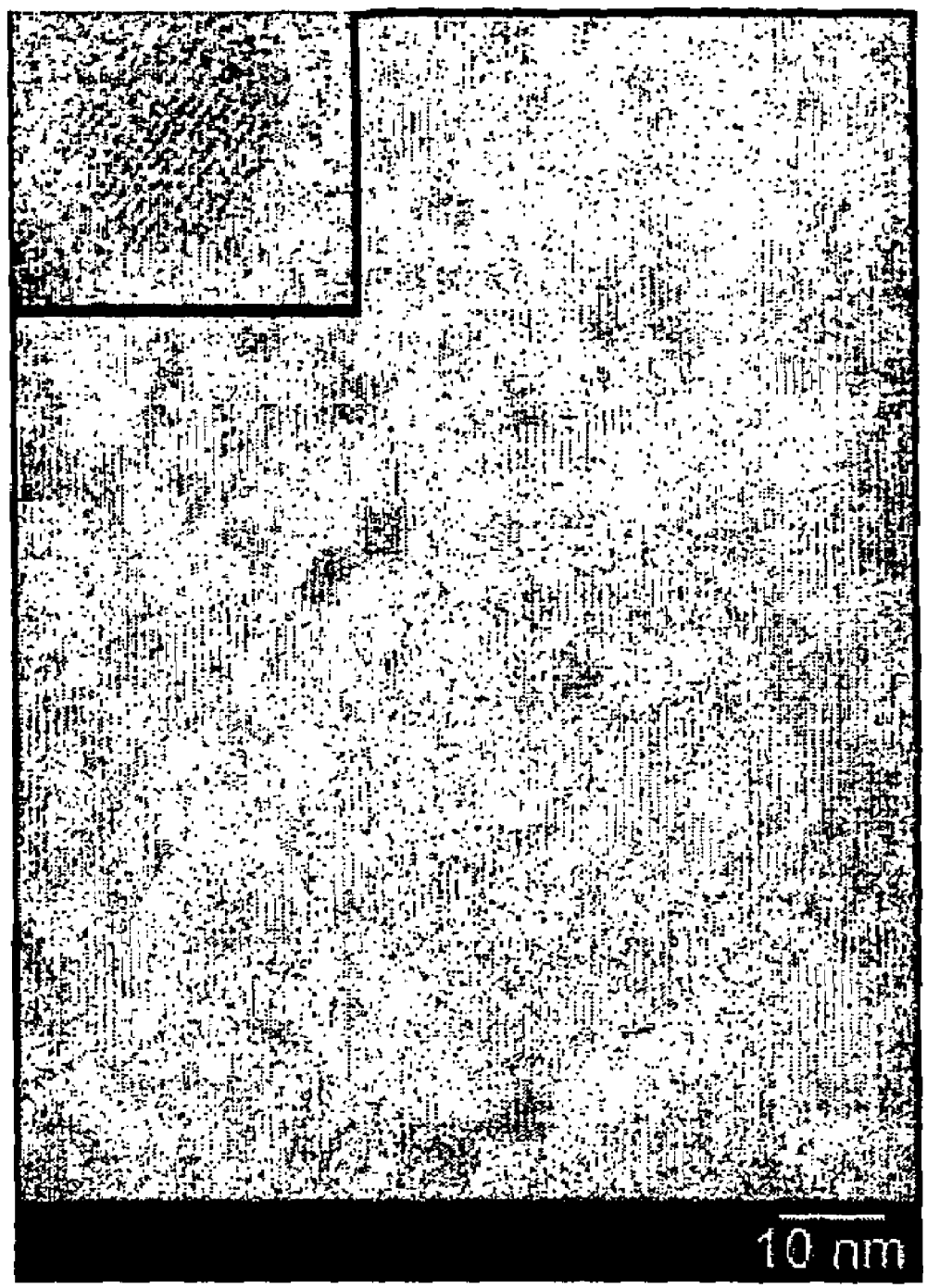
FIG. 1: TEM picture of $TiO_2$:Eu nanoparticles in accordance with an embodiment of the invention, obtained by heating the reaction mixture for 30 min. The inset shows a magnification of a single nanoparticle with lattice fringes.

The term "nanoparticles" as used herein, can also refer to nanoclusters, clusters, particles, dots, quantum dots, small particles, and nanostructured materials.

When the term "nanoparticle" is used, one of ordinary skill in the art will appreciate that this term encompasses all materials with small size and often associated with quantum size effects, generally the size is less than 100 nm. As a new type of materials, nanoparticles are luminescent with high quantum efficiency and are good candidates for upconverters, ELDs and optical amplifiers. It is known that oscillator strength is a very important optical parameter that determines the absorption cross-section, recombination rate, luminescence efficiency, and the radiactive lifetime in materials. The oscillator strength of the free exciton is described by 1 fex=2 m E ||2|U(0)|2 where m is the electron mass, .DELTA.E is the transition energy, .mu. is the transition dipole moment, and .vertline.U(0).vertline..sup.2 represents the probability of finding the electron and hole at the same site (the overlap factor). In nanostructured materials, the electron-hole overlap factor increases largely due to the quantum size confinement, thus yielding an increase in the oscillator strength. The oscillator strength is also related to the electron-hole exchange interaction that plays a key role in determining the exciton recombination rate. In bulk semiconductors, due to the extreme dislocation of the electron or hole, the electron-hole exchange interaction term is very small; while in molecular-size nanoparticles, due to the confinement, the exchange term should be very large.

General Methods. The spectra of Eu$^{3+}$ were measured at a resolution of 1.8 nm and the spectra in the near-infrared were measured at a resolution of 16.2 nm for Er$^{3+}$ and 8.1 nm for Nd$^{3+}$ and Yb$^{3+}$. The quantum yield of the TiO2:Eu nanoparticles was determined by comparing the emission intensity with the emission intensity of a solution of ruthenium tris bipyridine with the same optical density at the excitation wavelength ($\lambda_{ex}$ 310 nm). The quantum yield of ruthenium tris bipyridine in deoxygenated water is 4.2%. For the electroluminescence measurements the same instrument as for the photo-physical measurements was used.

Nanoparticle synthesis. Nanoparticles of lanthanide-doped TiO$_2$ were prepared by adopting a literature procedure from Jones, A. C.; Leedham, T. J.; Wright, P. J.; Crosbie, M. J.; Fleeting, K. A.; Otway, D. J.; O'Brien, P.; Pemble, M. E. *J. Mater. Chem.* 1998, 8, 1773, all incorporated herein by reference. TiO$_2$ particles were formed by the thermal decompositon of Ti(OPr$^i$)$_3$(dmae) (dmae=dimethylaminoethoxide) in hot trioctylphoshine oxide (TOPO). The titanium precursor was synthesized as follows: lanthanide-doped nanoparticles were prepared by dissolving 11 mg of EuCl$_3$.6H$_2$O in 5 mL of methanol followed by the addition of 3.5 g of TOPO and evaporation of the methanol and water in vacuo. The resulting solution was heated to 315° C. under a nitrogen atmosphere and 200 µl of the titanium precursor was injected, followed by further heating at 300° C. for 10-240 min. The reaction mixture was cooled to 60° C. and the nanoparticles were precipitated by the addition of methanol. The product was separated by centrifugation and further purified by washing with methanol. The resulting lanthanide-doped particles are dispersable in apolar solvents like toluene, dichloromethane, and chloroform, to form optically clear solutions.

LED fabrication. LEDs with TiO$_2$:Eu nanoparticles were prepared on ITO cover glass plates. The ITO layer was first cleaned by sonication in water and ethanol, followed by a treatment in an oxygen plasma for 5 min. On top of the ITO a 80 nm thick layer of PEDOT (Aldrich) was spin-coated at 4000 rpm. The layer was dried over P$_2$O$_5$ in vacuum at 80° C. for 2 days. On top of this layer a 1% solution of TiO2/PMMA 3/1 in chloroform was spincoated at 1500 rpm to form a 100 nm thick layer. This layer was also dried over P$_2$O$_5$ in vacuum at 80° C. for 1 day. The devices were then transferred to a glove box with a dry nitrogen atmosphere and on top of the layers a drop of InGa eutectic was placed. On the drop of InGa eutectic a copper contact wire was placed and the device was protected from the atmosphere by a layer of epoxy glue. The glue was cured at 80° C. for 2 hours.

LaF$_3$ nanoparticle synthesis. All chemicals were used as received without further purification. The lanthanide salts were purchased from Aldrich or Acros in the highest purity available (at least 99.9%). Octadecanol (99%), sodium fluoride (99%), and tris(ethylhexyl)phosphate (98%) were purchased from Fluka, phosphorous pentasulfide (99%) from Aldrich and trioctylamine (98%) from Acros. Oleic acid and octadecanol were purchased from Fluka. Phosphorus oxychloride was purchased from Acros. THF was freshly distilled from Na/benzophenon. $^1$H NMR measurements on nanoparticles were performed on undoped nanoparticles to exclude the influence of the magnetic moment of some of the luminescent lanthanide ions.

LaPO$_4$ particles were synthesized using a literature procedure (Riwotzki, Meyssamy, Komowski and Haase J. Phys Chem, 104, 2824 incorporated herein by reference). Briefly, 1 mmol of the hydrated LnCl$_3$ (Ln=La$^{3+}$, Eu$^{3+}$, Nd$^{3+}$, Er$^{3+}$ or Pr$^{3+}$) is first dissolved in 10 ml of methanol followed by the addition of 6 ml tris(ethylhexyl)phosphate and evaporation of the methanol under vacuum. The solution is heated to 70° C. under vacuum to remove water. A solution of 1 mmol orthophosphoric acid and 3 mmol trioctylamine in 3 ml of tris (ethylhexyl)phosphate was added and the reaction mixture was heated at 200° C. under argon. After 40 hours the solution was cooled to room temperature and methanol was added to precipitate the nanoparticles. The particles were separated by centrifugation and washed two times with methanol. The particles were soluble in methanol by the addition of tetramethylammonium hydroxide. The particles could be precipitated by the addition of ethyl acetate and separated by centrifugation. Particles obtained in this way were surface coated with tetramethylammonium groups and some of the bis(ethylhexyl)phosphate chains.

The ligand ammonium dioctadecyldithiophosphate used in the synthesis of the LaF$_3$ particles was prepared by heating P$_2$S$_5$ (0.02 mol) and octadecanol (0.07 mol) at 75° C. for 3 hours. The resulting suspension was cooled to room temperature followed by the addition of dichloromethane and filtration. The solvent was evaporated and the residue taken up in hexane and ammonia was bubbled through this solution. The resulting precipitate was separated by filtration, washed with hexane and dried. $^1$H NMR (DMSO d$_6$): δ 7.2-6.9 (broad, 4H), δ 3.7 (dt, J=8.1, 6.6 Hz, 4H), δ 1.5-1.4 (m, 4H), δ 1.35-1.1 (m, 60H), δ 0.84 (t, J=6.2 Hz, 6H); MS (MALDI-TOF) m/z=634.0 [(M-NH$_4^+$)$^-$, calcd. for C$_{36}$H$_{74}$O$_2$PS$_2$: 633.5]; Anal calcd. for C$_{36}$H$_{78}$NO$_2$PS$_2$: C, 66.31, H, 12.06, N, 2.15, S, 9.83. Found C, 66.50, H, 12.24, N, 2.27, S, 9.56.

The LaF$_3$ nanoparticles were prepared by heating a solution of 614 mg (0.95 mmol) ammonium di-n-octadecyldithiophoshate and 126 mg (1 mmol) NaF in 35 ml ethanol/water at 75° C. A solution of La(NO$_3$)$_3$.6H$_2$O and Eu(NO$_3$)$_3$.6H$_2$O (1.33 mmol total) in 2 ml of water was added dropwise and the solution was stirred at 75° C. for 2 hours and then cooled to room temperature. The precipitate was separated by centrifugation and was washed subsequently with water and ethanol. The particles were further purified by dispersing in dichloromethane and precipitation by the addition of ethanol. After separation by centrifigation the particles were dried in vacuum over P$_2$O$_5$ for two days. After drying the particles, they are soluble in apolar solvents like chloroform, dichloromethane, and toluene.

TEM images were collected on a Philips CM 30 Twin FTEM, operating at 300 kV. Samples were prepared by evaporating a drop of a diluted particle dispersion, in methanol in the case of LaPO$_4$ and dichloromethane in the case of LaF$_3$ particles, on a carbon coated 200 mesh copper grid. $^1$H NMR spectra were recorded at 25° C. on a Varian Inova 300 NMR spectrometer. Elemental analyses were carried out with a model 1106 Carlo-Erbu Strumentazione elemental analyzer. X-ray fluorescence was carried out on a Philips PW 1489 spectrometer using LaF$_3$, Li$_3$PO$_4$, Eu$_2$O$_3$, Nd$_2$O$_3$, Er$_2$O$_3$, Pr$_6$O$_{11}$, and Ho$_2$O$_3$ as the standards. Infrared spectra were recorded on a FT-IR Perkin Elmer Spectrum BX spectrometer. Mass spectra were recorded using a Perkin Elmer/Perspective biosystems Voyager-DE-RP MALDI-TOF mass spectrometer. Photoluminescence measurements in the visible were done with an Edinburgh Instruments FS/FL instrument with a 450 W Xe arc lamp and a red sensitive Peltier element cooled Hamamatsu R955 PMT. The emission spectra were corrected for the detector response and the excitation spectra were corrected for the lamp intensity. The NIR spectrum of Ho$^{3+}$ was measured with the same instrument using a liquid nitrogen cooled Ge detector. The other NIR spectra were measured by exciting the samples with a CW Ar$^+$ ion laser operating at 488 nm (Er$^{3+}$), 476 nm (Pr$^{3+}$), and 514 nm (Nd$^{3+}$). The continuous light was modulated with an acousto-optic modulator and focused on the sample in 1×1 cm$^2$ quartz cuvettes. The signal was focused with a 20 cm lens on a monochromator and detected at the monochromator exit with a liquid nitrogen cooled Ge detector (Northcoast) or a PMT (AgOCS) for the spectral region between 700-1000 nm. The signal of the detector was fed to a lock-in amplifier. The spectra of the near-infrared emitting ions were measured with a resolution of 6 nm and of the visible emitting ions with a resolution of 0.9 nm.

Luminescence quantum yields were determined by comparing the luminescence intensity of a particle solution with a solution of quinine bisulfate in 1M H$_2$SO$_4$ with approximately the same absorption at the excitation wavelength of 274 nm. The quantum yield was calculated from the equation $$\phi_{sample} = \frac{n_{sample}^2 I_{sample} A_{ref}}{n_{ref}^2 I_{ref} A_{sample}} \phi_{ref}$$

with n the refractive index, A the absorption, and I the emission intensity and taking the quantum yield of quinine bisulfate as 54.4%.

Characterization of LaF$_3$ nanoparticles. The doping concentration in all particles was 5% of the luminescent ion compared to the total concentration of lanthanide ions, to give a molar ratio of La$^{3+}$/Ln$^{3+}$ of 19/1, unless stated otherwise.

Particles of LaPO$_4$ were synthesized using a literature procedure from the hydrated LnCl$_3$ salts and phosphoric acid. The growth of the particles is controlled by the coordinating solvent tris(ethylhexyl)phosphate and protonated trioctylamine. During the reaction some of the solvent is hydrolyzed and the resulting bis(ethylhexyl)phoshate binds to the surface as can be seen by $^1$H NMR spectroscopy. The LaF$_3$ nanoparticles were synthesized using ammonium dioctadecyldithiophosphate as ligand. To a solution of this ligand and NaF in a water ethanol mixture was added dropwise a solution of the Ln(NO$_3$)$_3$ salts in water. The dithiophosphate head-group of the ligand coordinates weakly to the lanthanide ions allowing the growth of the nanoparticles, but coordinates strongly enough to keep the particles from aggregating.

Oleic acid and octadecanol were purchased from Fluka. Phosphorus oxychloride was purchased from Acros. THF was freshly distilled from Na/benzophenon. $^1$H NMR measurements on nanoparticles were performed on undoped nanoparticles to exclude the influence of the magnetic moment of some of the luminescent lanthanide ions.

$$(CH_3(OCH_2CH_2)_nO)_2PS_2^-NH_4^+ \tag{1}$$

A mixture of P$_2$S$_5$ (0.02 mol) and poly(ethyleneglycol) methylether (molecular weight ca. 550 g/mol)(0.07 mol) was heated to 75° C. for 3 hours. The suspension was cooled to room temperature, followed by the addition of 50 ml of dichloromethane. The solution was filtered, followed by the removal of solvent by rotary evaporation. The remaining residue was dissolved in 50 mL of hexane, and ammonia gas bubbled through the solution for 5-10 minutes. The solvent was removed by rotary evaporation leaving behind a viscous white/yellow product (mw. 1210.97 g/mol).

Synthesis of Nanoparticle with Ligand 1 (GaF$_3$:Eu, LaF$_3$:M, M=Eu$^{3+}$, Er$^{3+}$):

At room temperature, a solution of 1 (0.95 mmol, 1.15 g)) in 30 mL of THF was stirred for 15 minutes, followed by the addition of NaF (3 mmol) in 7 ml of H$_2$O. The solution was stirred for 15 minutes, followed by the dropwise addition of La(NO$_3$)$_3$.6H$_2$O and M(NO$_3$)$_3$.xH$_2$O (1.26 mmol and 0.04 mmol respectively) in 2 mL of H$_2$O. The resulting solution was then refluxed at 97° C. for 3-12 hours, after which it was cooled to room temperature. The resulting precipitate was separated by centrifuge, washed three times with THF, and then dried under vacuum.

Ligand 3 (C$_{18}$H$_{37}$O)$_2$PO$_2^-$NH$_4^+$. A solution of 5 g (18.5 mmol) octadecanol in 20 ml of anhydrous THF was slowly dropped to 1.42 g (9.2 mmol) of OPCl$_3$ at −15° C. under Ar. The solution was slowly allowed to warm to room temperature and stirred for two hours. 1 ml of water was added and the solution was vigorously stirred for 1 hour. 100 ml of ethyl acetate was added and the organic phase was washed three times with 1 N HCl. The organic layer was dried over MgSO$_4$ and evaporated to dryness. 20 ml of hexane was added and NH$_3$ was bubbled to the solution. The precipitate was filtered, washed with hexane, and dried. To substitute the ammonium counterion for a proton, the product was taken up in ethyl acetate and washed three times with 1 N HCl. The organic layer was dried over MgSO$_4$ and evaporated to dryness. A white solid remained, yield 2.9 g, 53%, m.p. 71-73° C. $^1$H NMR (CDCl$_3$): δ 4.1 (dt, J=7.0, 6.6 Hz, 4H), 1.7 (m, 4H), 1.3 (m, 60 H), 0.9 (t, J=6.6 Hz, 6H); MS (FAB) m/z=602.5 [(M$^+$), calcd. for C$_{36}$H$_{75}$O$_4$P: 603.0]; Anal calcd. for C$_{36}$H$_{75}$O$_4$P: C, 71.71; H, 12.54. Found: C, 71.45; H, 12.80.

Compound 5a p-CH$_3$OOC—Ph—O(CH$_2$)$_{11}$OH was synthesized by refluxing a mixture of 10 g (39.3 mmol) bromoundecanol, 7.78 g (51 mmol) of methyl-4-hydroxy benzoate, and 7.06 g (51 mmol) $K_2CO_3$ in 100 ml of acetonitril overnight. The mixture was cooled to room temperature and 300 ml of ethylacetate was added. This solution was washed with 1 N NaOH three times and one time with water. The organic layer was dried over $MgSO_4$, filtered, and the organic solvent removed under vacuum. A white solid remained, that was recrystallized from ethylacetate, yield 99%, m. p. 69-71° C. $^1$H NMR (CDCl$_3$): δ 8.1 (d, J=8.8 Hz, 2H), 6.9 (d, J=8.8 Hz, 2H), 4.0 (t, J=6.2 Hz, 2H), 3.9 (s, 3H), 3.6 (dt, J=6.6, 4.4 Hz, 2H), 1.8 (m, 2H), 1.6-1.4(m, 16H); MS (FAB) m/z=323.2 [(M+H)$^+$, calcd. for $C_{19}H_{31}O_4$: 323.2]; Anal calcd. for $C_{19}H_{30}O_4$: C, 70.77; H, 9.38. Found: C, 70.88; H, 9.55.

Ligand 5 p-CH$_3$OOC—Ph—O(CH$_2$)$_{11}$O)$_2$PS$_2^-$ NH$_4^+$ was synthesized by heating 9.72 g (30 mmol) of compound 5a with 1.91 g (8.6 mmol) of $P_2S_5$ at 80° C. for 3 hours. The workup of this reaction was the same as for ligand 2. The product was a white solid obtained in a yield of 73%, m. p. 81-83° C. $^1$H NMR (acetone-d$_6$): δ 7.9 (d, J=9.2, 4H), 7.0 (d, J=9.2, 4H), 4.1 (t, J=6.6, 4H), 3.9 (dt, J=8.4, 6.6, 4H), 3.8 (s, 6H), 1.8 (m, 4H), 1.5-1.3 (m, 32H); MS (FAB) m/z=737.5 [(M–NH$_4$)$^-$, calcd. for $C_{38}H_{58}O_8PS_2$: 737.0]; Anal calcd. for $C_{38}H_{62}O_8PS_2N$: C, 60.37; H, 8.27; N, 1.85; S, 8.48. Found: C, 59.87; H, 8.72; N, 1.95; S, 8.37.

Compound 6a : p-Cl—Ph—O(CH$_2$)$_{11}$OH was synthesized by refluxing 7.06 g (51 mmol) $K_2CO_3$, 6.6 g (51 mmol) of 4-chlorophenol, and 10 g (39.3 mmol) bromoundecanol in 100 ml of acetonitril overnight. The workup of the reaction mixture was the same as for compound 5a. The product was a white solid recrystallized from hexane and obtained in a yield of 98%, m. p. 42-43° C. $^1$H NMR (CDCl$_3$): δ 7.3 (d, J=9.2, 2H), 6.8 (d, J=9.2, 2H), 3.9 (t, J=6.6, 2H), 3.7 (dt, J=6.6, 5.1, 2H), 1.8 (m, 2H), 1.6-1.3 (m, 16H); MS (FAB) m/z 298.3 [M$^+$, calcd. for $C_{17}H_{27}O_2Cl$: 298.2; Anal calcd. for $C_{17}H_{25}O_2Cl$: C, 68.79; H, 8.49. Found: C, 68.54; H, 8.35.

Ligand 6 (p-Cl—Ph—O(CH$_2$)$_{11}$O)$_2$PS$_2^-$NH$_4^+$ was synthesized by heating 9.7 g (32.5 mmol) of compound 6a and 2.06 g (9.3 mmol) $P_2S_5$ at 80° C. for 3 hours. The workup of this reaction mixture was the same as for Ligand 5. The product was a white solid obtained in 70% yield, m. p. 57-60° C. $^1$H NMR (CDCl$_3$) δ 7.2 (d, J=9.2, 4H), 6.8 (d, J=8.8, 4H), 4.0 (dt, J=8.6, 6.9, 4H), 3.9 (t, J=6.6, 4H), 1.8-1.7 (m, 8H), 1.4-1.3 (m, 28H); MS (FAB) m/z=689.2 [(M–NH$_4$)$^-$, calcd. for $C_{34}H_{52}O_4PS_2Cl_2$: 689.2]; Anal calcd. for $C_{34}H_{56}O_4PS_2NCl_2$: C, 57.61; H, 7.96; N, 1.98; S, 9.05. Found: C, 57.42; H, 8.05; N, 2.04; S, 9.20.

Exchange reaction on LaF$_3$ nanoparticles. To a solution of 100 mg of LaF$_3$ nanoparticles in 5 ml dichloromethane was added 100 mg of ligand 3 or 4 and 100 μl of tiethylamine. This solution was stirred overnight and methanol was added to precipitate the nanoparticles. The precipitate was separated by centrifugation and washed repeatedly with polar solvents like methanol, ethanol, or acetone, until no free ligand was observed in the $^1$H NMR spectrum.

Surface modification of LaPO$_4$ nanoparticles. The surface phosphate groups of the nanoparticles were first reacted with phosphorus oxychloride by heating 100 mg of nanoparticles in 5 ml of OPCl$_3$ for two hours at 120° C. After two hours the solution was cooled to room temperature and the OPCl$_3$ was evaporated under vacuum followed by the addition of 5 ml of toluene containing 1 ml of dodecanol. This solution was refluxed for two hours and then cooled to room temperature. To remove excess dodecanol the nanoparticles were precipitated by the addition of 20 ml of methanol and separated by centrifugation. After washing a few times with methanol the nanoparticles were soluble in apolar solvent like toluene, dichloromethane, and chloroform.

Core-shell nanoparticles. LaF$_3$ core-shell nanoparticles were synthesized similar to the core nanoparticles described above. NaF was substituted by NH$_4$F because of an increased solubility in water. The core of the nanoparticles was synthesized by the dropwise addition of the lanthanide salts to the NH$_4$F and ligand 1 in 35 ml of a water/ethanol mixture at 75° C. This mixture was stirred for 10 min followed by the shell growth. To determine the best way of growing a shell around a core, several methods were tested.

method 1. After the synthesis of the core nanoparticles 3 mmol of NH$_4$F was added drop-wise followed by the dropwise addition of 1.33 mmol of La(NO$_3$)$_3$.

method 2. The synthesis of the core nanoparticles was started with 6 mmol of NH$_4$F and to this solution was first added the lanthanide salts for the core, followed after 10 min by the addition of La(NO$_3$)$_3$ for the shell.

method 3. After the synthesis of the core, 3 mmol of NH$_4$F and 1.33 mmol of La(NO$_3$)$_3$ in water were added alternately in small portions.

After the addition of the shell material the solution was stirred for 2 more hours at 75° C., after which it was cooled down to room temperature. The workup of the nanoparticle product was the same as described above.

Spincoating of the polymer solutions was performed under standard cleanroom conditions. The thicknesses of the polymer layers were measured using a Dektak surface profiler. Arch, 907/17 was used as the positive photoresist and spincoated at a speed of 4000 rpm for 20 s and a prebake temperature of 95° C. The photoresist was developed in standard OPD developer for 50 s. Reactive ion etching was performed using a Elektrotech PF340 etcher. The endfaces of the SU-8 waveguide were made by dicing the substrate using a Disco DAD-321 Dicing Saw.

LaF$_3$:Nd nanoparticles. LaF$_3$:Nd nanoparticles were synthesized as described above. PMMA layers were spincoated from chlorobenzene and ligand 2 was used to make LaF$_3$:Nd nanoparticles that are soluble in chlorobenzene. SU-8 is a commercial product with γ-butyrolactone as the solvent. Nanoparticles synthesized with ligand 2 are soluble in γ-butyrolactone, but for mixing with the SU-8 solution, a mixture of ligand 2 and 5 in the ratio 1:2 was found to give the best solubility properties. The nanoparticle-doped solution was made by dissolving the nanoparticles in γ-butyrolactone and mixing this solution with commercially available SU-8 25 (solid content 63%), to end up with a solid content of 52%.

Exchange reaction on LaF$_3$ nanoparticles. To a solution of 100 mg of LaF$_3$ nanoparticles in 5 ml dichloromethane was added 100 mg of ligand 3 or 4 and 100 μl of triethylamine. This solution was stirred overnight and methanol was added to precipitate the nanoparticles. The precipitate was separated by centrifugation and washed repeatedly with polar solvents like methanol, ethanol, or acetone, until no free ligand was observed in the $^1$H NMR spectrum.

Preparation of SiO$_2$ thin films incorporated with LaF$_3$:Er nanoparticles involve two steps which include preparation of water soluble LaF$_3$:Er-citrate nanoparticles and then reacting the aqueous solution of these particles with tetraethylorthosilicate (TEOS),ethanol mixture in presence of hydrochloric acid.

Preparation of Water Soluble LaF$_3$:Er-citrate Nanoparticles

An aqueous solution made by dissolving 0.126 g of NaF and 2.0 g of citric acid, in 35 ml of water was neutralized with NH$_4$OH till the pH reaches 7. This solution was then heated to 75° C. At this temperature, 2 ml of an aqueous containing 0.5473 g La(NO$_3$)$_3$.6H$_2$O and 0.0288 g Er(NO$_3$)$_3$.5H$_2$O was added drop wise, while stirring the solution continuously. The reaction was allowed to continue for two hours and then slowly cooled to room temperature. Around 100 ml of 100% ethanol was added to the reaction medium to precipitate the citrate stabibilzied $LaF_3$:Er particles. The particles were separated by centrifugation at 3500 rpm, washed with ethanol, and dried under vacuum.

Synthesis of Indium Sulfide Nanoparticles doped with $Eu^{3+}$ ($In_2S_3$:Eu)

1.74 gms of $(C_{18}H_{37}O)_2PS_2^-$ $NH_4^+$ and 0.054 gms of sodium sulfide was dissolved in 130 ml of ethanol:water (1:1) mixture at 75° C. A solution of indium chloride (50 mg) and europium chloride hexahydrate (4 mg) in 2 ml of water was added drop-wise and the solution was stirred at 75° C. for 3 hrs and then cooled to room temperature. Ethanol 50 (ml) was added and the mixture was stirred for 5 min. Subsequently, the yellow-coloured precipitate was centrifuged and washed with ethanol. The nanoparticles were dried in vacuum for two days. After drying the nanoparticles were dispersible in chloroform and dichloromethane.

Preparation of $SiO_2$ thin films incorporated with $LaF_3$:Er particles.

Around 50 mg of $LaF_3$:Er-citrate particles were dissolved in 1.0 ml water. 3ml of TEOS (tetraethoxysilane) and 7.8 ml of ethanol were added to this, followed by few drops of concentrated HCl till the pH reaches around 2. The TEOS: ethanol:water ratio was maintained around 1:10:8.

The resulting solution was stirred for 2 days at room temperature to get a viscous solution which is then spin coated on a quarts substrate. The spin coated samples were heated at 800° C. for 12 hours.

Waveguide fabrication. The PMMA/$LaF_3$:Nd solution was spincoated on a 3" silicon wafer coated with 3.2 µm $SiO_2$ (Plasma enhanced chemical vapor deposition PECVD) on top. The solution consisted of 900 mg PMMA and 100 mg of nanoparticles dissolved in 4 g of chlorobenzene. Spincoating was performed at 1250 rpm resulting in a layer thickness of 3.3 µm. After spincoating the wafer was dried at 95° C. followed by spincoating a 1.2 µm thick layer of positive photoresist on top. Patterns were made with a mask having channels ranging in diameter from 2-10 µm, using a radiation time of 3.7 s. The photoresist was developed in standard OPD developer for 50 sec. After creation of the pattern in the photoresist the polymer was etched using reactive ion etching (RIE). RIE was done for 8 min at a power of 20 W with a pressure of 10 mTorr and 20 sccm $O_2$, keeping the wafer at a temperature of 10° C. Excess photoresist was removed by irradiation and development, leaving ridges with a height of 1.45 µm.

The doped SU-8 layers were spincoated on 10 cm borosilicate wafers that were previously cleaned in fuming nitric acid for 8 minutes. The solid content of the solution of 52% included the nanoparticles and the composition of the SU-8 solution in a 1:4 weight ratio. Spincoating was done at 1250 rpm for 30 seconds with an acceleration of 100 rpm/sec. The layers were dried at 65° C. for two hours, followed by exposure for 300 seconds through a mask containing the waveguide structures. The film was postbaked at 65° C. for 2 min followed by development in RER 600 developer for 2 minutes. The structures were washed with isopropanol to remove excess developer and dried with a nitrogen stream. Flood exposure was done for 5 minutes, followed by a hard bake for 2 hours at 150° C. A cladding of HEMA-styrene was spincoated on top of the device at a spin speed of 750 rpm.

Photophysical measurements. Measurements on the waveguides were performed using an $Ar^+$ pumped dye laser as the pump laser at 578 nm and a TiSapphire laser was used for pumping at 795 nm. The signal laser was a diode laser operating at 1319 nm. The laser light was coupled into a 9/125 µm single mode fiber using a microscope objective and from the fiber into the waveguide. Alignment of the fibers and chip were done using a butt-end coupling setup. Light coming from the waveguide was collected with a single or multimode fiber and lead to a detector or a spectral analyzer for emission spectra.

EXAMPLE 1

Characterization of $Eu^{3+}$ doped nanoparticles. The nanoparticles of $TiO_2$:Eu were characterized by TEM, by evaporating a drop of a nanoparticle solution on a carbon coated copper grid. A typical picture of nanoparticles obtained by heating the reaction mixture for 30 min is shown in FIG. 1. The picture shows small particles with low contrast, due to the small size of the nanoparticles and the low atomic weight of the Ti and O atoms. The nanoparticles were between 3-5 nm in size and in some nanoparticles lattice fringes can be seen, indicating that they are crystalline. The inset shows an enlargement of such a crystalline nanoparticle in which the lattice planes are more clearly observed. The size of the nanoparticles was similar to the sizes found for un-doped $TiO_2$ nanoparticles synthesized using the same method.

The composition of the nanoparticles was measured using X-ray fluorescence (XRF). For a sample synthesized with a molar ratio of $Eu^{3+}$ to $Ti^{4+}$ of 1:17.7 and a reaction time of 30 minutes, a weight ratio of $Eu_2O_3$:$TiO_2$ 10.9:61.6% was found, giving a molar ratio of 1:12.5 in the nanoparticles. The molar ratio of $Eu^{3+}$ in the nanoparticles was higher than applied in the synthesis, which might have be a result of incomplete precursor decomposition at this reaction time. The remaining weight consisted of the TOPO capping groups around the nanoparticles.

Figure 2:
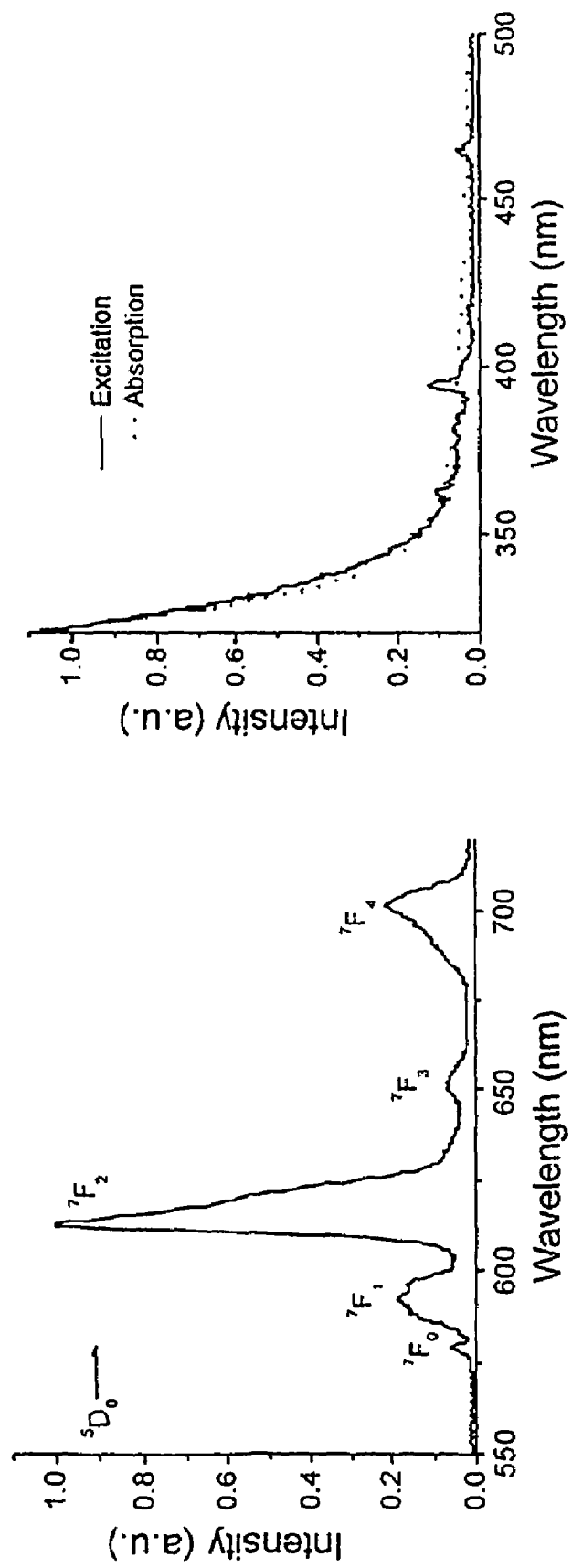
FIG. 2: (left) Emission spectrum of $TiO_2$:Eu nanoparticles of FIG. 1, in dichloromethane excited at 300 nm. (right) Absorption (dotted line) and excitation (straight line, $\lambda_{em.}$ 610 nm) spectrum of $TiO_2$:Eu nanoparticles in dichloromethane.

The emission of the $Eu^{3+}$ ion was used as a probe for the environment around the lanthanide ion. The sensitivity of the emission lines of $Eu^{3+}$ to the symmetry of the surrounding gives valuable information on the site in which the ion is located and it gives the possibility to compare the emission spectrum with emission spectra from the literature of $Eu^{3+}$ doped in other $TiO_2$ materials. The emission, absorption and excitation spectra of $TiO_2$:Eu nanoparticles in dichloromethane are shown in FIG. 2. The emission spectrum showed typical $Eu^{3+}$ luminescence from the $^5D_0$ level after excitation in the $TiO_2$ absorption band.

The emission spectrum showed a striking similarity to the emission spectra of $Eu^{3+}$ in a $TiO_2$ thin film and in mesoporous $TiO_2$. The ratios of the different peaks in the emission spectra were the same and also the peak splitting is very similar, which was a strong indication that the environment around the $Eu^{3+}$ ion is the same. The emission of the $^5D_0 \rightarrow ^7F_2$ transition was clearly the dominating emission line, indicating the $Eu^{3+}$ ion was in an environment without inversion symmetry. The peaks of the transitions were not well resolved. Sharp transition lines were observed when the $Eu^{3+}$ ions were all doped in a limited amount of well-defined crystal sites. The broad emission lines found in the emission spectrum of the $TiO_2$:Eu nanoparticles could have been caused by the doping of $Eu^{3+}$ in amorphous material, but in the TEM pictures crystalline nanoparticles were found. Another reason for the broadening of the emission lines can be the distortion of the crystal lattice around the $Eu^{3+}$ ion. The size and charge mismatch between the two cations ($Eu^{3+}$ 0.95 Å, $Ti^{4+}$ 0.69 Å) leads to oxygen vacancies around the $Eu^{3+}$ ions. This makes the sites of each of the $Eu^{3+}$ ions slightly different, leading to broadening of the emission lines.

The absorption spectrum of the doped nanoparticle solution is also shown in FIG. 2. A strong absorption band of the $TiO_2$ host is observed starting at 350 nm. The onset of this absorption is the band gap of the $TiO_2$ host and this is blue shifted, compared to bulk $TiO_2$, with a band gap of 382 nm The blue shift of the band gap is caused by quantum size effects, due to small size of the nanoparticles. The lanthanide absorption bands are not observed in the absorption spectrum, because of the low absorption coefficients.

The excitation spectrum of the $Eu^{3+}$ emission at 610 nm is very similar to the absorption spectrum, except that the absorption peaks of the $Eu^{3+}$ ion are observed at 395 and 465 nm. The presence of the $TiO_2$ absorption band in the excitation spectrum demonstrates the energy transfer from the semi-conductor host to the $Eu^{3+}$ ion.

Figure 3:
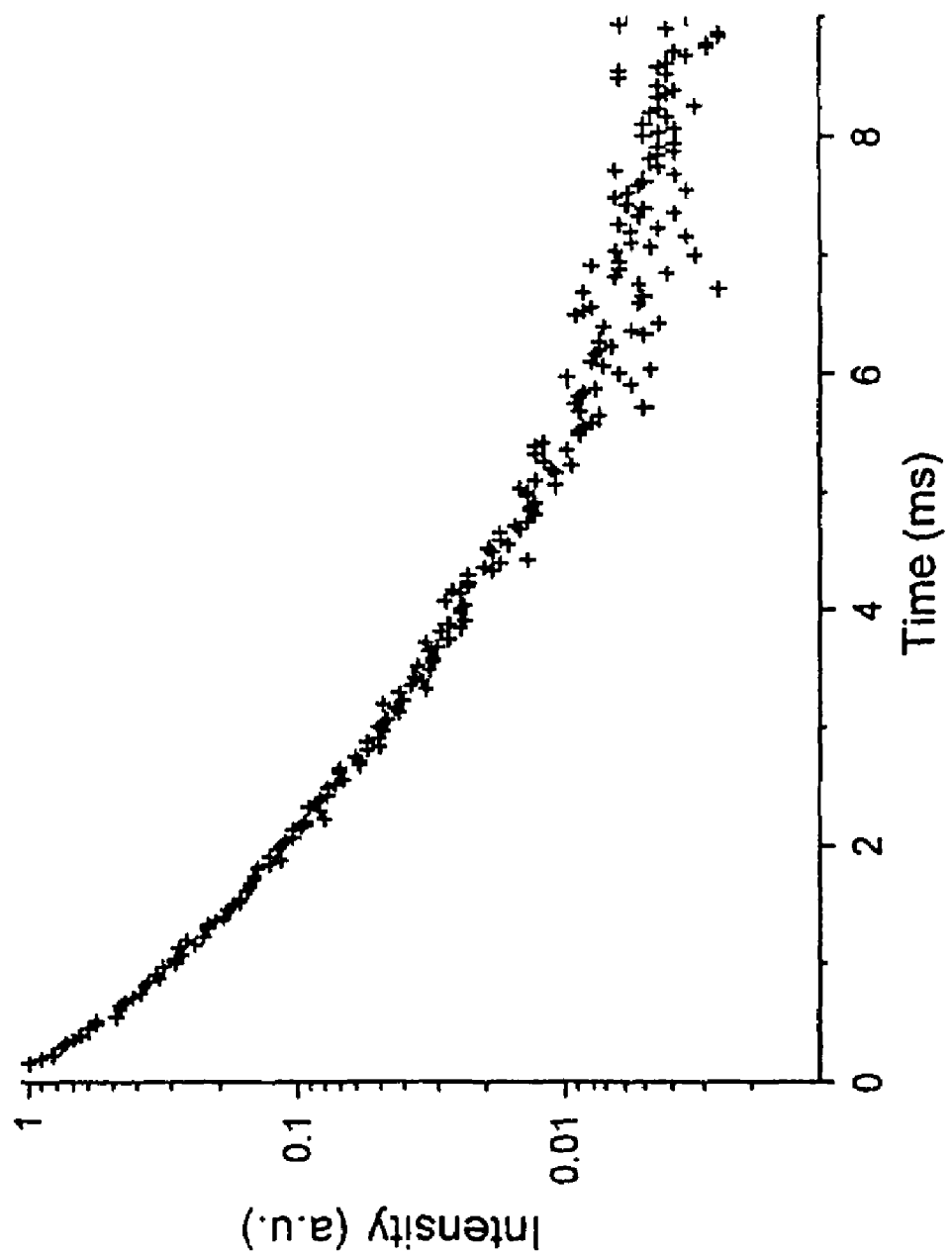
FIG. 3: Luminescence decay of $TiO_2$:Eu nanoparticles of FIG. 1 in dichloromethane ($\lambda_{ex.}$ 300 nm).

The luminescence decay of the $TiO_2$ nanoparticles after excitation at 300 nm is shown in FIG. 3. Energy transfer from the semi-conductor host to the lanthanide ion is very fast, because in the decay no build-up in the luminescence is observed.

The decay shows a deviation from mono-exponential behavior, just like for the other lanthanide doped nanoparticles described herein. Fitting the decay with a bi-exponential fit gave the luminescence lifetimes of the $Eu^{3+}$ emission. A long component of 1.2 ms responsible for 77% of the luminescence and a short component of 0.4 ms responsible for 23% of the luminescence was found. The equation of Werts et al incorporated herein by reference (M. H. V. Werts, R. T. F. Jukes, J. W. Verhoeven *Phys. Chem. Chem. Phys.* 2002, 4, 1542), was used to calculate the radiative lifetime of the $Eu^{3+}$ ion and to make an estimate of the intrinsic quantum yield of the $Eu^{3+}$ ion. Using the refractive index of dichloromethane, a radiative lifetime of 2.9 ms was calculated from the shape of the emission spectrum. This radiative lifetime implies that the intrinsic quantum yield of the $Eu^{3+}$ ion is about 40%. The effective refractive index that the $Eu^{3+}$ ions experience is not exactly known. The ions itself are doped in the $TiO_2$ host material with a refractive index of 2.6-2.9 and the nanoparticles are dissolved in dichloromethane with a refractive index of 1.42. It is therefore likely that the refractive index the $Eu^{3+}$ ions experience is a bit higher than the refractive index of the solvent and this would lead to a shorter radiative lifetime and as a consequence a slightly higher intrinsic quantum yield. The luminescence lifetime of the $Eu^{3+}$ ion in these nanoparticles is higher than the luminescence lifetime of $Eu^{3+}$ in mesoporous $TiO_2$ of 500 μs. This difference can be attributed to the influence of the solvent with the lower refractive index, making the radiative lifetime of the $Eu^{3+}$ ion longer.

A quantum yield of the sensitized emission of the $TiO_2$:Eu nanoparticles was determined by comparing the emission intensity with the emission intensity of a solution of ruthenium tris bipyridine in deoxygenated water with the same optical density at the excitation wavelength. The determined quantum yield of the sensitized $Eu^{3+}$ emission was only 0.03%. This very low quantum yield is in contradiction with the high intrinsic quantum yield of the $Eu^{3+}$ ion.

EXAMPLE 2

Figure 4:
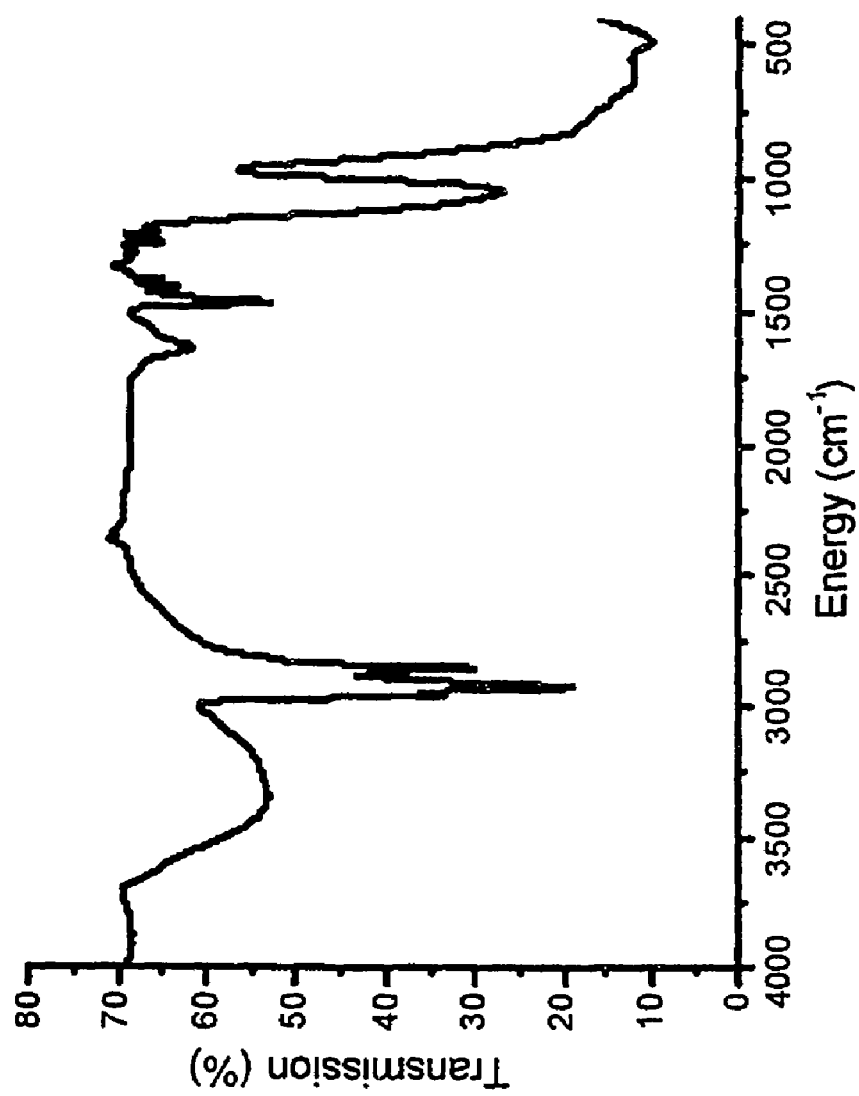
FIG. 4: FT-IR spectrum of $TiO_2$:Eu nanoparticles after drying over $P_2O_5$

Quenching in lanthanide doped $TiO_2$ nanoparticles. The quenching routes of the lanthanide ion in the $TiO_2$ nanoparticles were investigated to explain the low quantum yield. Residual OH groups at the surface of the nanoparticles or in the core of the nanoparticles can quench the luminescence of the lanthanide ion. An FT-IR spectrum was measured to see if water or OH groups are present in the product (FIG. 4). The nanoparticles were dried over $P_2O_5$ to remove any physisorbed water present on the nanoparticles surface after the synthesis.

Figure 5:
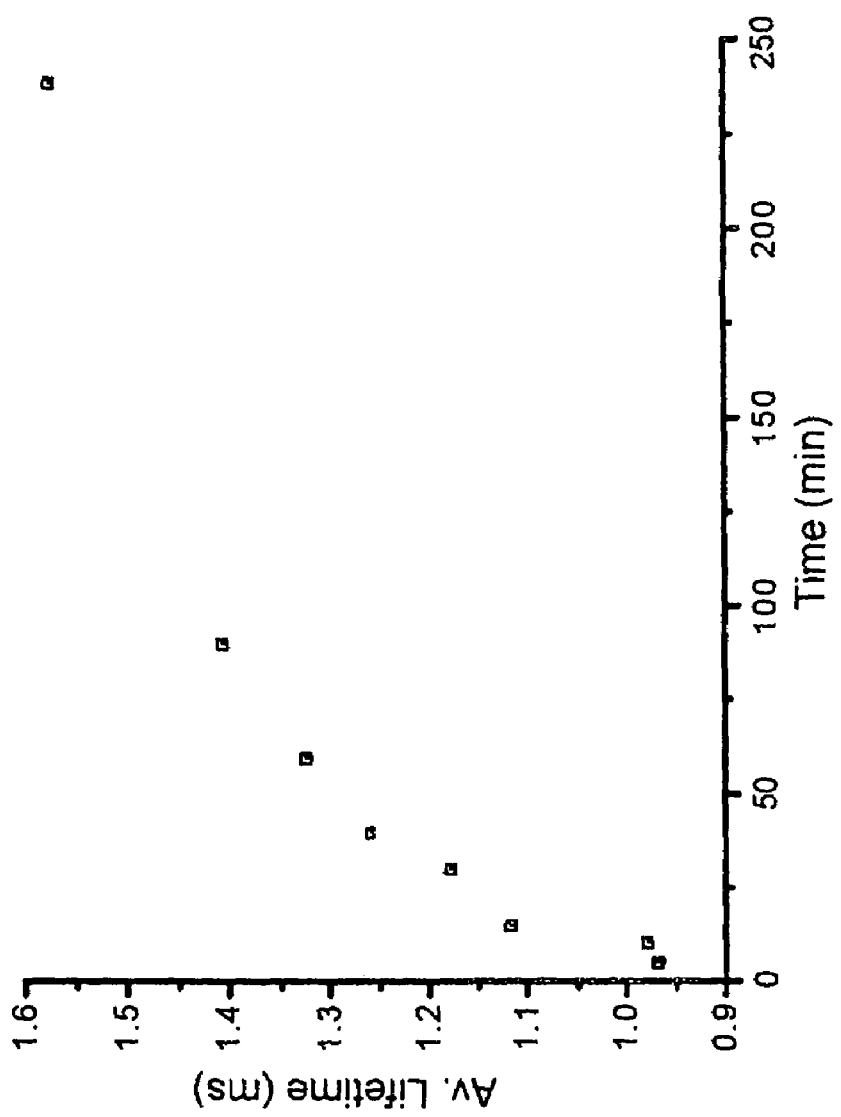
FIG. 5: Average luminescence lifetime of $Eu^{3+}$ in $TiO_2$ nanoparticles after different reaction times.

A broad band centered at 3300 $cm^{-1}$ was found, which can be ascribed to the OH stretching vibration. The peaks at 2925 $cm^{-1}$ and 2850 $cm^{-1}$ are due to stretching vibrations of the CH bonds of the TOPO ligand, together with the PO band around 1046 $cm^{-1}$. The band around 500 $cm^{-1}$ is caused by TiO bonds in the $TiO_2$ host. To investigate the effect of quenching by OH impurities, the nanoparticles were also synthesized by using deuterated solvents. Nanoparticles were synthesized by dissolving the $EuCl_3.6H_2O$ in MeOD and washing the product with MeOD after the reaction. This procedure will change free OH bonds inside and on the surface of the nanoparticles in OD bonds and thereby reduce the quenching of the $Eu^{3+}$ ion. When the luminescence intensity and the luminescence lifetimes of the $Eu^{3+}$ ion in nanoparticles synthesized with methanol and with methanol-$d_1$ were compared, no change was found, indicating that OH bonds are present, but not as an important source of quenching. To increase the quantum yield of the nanoparticles, the influence of the reaction time was investigated. A longer reaction time could influence the quantum yield by increasing the crystallinity, improving the surface capping, and by a growth of the nanoparticles. In FIG. 5 the luminescence lifetime of $Eu^{3+}$ is plotted as a function of the reaction time and an increase in lifetime is clearly observed.

This increase in the luminescence lifetime suggests an increase in quantum yield for a longer reaction time, but this was not found. It is possible that un-doped nanoparticles are formed at longer reaction time, which also absorb light, but do not contribute to the lanthanide luminescence. In this case the quantum yield of the doped nanoparticles is increased, but the result of the quantum yield measurement is disturbed by the presence of un-doped nanoparticles. A change in symmetry around the $Eu^{3+}$ ion could also lead to an increase in the measured lifetime, but this symmetry change should also lead to a different emission spectrum and this was not observed. The relatively long lifetime of the $Eu^{3+}$ ion is an indication that once the energy is transferred to the lanthanide ion, quenching of the $Eu^{3+}$ ion is not the dominating process. Thus, the overall quantum yield of the particles should be improved by decreasing the non-radiative decay of the $TiO_2$ host.

EXAMPLE 3

Figure 6:
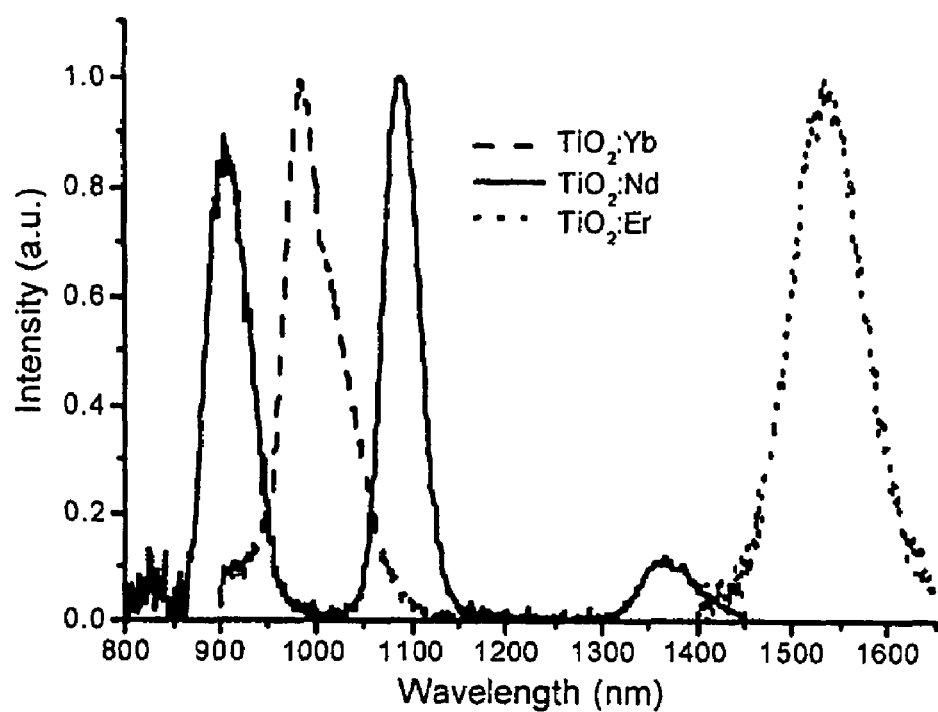
FIG. 6: Emission ($\lambda_{ex.}$ 300 nm) and excitation ($\lambda_{em.}$ 1060 $Nd^{3+}$, 1530 $Er^{3+}$, and 980 $Yb^{3+}$) spectra of $TiO_2$ nanoparticles doped with $Yb^{3+}$, $Nd^{3+}$, and $Er^{3+}$. The offset is for clarity.
Figure 6:
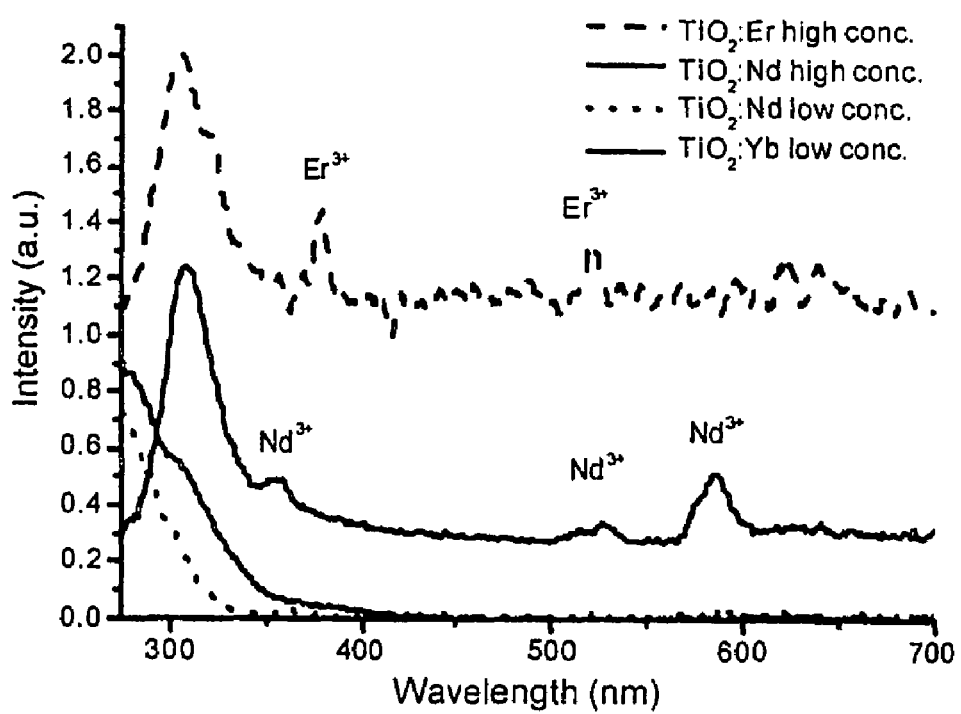

Lanthanide ions emitting in the Near Infrared. Other lanthanide ions were also successfully doped in the $TiO_2$ nanoparticles. The emission and excitation spectra of $TiO_2$ nanoparticles doped with the NIR emitting lanthanide ions $Nd^{3+}$, $Er^{3+}$, and $Yb^{3+}$ are shown in FIG. 6.

After excitation above the $TiO_2$ band gap, the emission spectra show the typical luminescence of these lanthanide ions. The $Nd^{3+}$ ion emits at 880, 1060, and 1330 nm originating from the $^4F_{3/2} \rightarrow ^4I_J$ (J=9/2, 11/2, 13/2) transitions, respectively. The $Er^{3+}$ ion emits at 1530 nm from the $^4I_{13/2} \rightarrow ^4I_{15/2}$ transition and the $Yb^{3+}$ ion at 980 nm from the $^2F_{5/2} \rightarrow ^2F_{7/2}$ transition. The excitation spectra show the same broad band starting at 350 nm the same as for the $TiO_2$:$Eu^{3+}$ particles proving that sensitized emission of these ions also occurs. At high particle concentrations of 50 mg/ml, the excitation spectra also show the direct excitation of $Er^{3+}$ and $Nd^{3+}$, because the lanthanide absorption lines become visible in the excitation spectra (FIG. 6). In the high concentration samples the broad band decreases below 310 nm, because at these concentrations all the excitation light is absorbed in the first millimeters of the fluorescence cuvet and the emission is collected at an angle of 90 degrees from the middle of the cuvet. The emission of the $Nd^{3+}$ and $Er^{3+}$ ions around 1300 and 1500 nm are of special interest for telecommunication purposes, because these wavelengths are in the telecommunication windows.

EXAMPLE 4

Figure 7:
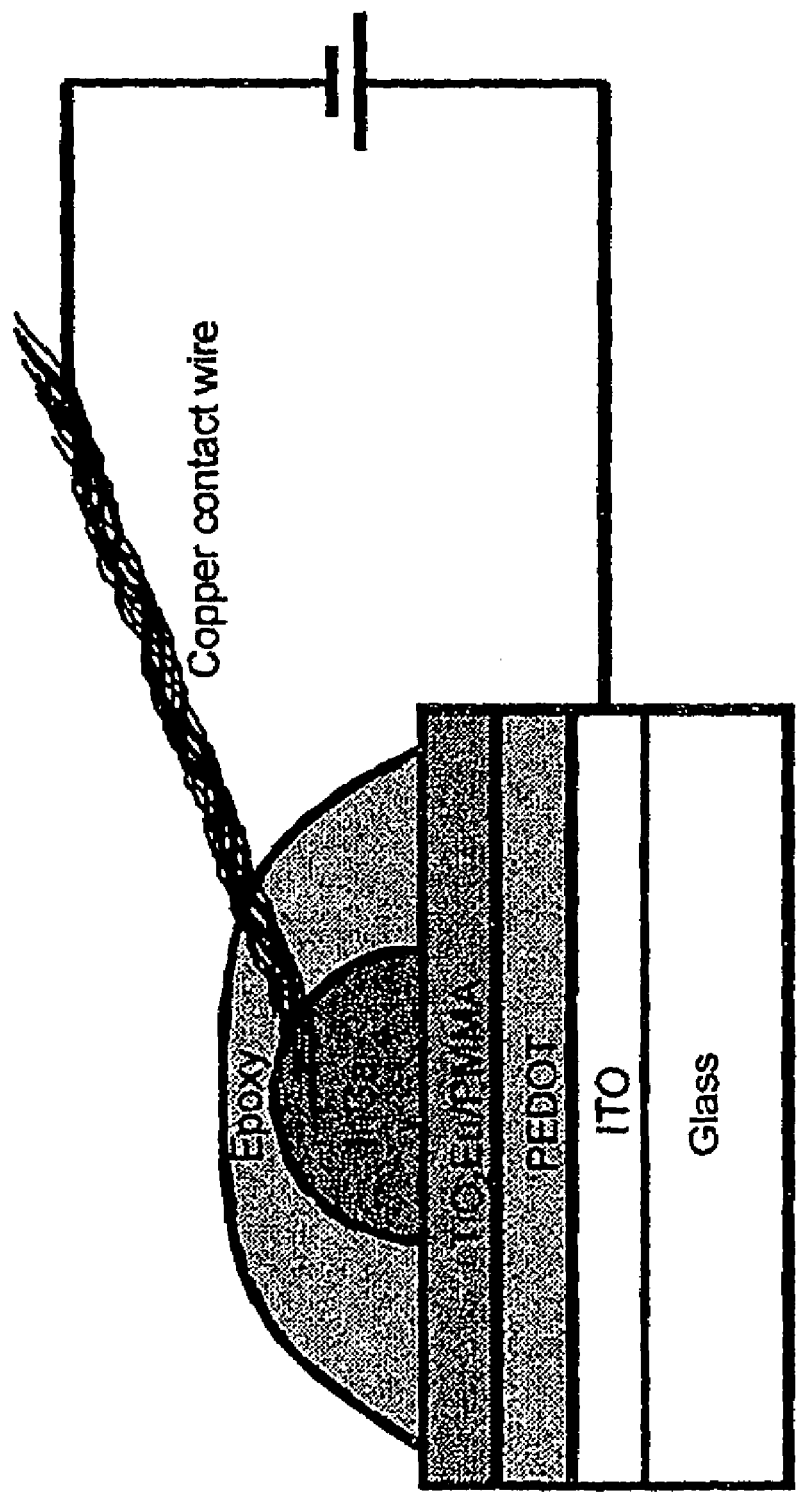
FIG. 7: LED with $TiO_2$:Eu nanoparticles. The thickness of the layers are not scaled for clarity.

LED with $TiO_2$:Eu nanoparticles. An LED doped with $TiO_2$:Eu nanoparticles was fabricated, with a structure as shown in FIG. 7.

Figure 8:
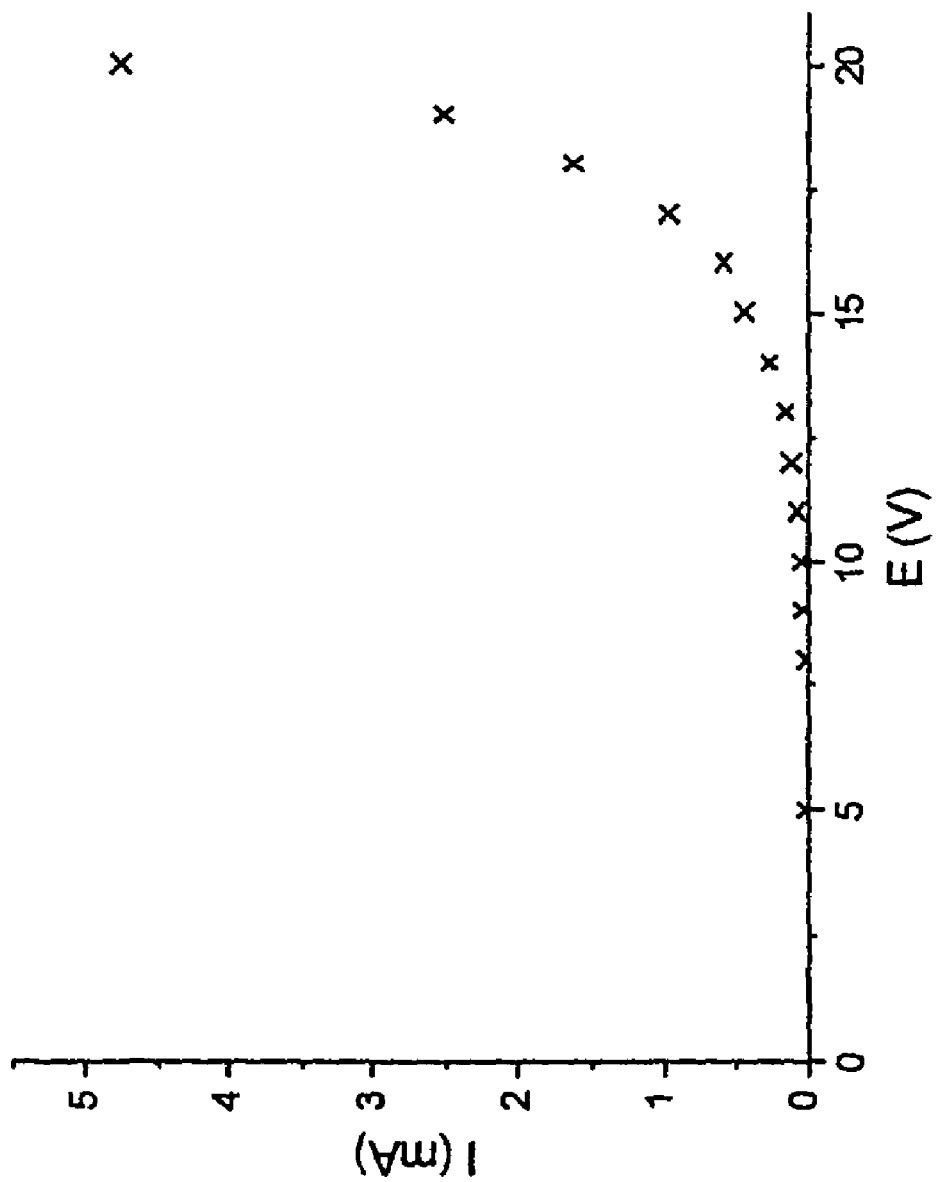
FIG. 8: Current voltage characteristics of the $TiO_2$:Eu/PMMA LED.

On the ITO covered glass slides a layer of 80 nm of PEDOT was spin-coated to improve the hole injection from the ITO into the device. When a nanoparticles solution was spin-coated on top of the PEDOT layer cracks appeared in the nanoparticle layer, which can lead to shortcuts in the LED. For this reason a mixture of nanoparticle/PMMA 3/1 was used, because smoother layers could be spin-coated using the polymer blend. Although the PMMA polymer is a non-conducting polymer a semi-conducting layer can be fabricated when the doping ratio of the nanoparticles is high enough. Electroluminescent devices have been fabricated of nanoparticle PMMA blends using ZnS:Cu nanoparticles, which have a bit larger band gap than our $TiO_2$ nanoparticles. A drop of InGa eutectic was used as the cathode. The device behaved as a diode, which can be seen by the current-voltage characteristics as shown in FIG. 8. The turn on voltage of the device is around 12 V. Up to a voltage of 21 V when a significant current is going through the device no emission could be detected. The low quantum yield of the nanoparticles that was found in the photo-physical measurements is one of the reasons why it will be very difficult to observe electroluminescence.

EXAMPLE 5

Figure 9:
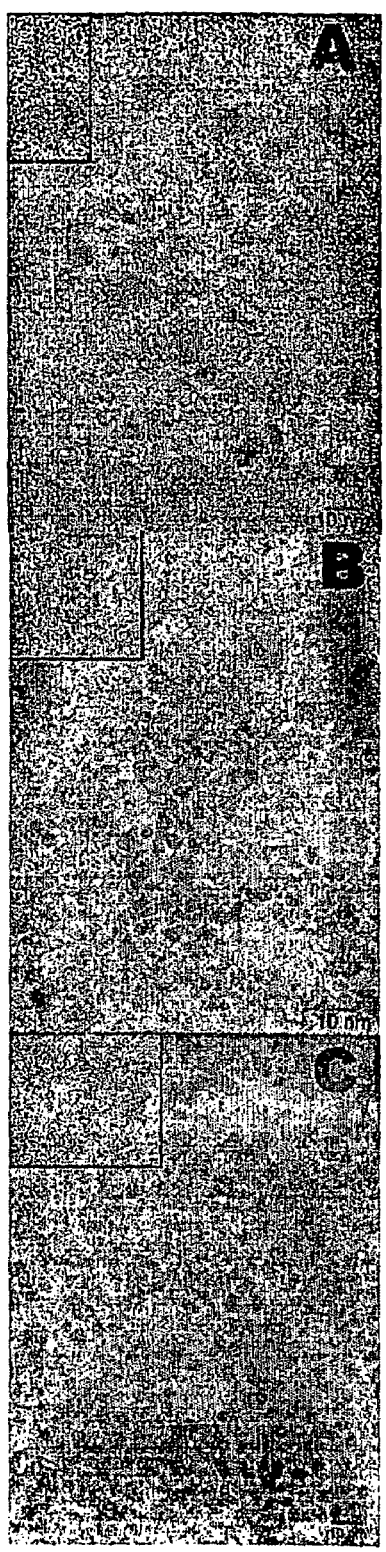
FIG. 9: TEM pictures of (A) $LaF_3$:Eu, (B) $LaVO_4$:Eu, and (C) $LaPO_4$:Eu nanoparticles with the corresponding size distribution. The insets show high magnifications of single nanoparticles in which the crystallinity of the nanoparticles can be seen.
Figure 9:
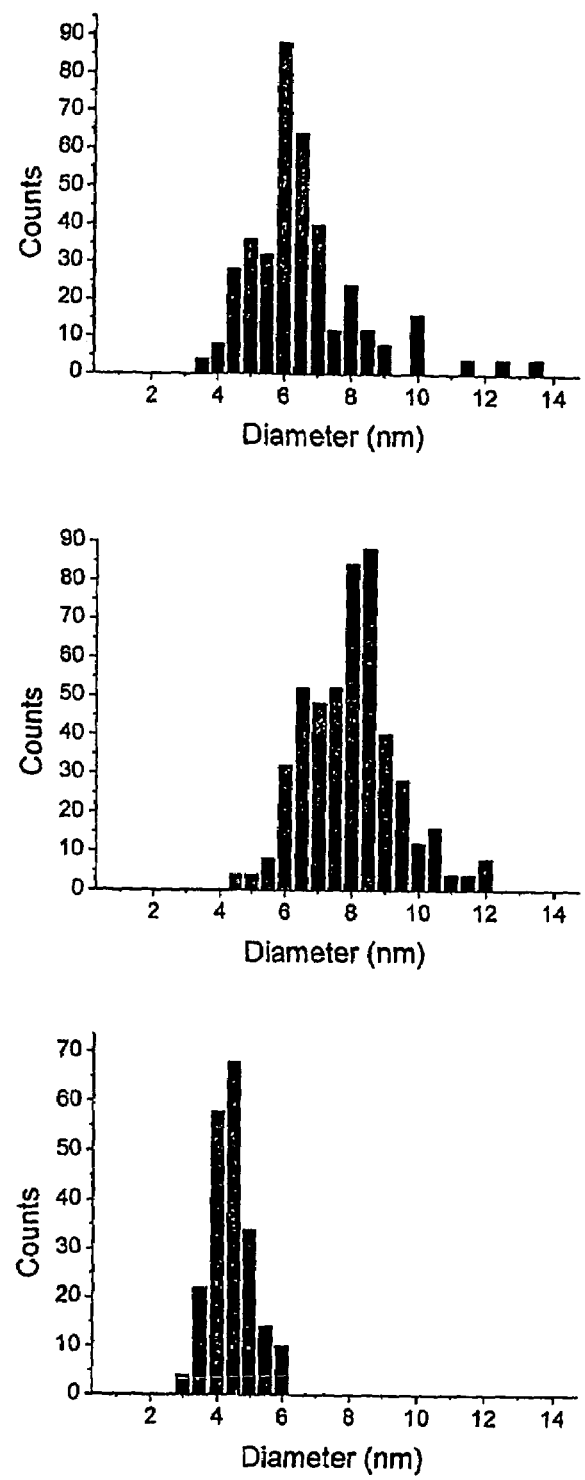

Typical pictures for $LaF_3$:Ln and $LaPO_4$:Ln (Ln=$Eu^{3+}$ and $Nd^{3+}$) are shown in FIG. 9.

The morphologies of both particles are independent of the dopant ion. The high crystallinity of the particles can clearly be seen, despite the fact that the particles were synthesized at relatively low temperatures, i.e. below 200° C. The $LaPO_4$ particles with an average size of 4.3 nm are somewhat smaller in size than the $LaF_3$ particles with an average size of 6.3 nm. In addition, the size distribution of 15% for the $LaPO_4$ particles is lower than the size distribution of the $LaF_3$ particles, which is 28%. The $LaF_3$ particles are less spherical in shape with aspect ratios between 1 and 3. The spherical and elongated particles both consist of one crystal domain, so the elongated. particles are not formed by the aggregation of multiple particles. In the size distribution histograms the sizes of the elongated particles were determined by averaging of the long and the short axis. The sizes of both particles are sufficiently small to prevent scattering when the particles are incorporated in a polymer matrix.

The elemental composition of the particles was determined using X-ray fluorescence (XRF) and combustion elemental analysis. The results are summarized in Table 1.

TABLE 1

Elemental composition of $Eu^{3+}$-doped nanoparticles (weight %)

| Particle | La[a] | Ln[a] | P[a] | C[b] | H[b] | S[b] | N[b] |
|---|---|---|---|---|---|---|---|
| $LaF_3$: Nd | 24.76 | 1.23 | 3.48 | 42.49 | 7.76 | 5.76 | — |
| $LaF_3$: Er | 24.20 | 1.35 | 3.48 | 43.59 | 7.62 | 6.48 | — |

TABLE 1-continued

Elemental composition of $Eu^{3+}$-doped nanoparticles (weight %)

| Particle | La[a] | Ln[a] | P[a] | C[b] | H[b] | S[b] | N[b] |
|---|---|---|---|---|---|---|---|
| $LaF_3$: Ho | 35.41 | 1.94 | 2.94 | 33.07 | 7.76 | 5.72 | — |
| $LaPO_4$: Nd | 41.97 | 2.42 | 12.19 | 6.33 | 2.16 | — | 1.01 |
| $LaPO_4$: Er | 41.80 | 2.36 | 12.56 | 5.57 | 2.63 | — | 1.20 |
| $LaPO_4$: Pr | 41.97 | 2.35 | 12.52 | 6.30 | 2.17 | — | 1.01 |

[a]measured with XRF
[b]measured with combustion elemental analysis.
[c]n.d. is not determined The same ratio of lanthanide ions as applied in the synthesis was found in the particles reflecting the similar reactivity of the lanthanide ions. The rest consists of organic groups on the outside of the particles like tetramethyl ammonium ions and ethylhexyl chains for the $LaPO_4$ particles and the coordinated dithiophosphate ligands for the $LaF_3$ particles. The surface of the $LaPO_4$ nanoparticles consist of deprotonated phosphate groups coordinated to ammonium ions and some of the solvent and hydrolyzed products of the solvent. The coordination of the organic molecules can be seen from the broadened signals in the 1H NMR and the ratio of Ln/P, that is smaller than one, indicates that phosphate groups are at the surface and not the lanthanide ions. For the $LaF_3$ particles it is likely that the surface consists of $Ln^{3+}$ ions, because these can coordinate to the negatively charged ligand that stabilizes the particle. The coordination of the ligand to the surface of the particles can be seen from the broadened signals of the ligand in the $^1H$ NMR spectrum. Fluoride could not be detected using both these analysis techniques so no information could be obtained about the amount of F in the $LaF_3$ particles. The amount of ligand measured with elemental analysis on the $LaF_3$ particles is not always constant. For the $Nd^{3+}$ and $Er^{3+}$ doped particles the amount of carbon and hydrogen measured is the same, but the amount of sulfur is slightly lower for the $Nd^{3+}$ particles. A deviation in the amount of sulfur could be caused by oxidation of the ligand after prolonged exposure to air, as found by mass spectrometry. This oxidation leads to a ligand with a phosphate headgroup, which binds more strongly to the particles and would therefore lead to even more stable particles. For the $Ho^{3+}$ doped particles the amount of carbon and hydrogen is lower than for the other two ions. The particle size and size distribution is the same as for the other two batches, so apparently there is less ligand coordinated to the $Ho^{3+}$ doped particles. For all these particles no free ligand is present because no nitrogen was detected and because only broadened signals are present in the $^1H$ NMR spectra proving the coordination of the ligand to the particle surface. Surface properties of nanoparticles usually play an important role in the luminescence properties and it is therefore important to know which molecules are coordinated to the surface.

EXAMPLE 5

Figure 10:
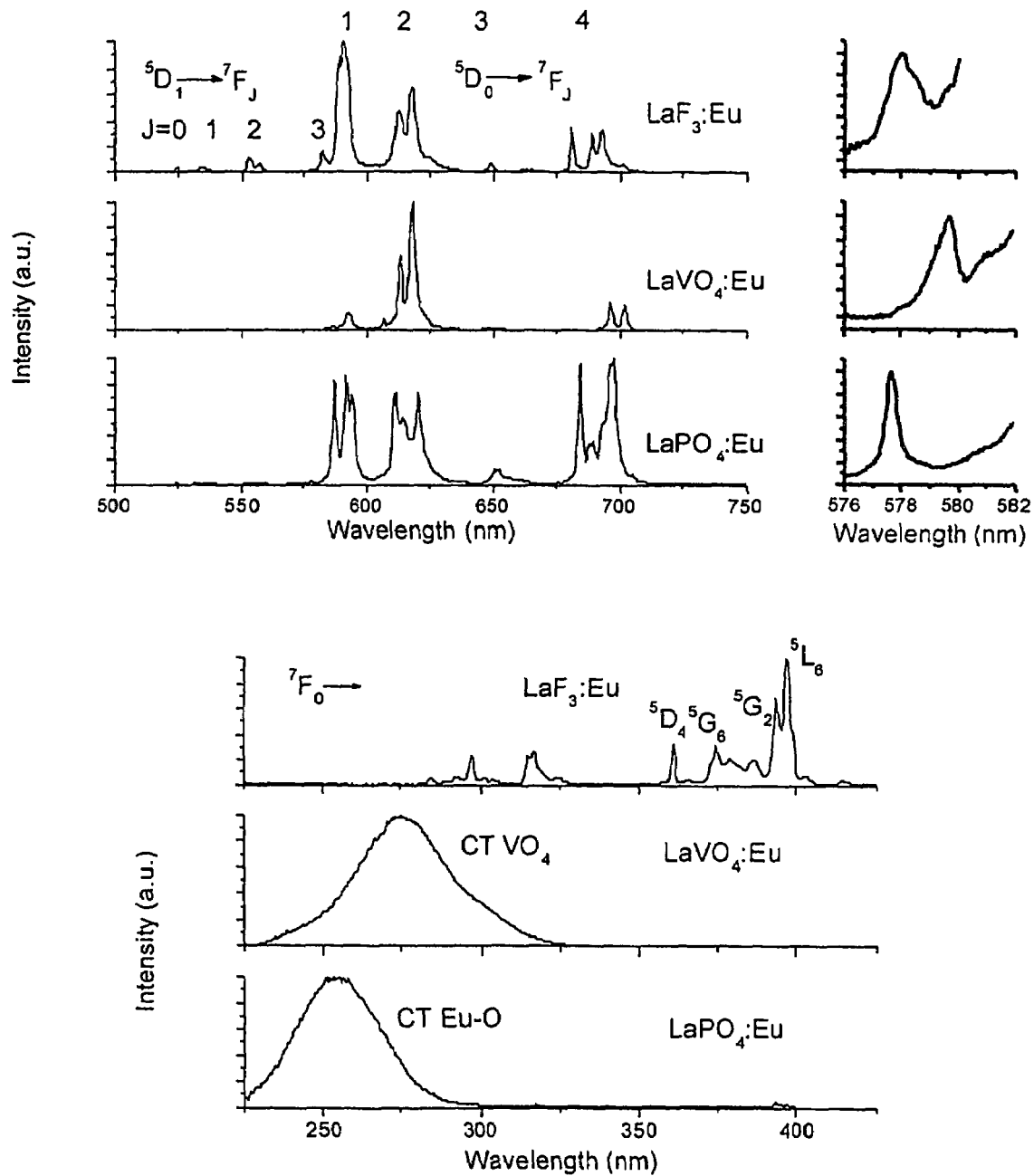
FIG. 10: Emission (up) and excitation (down) spectra of $LaF_3$:Eu, $LaVO_4$:Eu, and $LaPO_4$:Eu. An enlargement of the $^5D_0 \rightarrow ^7F_0$ emission peak is shown on the top right.

Luminescence of $Eu^{3+}$ doped particles. The $Eu^{3+}$ ion was used as a probe for the crystal environment in which the ion is located. Typical $Eu^{3+}$ emission originating from the $^5D_0$ and $^5D_1$ levels was observed after direct excitation of the ion at 397 nm for $LaF_3$:Eu and 260 nm for $LaPO_4$:Eu (FIG. 10).

Figure 11:
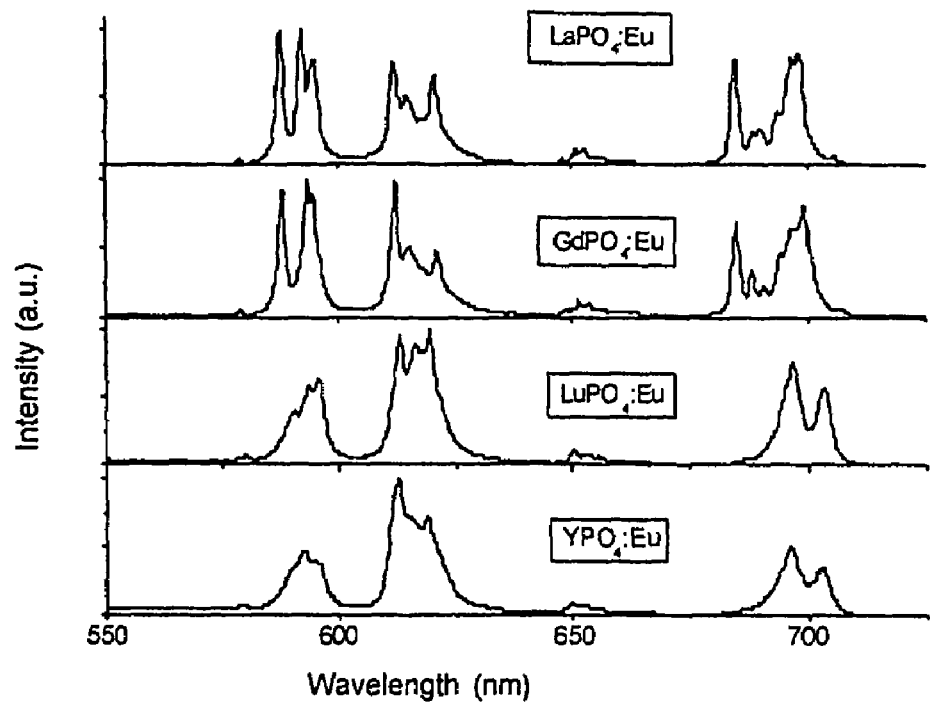
FIG. 11: Normalized emission, $\lambda_{ex.}$ 250 nm (top) and Excitation (bottom) spectra of $LnPO_4$:Eu particles in methanol. The excitation spectra ($\lambda_{em.}$ 612 nm) are normalized on the 393 nm excitation peak of $Eu^{3+}$.
Figure 11:
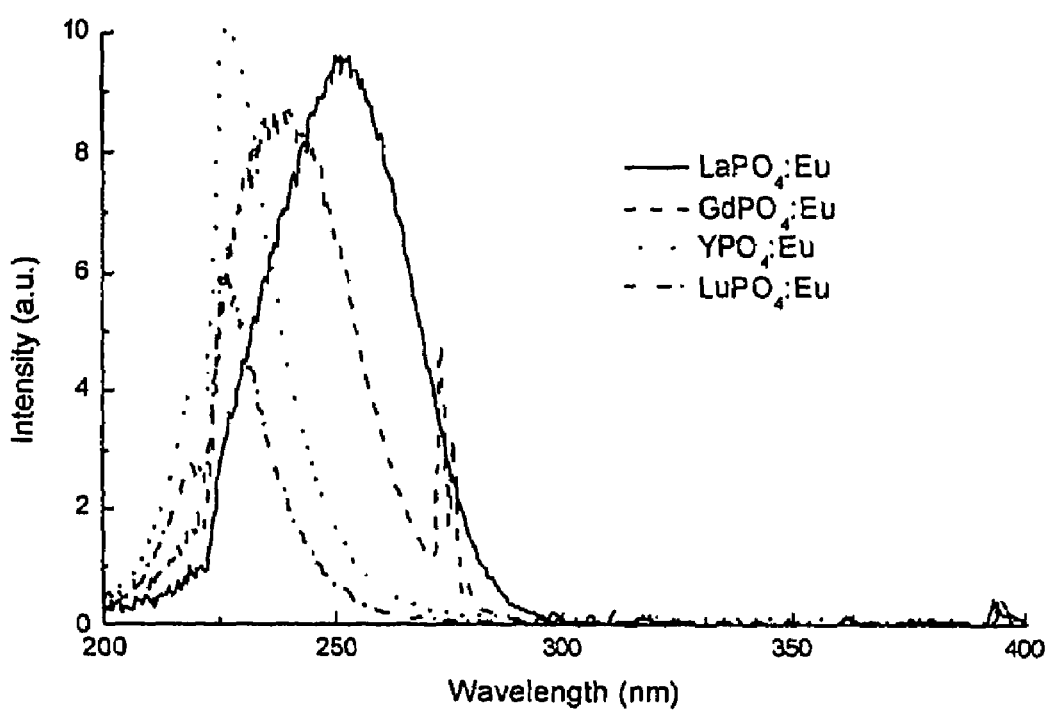

In $LaPO_4$ the $Eu^{3+}$ can be excited at 260 nm because of a charge transfer band. This charge transfer band is visible in more phosphors in which $Eu^{3+}$ is coordinated to oxygen and is caused by an electron transfer in the $Eu^{3+}$—$O^{2-}$ bond. Deactivation of the charge transfer state leads to an excited Eu$^{3+}$ ion. Due to the low reduction potential of Eu$^{3+}$ this band occurs at wavelengths above 200 nm. In the emission spectrum the ratio of the different peaks of the $^5D_0 \rightarrow {}^7F_J$ (J=1, 2) transition gives information about the symmetry of the crystal site in which the ion is located. This confirms that the dopant ion is present in a La$^{3+}$ crystal site giving the Eu$^{3+}$ ion C$_1$ symmetry in LaPO$_4$ and C$_2$ symmetry in LaF$_3$ particles, the same as for the bulk materials. In the LaF$_3$:Eu particles emission from the $^5D_1$ level at 524, 534, 554, and 582 nm can clearly be observed as well. Emission from this level also occurs in the LaPO$_4$:Eu particles only with much less intensity. This large difference in emission from the $^5D_1$ level is caused by the difference in phonon energies of the host materials. The $^5D_1$ level lies only 1750 cm$^{-1}$ above the $^5D_0$ level and thus the $^5D_1$ level can be depopulated very fast to the $^5D_0$ level by multi-phonon emission in LaPO$_4$. In the LaF$_3$ host the maximum phonon energies are so low that multi-phonon emission becomes inefficient. The different symmetry sites of Eu$^{3+}$ in these particles can clearly be observed from the different emission spectra. The Eu$^{3+}$ ion can also be used as a probe for more similar crystal structures as is illustrated in LnPO$_4$ nanoparticles with Ln=La, Gd, Y, and Lu, synthesized using the same procedure described for LaPO$_4$ particles. The crystal structure of these phosphates is dependent on the size of the lanthanide ion. A monazite type is found for the larger lanthanide ions (Ln=La$^{3+}$–Gd$^{3+}$) and xenotime for the smaller lanthanide ions (Ln=Tb$^{3+}$–Lu$^{3+}$). The excitation and emission spectra for LnPO$_4$:Eu (Ln=La$^{3+}$, Gd$^{3+}$, Y$^{3+}$, Lu$^{3+}$) nanoparticles are shown in FIG. 11.

The excitation spectra are scaled to the 393 nm peak of Eu$^{3+}$ and all show a charge transfer band, but the excitation maximum is blue shifted upon a decrease in ion size. The excitation spectra of LuPO$_4$ and YPO4 exhibit a sharp cut-off around 220 nm, which is caused by the absorption of the excitation light by the solvent. The blue shift of the charge transfer band upon decreasing the ion size can be explained by a stronger binding of the phosphate groups to the smaller trivalent ions and by the smaller crystal site the Eu$^{3+}$ ion has in the LuPO$_4$ and YPO$_4$ lattices. This makes the phosphates more difficult to oxidize and the reduction of Eu$^{3+}$ to Eu$^{2+}$ less favorable. The sharp lines in the GdPO$_4$ host at 273, 276, 278 nm and some smaller peaks around 310 nm are due to the excitation of Gd$^{3+}$ ($^8S_{7/2} \rightarrow {}^6I_J$, $^6P_J$, J=3/2, 5/2, and 7/2) and subsequent energy transfer to the Eu$^{3+}$ excited states. The emission spectra of all four LnPO$_4$:Eu materials exhibit the characteristic Eu$^{3+}$ emission lines for the $^5D_0 \rightarrow {}^7F_J$ (J=0-4) transitions. Some differences are observed in the emission spectra of the two host materials with the larger ions (La$^{3+}$ and Gd$^{3+}$) compared to the host materials with the smaller ions (Y$^{3+}$ and Lu$^{3+}$). The relative intensities of the $^5D_0 \rightarrow {}^7F_2$ transition are different: 0.30, 0.30, 0.43, 0.50 for the doped LaPO$_4$, GdPO$_4$, LuPO$_4$, and YPO$_4$, respectively. These values correspond to a crystal site with a high degree of inversion symmetry and more inversion symmetry for the La and Gd phosphates than for the Lu and Y phosphates. Furthermore, a number of extra peaks are found in the $^5D_0 \rightarrow {}^7F_4$ transition, all consistent with the difference in crystal structure between the LaPO$_4$, GdPO$_4$ and the LuPO$_4$ and YPO$_4$ particles.

The luminescence decay of the ion gives information on the influence of quenching from the organic solvent and ligand outside the particle and quenching by impurities from inside the particle. An example of the decays of LaF$_3$:Eu and LaPO$_4$:Eu particles is given in FIG. 12.

Figure 13:
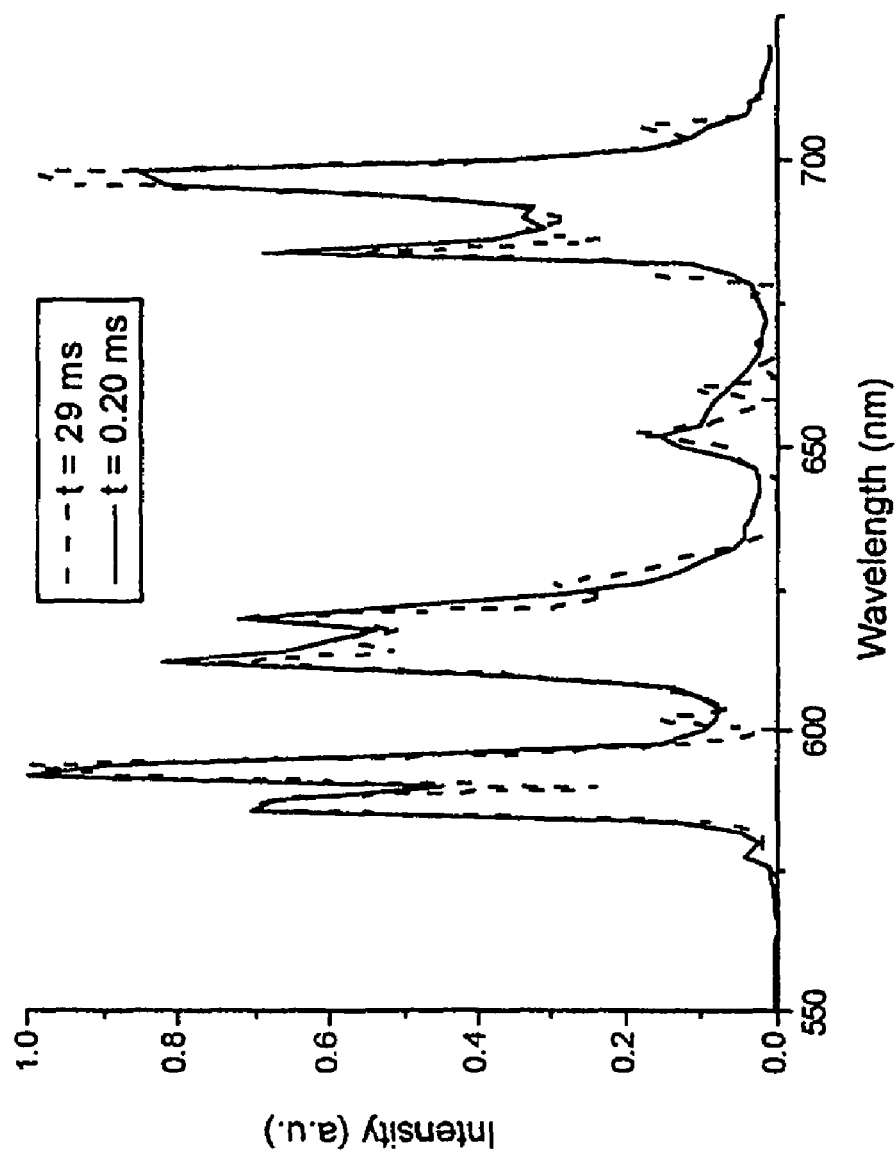
FIG. 13: Time-resolved emission spectra of $LaPO_4$:Eu in methanol with a delay of 0.2 ms and 29 ms after the excitation pulse.

Excitation occurs in the higher lying Eu$^{3+}$ levels followed by a rapid decay to the luminescent $^5D_0$ level. For the LaPO$_4$:Eu particles, the luminescence of the $^5D_0$ level shows a short rise with a time constant of 24 μs. This is similar to the decay time of the $^5D_1$ level of 23 μs showing that the $^5D_0$ level is partially populated through the $^5D_1$ level. After this short rise in the LaPO$_4$:Eu luminescence, both decays are clearly not mono-exponential, so not all ions in the particles have the same probability of decay. An acceptable fit was obtained when two exponentials were used. However, there is no physical reason to use just two exponentials. Quenching by groups close or at the surface of the nanoparticle should lead to a gradual change of quenching efficiency of the lanthanide ion from the surface to the core of the particle. Assuming a random distribution of the dopant lanthanide ion over the nanoparticle and that all ions are in the same crystal site, there is no physical justification for fitting the decay curve with just two exponentials, which suggests two populations. A random distribution of the doping ions is reasonable because of the high similarity in cation size, charge, and reactivity between the lanthanide ions. It was possible to check if all the ions are in the same crystal site. First of all, the emission of the $^5D_0 \rightarrow {}^7F_0$ transition gives information on the amount of crystal sites the ion is doped in. This is a transition between two non-degenerate levels, so if all the ions are in the same crystal site, only one emission peak for this transition is present around 578 nm. In both Eu$^{3+}$ doped particles of LaF$_3$ and LaPO$_4$ we indeed see just one peak for this transition, measured at a resolution of 0.1 nm (inset FIG. 10), indicating that all ions are in the same crystal site. Time-resolved spectroscopy is another method giving information on different crystal sites. Ions doped in different crystal sites have a different symmetry leading to a difference in emission spectrum and a difference in luminescent lifetime. An emission spectrum taken directly after an excitation pulse is caused by emission from both types of ions, but an emission spectrum at the end of the decay is the emission from ions with the longest lifetime. When all ions are in the same crystal site no differences in emission spectrum should be observed. FIG. 13 shows the emission spectra of LaPO$_4$:Eu in methanol 0.2 ms after an excitation pulse and 29 ms after an excitation pulse.

Although the intensity at the end of the decay is much lower, the shape of the emission spectrum is essentially the same as in the early stages of the decay, thereby confirming that Eu$^{3+}$ is doped in one single crystal site.

EXAMPLE 7

Modeling the luminescence decay. When it is assumed that most of the quenching of the excited state is located close to the surface, a model can be designed taking into account these surface effects. Ions in the core of the particles will have the longest lifetime and going to the outside the lifetime will decrease. When a particle is divided into a number of shells, the lifetime of one shell can be related to the lifetime in another shell by an effective radiative lifetime and a quenching factor that is dependent on the distance to the surface. The luminescence decay can thus be described using the following equation:

$$I_t = I_0 \sum_{i=1}^{n} \frac{1}{n} e^{-k_i t}; k_i = \frac{1}{\tau_i} = k_R + C \times f_{q,i}$$

In this equation I$_t$ is the luminescence intensity at time t, I$_0$ the intensity at t=0, n the number of shells, k$_i$=1/τ$_i$ the rate constant in shell I, with τ$_i$ the luminescent lifetime of this shell, t the time, k$_R$=1/τ$_R$ a rate constant in the absence of quenching from outside the particle so it is an apparent radiative decay rate, and C the quenching constant. k$_R$ is an apparent decay rate, because it only takes into account quenching from the surface. All other quenching processes inside the nanoparticle, like concentration quenching and quenching by impurities inside the nanoparticle can also be present. The constant C is a fit parameter that is dependent on the individual ion, the size and size distribution of the particles, and on the strength of the quenching. The size and size distribution are still in the quenching constant, because at this moment no size dependent decays are available. The relative quenching factor $f_{q,i}$ takes into account the distance of a shell to the surface and the distance dependence of the quenching. When quenching is assumed to take place via a dipole-dipole mechanism, the quenching has a distance dependence of $r^{-6}$. The total quenching then has to be integrated over the total volume outside the particle. Integration over the total volume gives the total quenching factor $f_{q,t}$, as shown in the following equation:

$$f_{q,i}(a_i) = \int_v r^{-6} dv$$

Figure 14:
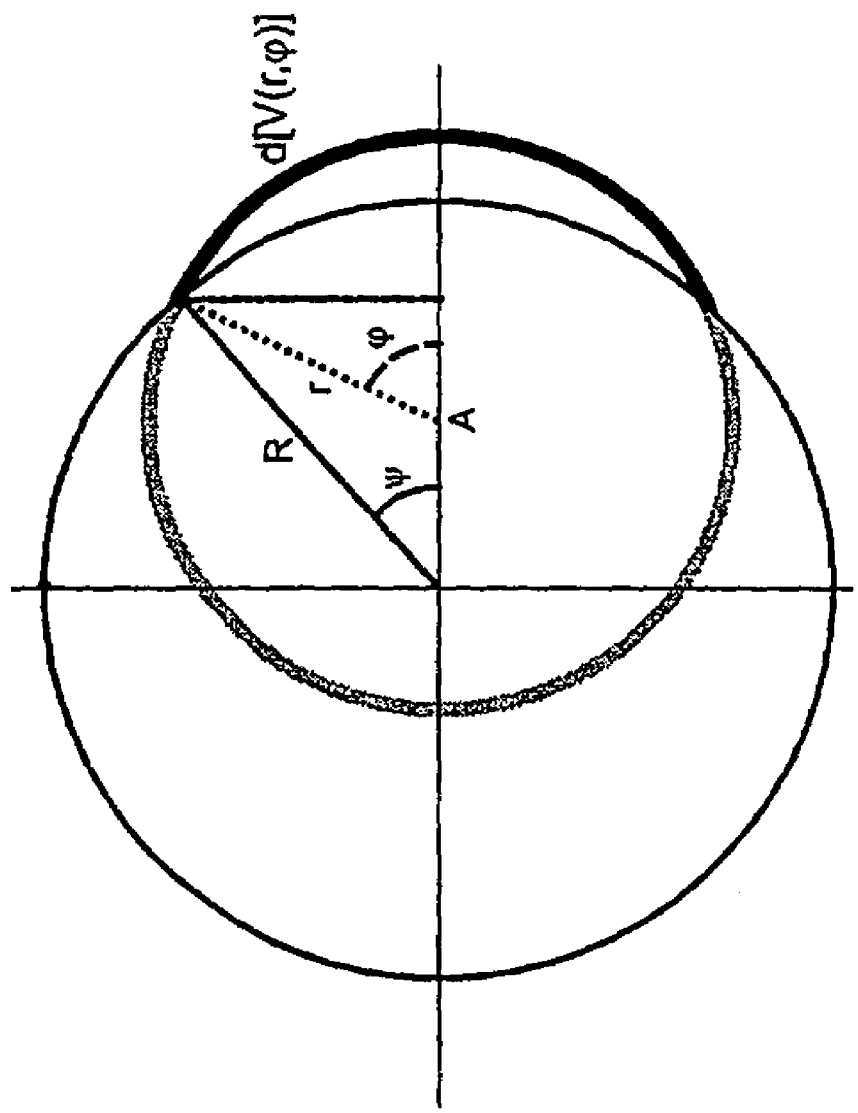
FIG. 14: Schematic representation of a particle and the representation of the symbols used in the text.

This equation was solved for a particle shell i, with $a_{i=Ai}/R_i$ as the center of each shell, by varying the radius r (FIG. 14). Three domains can be defined. The first domain is totally inside the particle ranging from r=0 to r=(R−A), so for this domain no quenching is taken into account. In the second domain the volume fraction $d[V(r,\phi)]$ is dependent on both the radius and the the angle $\phi$. (part of the shell is inside the particle with no quenching and part is outside the shell, but with quenching). This domain ranges from r=(R−A) to r=(R+A) (FIG. 14).

The third domain lies totally out of the particle and is from r=(R+A) to ∞. The fraction of a shell in the second domain that is outside the particle equals $2\pi r^2 (1-\cos \phi) dr$. The volume fraction dV of a shell in the third domain is $4\pi r^2 dr$. Multiplying this with $r^{-6}$ results in the following integral, that was numerically solved for a particle consisting of 10 shells[1] of equal volume(see equation below). Assuming that the ions are randomly distributed in the particle will give all ions the same weight in the fit.

$$f_{q,i}(A,\varphi) = \int_V r^{-6} dV = \int_{R-A}^{R+A} \frac{1}{r^6} 2\pi r^2 (1-\cos\varphi) dr + \int_{R+A}^{\infty} \frac{1}{r^6} 4\pi r^2 dr$$

This results in relative quenching factors for the different shells as shown in Table 2

TABLE 2

| Quenching factor $f_{q,i}$ for 10 shells | | |
|---|---|---|
| Shell i | $a_i$ | $f_{q,i}(a_i)$ |
| 1 | 0.23 | 4.9 |
| 2 | 0.52 | 11 |
| 3 | 0.63 | 19 |
| 4 | 0.70 | 32 |
| 5 | 0.77 | 63 |
| 6 | 0.82 | 121 |
| 7 | 0.87 | $3.0 \cdot 10^2$ |
| 8 | 0.91 | $8.6 \cdot 10^2$ |
| 9 | 0.95 | $4.9 \cdot 10^3$ |
| 10 | 0.98 | $7.7 \cdot 10^4$ |

Figure 12:
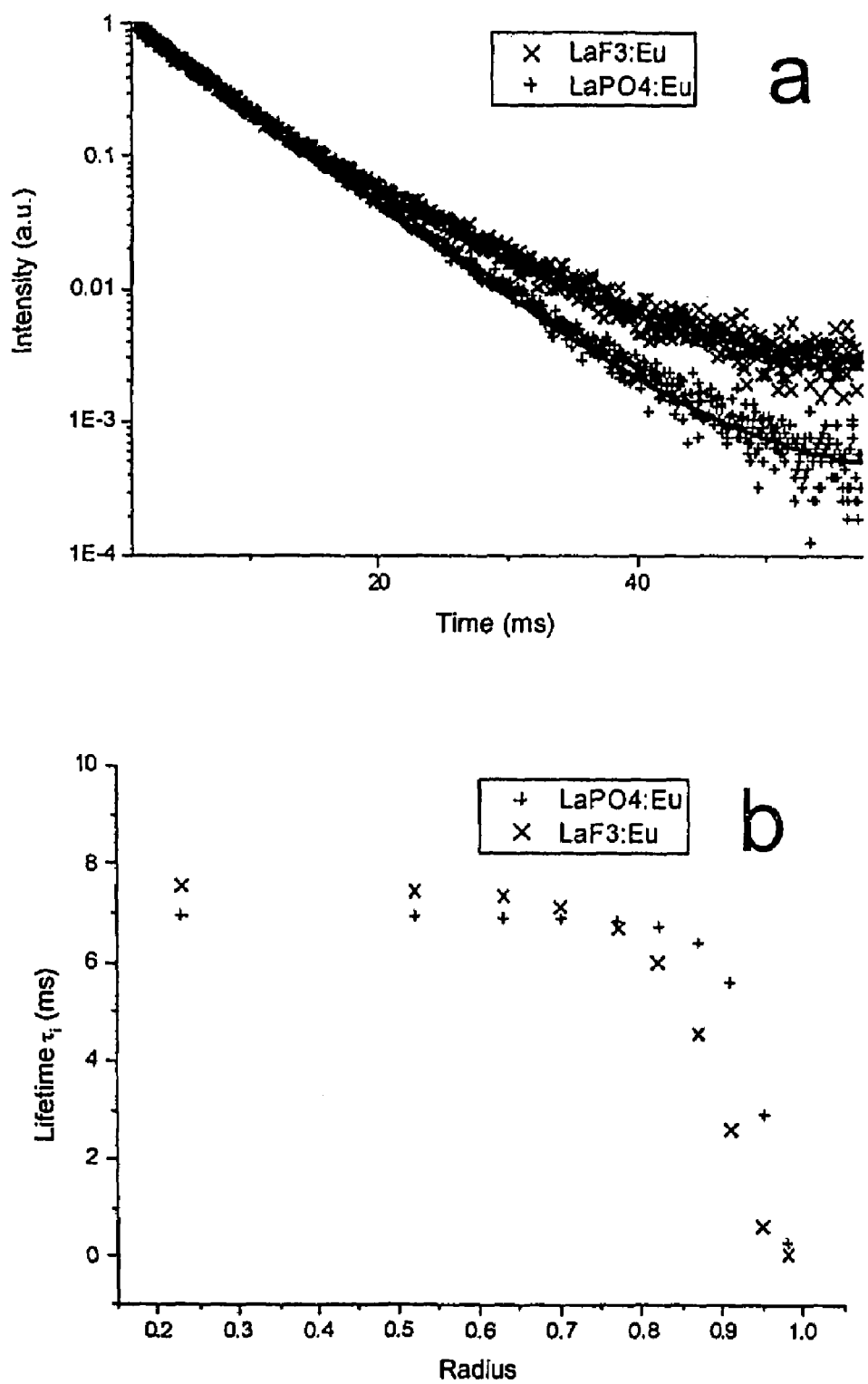
FIG. 12: Luminescence decays (top) of $LaF_3$:Eu ($\lambda_{ex.}$ 397) in dichloromethane and $LaPO_4$:Eu ($\lambda_{ex.}$ 260 nm) in methanol, collecting the emission at 591 nm. The fits were obtained by using the model described in the text. The bottom picture shows the distribution of the lifetimes over the particle axis.

Using these values for the quenching factors, the decays of the particles can be fitted by varying the values for the apparent radiative lifetime $\tau_R$ and C. Good fits were obtained for LaPO$_4$:Eu and LaF$_3$:Eu particles (FIG. 12, solid lines). In these fits the luminescence of the $^5D_1$ level is not taken into account. Emission from this level contributes only very little to the total emission, but it could have a small influence on the obtained values.

For LaPO$_4$:Eu particles in methanol, the value for $\tau_R$ is 7.0 ms with a quenching constant of $4.1 \cdot 10^{-2}$ s$^{-1}$. In the case of LaF$_3$:Eu particles in dichloromethane, the $\tau_R$ is 7.7 ms with a quenching constant of $2.9 \cdot 10^{-1}$ s$^{-1}$. These results show that the apparent radiative lifetime of Eu$^{3+}$ in LaF$_3$ is longer than in LaPO$_4$ conform the literature, but that the ion is quenched more strongly in the LaF$_3$ particles than in the LaPO$_4$ particles. The difference in solvent does not explain the difference in quenching strength, because methanol is a stronger quenching solvent than dichloromethane due to the presence of an O—H bond. The different termination of the surface can be the reason for a different quenching strength. The LaPO$_4$ particles are terminated with phosphate groups, but the LaF$_3$ particles are terminated with Ln$^{3+}$ groups. This means that in the case of LaF$_3$ particles the luminescent ion can directly coordinate to a quenching group of the organic environment or the ligand, which is not the case for the LaPO$_4$ particles. One other possible source of quenching is the coordination of water to the surface of the particles. It has been shown that the lifetime of LaF$_3$:Eu particles is longer when the particles are synthesized in deuterated solvents proving that residual OH groups are present after the synthesis and act as quenchers. When this product was stirred in a water/methanol mixture the lifetime of Eu$^{3+}$ went back to the value for particles synthesized in non-deuterated solvent, proving that the OH groups are at the surface of the particles and accessible to the solvent. The LaPO$_4$ particles are synthesized under near water free conditions and any water present will be used in the hydrolysis of the solvent so contamination with water is probably less important. The apparent radiative lifetimes ($\tau_R=1/k_R$) do not necessarily relate to the real radiative lifetime, because quenching inside the particle is not taken into account in this model. However, the high values do indicate that quenching inside the particle is not significant. The size dispersity of the particles is in the quenching constant C, so the values of C for LaF$_3$ and LaPO$_4$ particles cannot be compared directly with each other. FIG. 12 shows the variation of the lifetime $\tau i$ in the different particle shells. As expected the longest lifetimes are observed in the core of the particles and going to the surface of the particles the lifetime decreases consistent with quenching by the solvent. Because the total luminescence is the area under the decay curve, an average lifetime of these ten values can be calculated using the following equation:.

$$\tau_{av} = \frac{\sum A_i \tau_i^2}{\sum A_i \tau_i}$$

For LaF$_3$:Eu an average lifetime of 6.5 ms is calculated and for LaPO$_4$:Eu particles an average lifetime of 6.6 ms. The values for these materials are close to the radiative lifetimes calculated and measured previously for the bulk materials, but unfortunately it is not possible to compare them directly to these radiative lifetimes, because the nanoparticles are in another solvent. However, they do indicate a high quantum yield.

EXAMPLE 8

Figure 15:
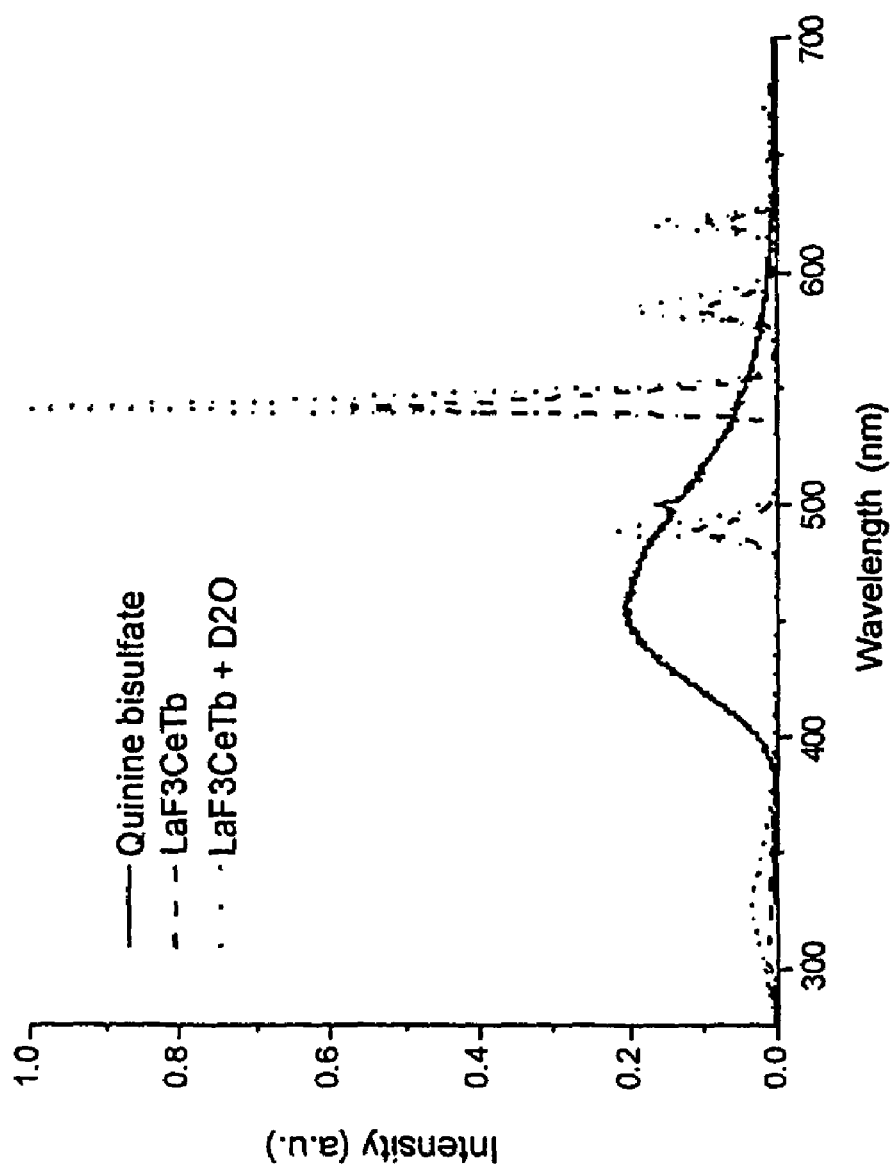
FIG. 15: Emission spectra of $LaF_3$:Ce, Tb particles in $CH_2Cl_2$ and quinine bisulfate dissolved in 1M $H_2SO_4$ ($\lambda_{ex.}$ 282 nm).

Quantum yield. A quantum yield of these lanthanide-doped particles can be determined using Ce$^{3+}$ doped particles.[1] Ce$^{3+}$ has a high absorption between 200-300 nm because of an allowed 4f-5d transition. It is known that $Ce^{3+}$ shows efficient energy transfer to $Tb^{3+}$, which emits in the visible and from particles doped with both these ions it is possible to determine the quantum yield by comparison with a dye. We determined the quantum yield by using quinine bisulfate in $1M\,H_2SO_4$ as standard. For $La_{0.4}Ce_{0.45}PO_4Tb_{0.15}$ a quantum yield of 10% in methanol was found, lower than the value of 24% found by Haase and co-workers. The value found by Haase et al. herein incorporated by reference (K. Riwotzki, H. Meyssamy, H. Schnablegger, A. Kornowski, M. Haase, *Angew. Chem. Int. Ed.* 2001, 40, 573),was measured using Rodamine 6G and when we used this dye a quantum yield of 21% was found, which is within the experimental error of about 2% (absolute). The value found using quinine bisulfate is probably more reliable, because this dye is more suitable for excitation in the UV. The Rodamine 6G dye has a low absorption at the excitation wavelength and much overlap between emission and absorption so at higher concentration re-absorption of emission could occur leading to an overestimation of the quantum yield. The emission and absorption of quinine bisulfate have very little overlap so self-quenching at higher concentrations does not take place. It was also possible to synthesize $La_{0.4}Ce_{0.45}F_3Tb_{0.15}$ particles and the emission spectrum is shown in FIG. 15 together with the emission spectrum of quinine bisulfate.

For $La_{0.4}Ce_{0.45}F_3Tb_{0.15}$ in dichloromethane a quantum yield of 19% was found. When $D_2O$ was added to a dichloromethane solution of $LaCeF_3Tb$ particles an increase in quantum yield to 38% was observed. This confirms the coordination of a small amount of water to the surface of the particles leading to quenching of the excited state of the lanthanide ions. The high-energy vibrations of water molecules effectively quench the excited state of the lanthanide ions and this can be reduced by an exchange with deuterium because of the lower vibrational energy of the OD bond. This coordination of water is in full agreement with previous results where particles of $LaF_3$:Eu were synthesized in deuterated solvents, leading to an increase in the luminescence lifetime.

EXAMPLE 9

Figure 16:
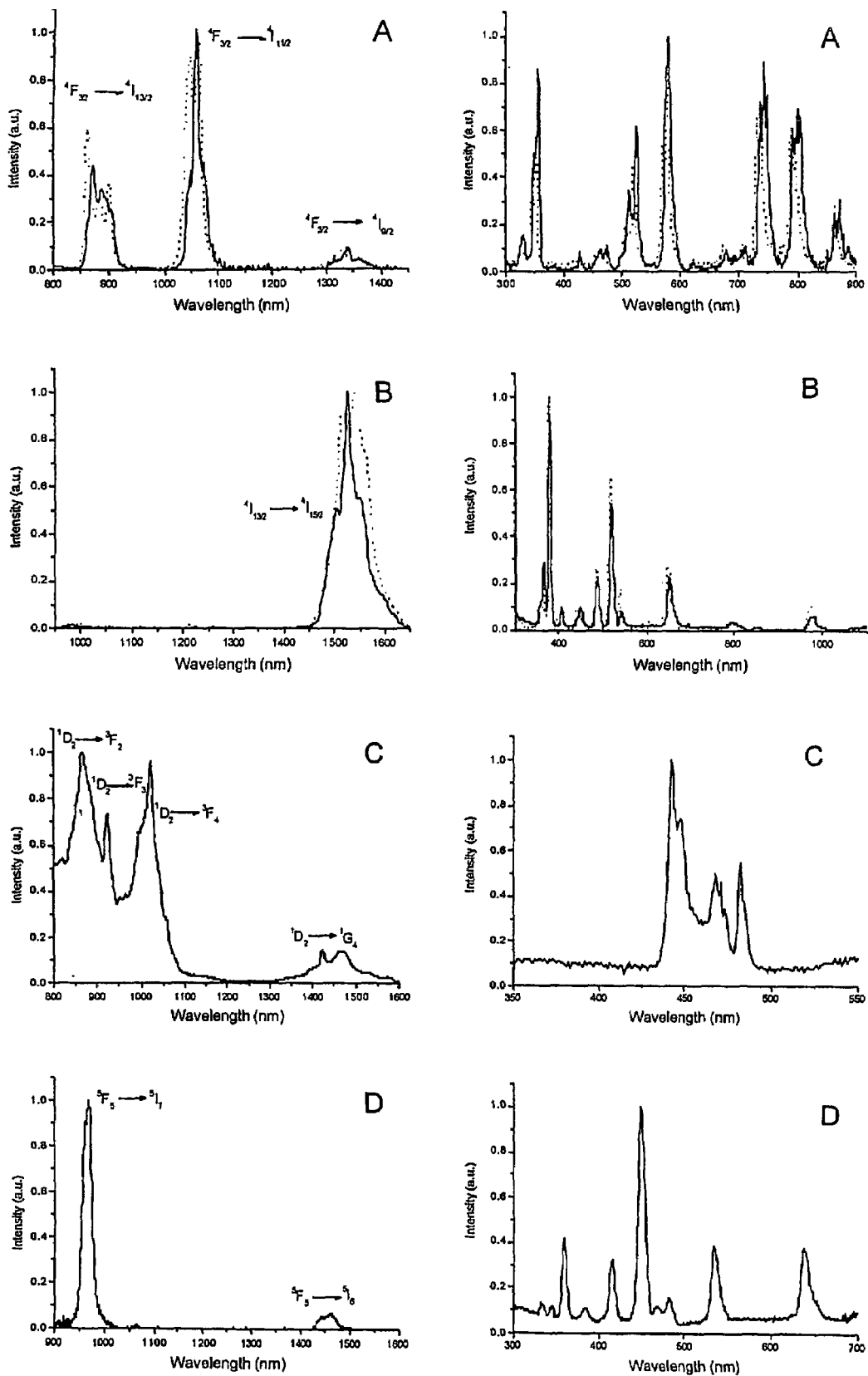
FIG. 16: Emission (left) and excitation (right) spectra of (A) $LaF_3$:Nd (dotted line), $LaPO_4$:Nd (solid line) (B)$LaF_3$:Er (dotted line), $LaPO_4$:Er (solid line) (C) $LaPO_4$:Pr and (D) $LaF_3$:Ho. The $LaF_3$ particles were dissolved in $CH_2Cl_2$ and the $LaPO_4$ particles in methanol-d4. The emission spectra of the $Nd^{3+}$ doped particles were collected after excitation at 514 nm and the excitation spectra by collecting the emission at 1060 nm. The $Er^{3+}$ doped particles were excited at 488 nm and the emission measured at 1530 nm. For $Pr^{3+}$ and $Ho^{3+}$ the excitation was at 476 and 448 nm, respectively, and the emission at 730 nm and 966 nm respectively. Emission (top) and excitation (bottom) spectra of $LaPO_4$:Yb particles in methanol.

Near-infrared emission. Particles of $LaPO_4$ and $LaF_3$ were also doped with the NIR emitting ions $Nd^{3+}$, $Er^{3+}$, $Pr^{3+}$, and $Ho^{3+}$. Luminescence spectra of these ions are shown in FIG. 16.

The luminescence spectra of $Nd^{3+}$ in both particles show the typical emission at 880, 1060 and 1330 of the $^4F_{3/2} \to {}^4I_{13/2}$, $^4F_{3/2} \to {}^4I_{11/2}$ and $^4F_{3/2} \to {}^4I_{9/2}$ transitions, respectively The emission spectrum measured for $LaF_3$:Nd looks very similar to the spectrum measured in a $Nd^{3+}$ doped $LaF_3$ thin film. The emissions are almost the same for both types of particles, showing only slightly different splitting of the emission peaks, indicative of a different symmetry around the luminescent ion, similar to that found for the $Eu^{3+}$ ion. However, the differences in the luminescence spectra are smaller than for $Eu^{3+}$, because $Eu^{3+}$ is much more sensitive to the symmetry of the crystal site than the other lanthanide ions. The excitation spectra for both particles also look very similar and are comparable with the absorption lines of the $Nd^{3+}$ ion in solution. The wavelength positions of the peaks do not change, only the peak splitting and the ratio between peak intensities differ. $Er^{3+}$-doped materials show typical luminescence at 1530 nm of the $^4I_{13/2} \to {}^4I_{15/2}$ transition in both particles with a small difference in the shape and the width of the emission peak caused by a difference in crystal symmetry. The emission of the $LaF_3$:Er particles again looks very similar to the emission spectrum of an $Er^{3+}$-doped $LaF_3$ thin film. For the $LaPO_4$ host, a small emission is observed at 980 nm of the $^4I_{11/2} \to {}^4I_{15/2}$ transition, which is not visible in the $LaF_3$ host, probably because of symmetry reasons. The excitation spectra are very similar for both particles, showing small differences in peak intensities caused by symmetry differences. For the $Pr^{3+}$ ion, luminescence can originate from different levels depending on the crystal field and on the quenching mechanisms. Luminescence originating from the $^1D_2$ level was observed in $LaPO_4$:Pr particles by excitation with the 476 nm line of an $Ar^+$ laser. When the $LaF_3$:Pr particles were excited using the same laser line, no emission was observed, although it is known that the $Pr^{3+}$ ion can emit very efficiently in this host matrix. It is possible that $Pr^{3+}$ does not absorb at this wavelength in the $LaF_3$ host or that the $Pr^{3+}$ ion is very sensitive to the small amount of water present at the surface of the LaF3. Under excitation with an Xe arc lamp at 443 nm, the emission of $LaPO_4$:Pr could also be detected, but only weak emission was observed for $LaF_3$:Pr particles. For the $Ho^{3+}$ ion, emission could be detected in the $LaF_3$:Ho particles at 960 and 1460 nm from the $^5F_5 \to {}^5I_7$ and $^5F_5 \to {}^5I_6$ transitions. In the visible, an emission of the $^5F_5 \to {}^5I_8$ transition at 640 nm was also observed. In this host, $Ho^{3+}$ luminescence is known to occur from a variety of levels. The dominant luminescence found in the bulk material is from the $^5S_2$ level at 540 nm, which is, however, not observed in our nanoparticles. A reason for this can be that this level lies approximately 3000 $cm^{-1}$ above the $^5F_5$ level which corresponds to the vibrational energy of a CH bond. The presence of the ligands on the surface of the particle could lead to a fast non-radiative decay of the $^5S_2$ level to the $^5F_5$ level from which luminescence occurs. The $LaPO_4$:Ho particles did not show any luminescence at all. $Ho^{3+}$ emission in $LaPO_4$ crystals is not reported in the literature probably because the phonon energies in $LaPO_4$ are too high, leading to relatively efficient non-radiative processes. NIR emission of $Pr^{3+}$ and $Ho^{3+}$ in an organic environment has not been reported until now, proving the good shielding against the organic groups when they are doped in the nanoparticles. Using these ions the spectral window between 1300-1600 nm, which is of interest to telecommunication purposes, can be covered completely.

EXAMPLE 10

Figure 17:
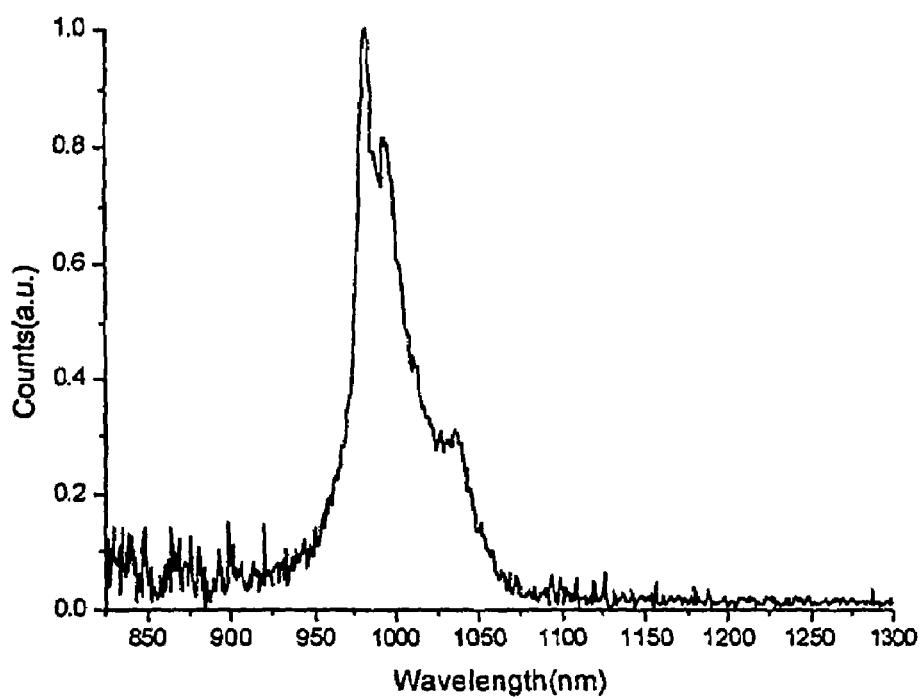
FIG. 17: Emission $\lambda_{ex.}$ 250 nm (top) and $\lambda_{ex.}$ 378 nm (middle) spectra of $LaPO_4$:Yb, Er particles in methanol. The bottom picture shows the excitation spectrum of the same sample collecting the emission at 1530 nm.
Figure 17:
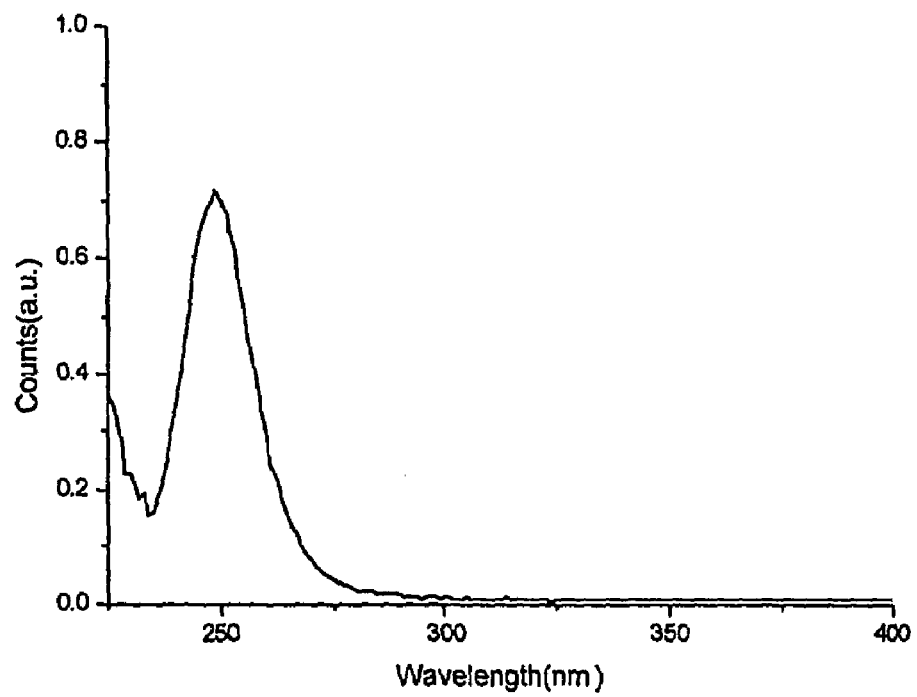

$Yb^{3+}$ as a sensitizer. To increase the effective absorption of the $Er^{3+}$ ion, co-doping with $Yb^{3+}$ is often used. $Yb^{3+}$ has a higher absorption at 980 nm than $Er^{3+}$ and it is able to transfer energy to the $Er^{3+}$ ion. The 980 nm wavelength is commonly used for pumping $Er^{3+}$ ions because at this wavelength a large variety of cheap semi-conductor pump lasers are available. $Yb^{3+}$ also has a low reduction potential leading to charge transfer bands in phosphates, similar to $Eu^{3+}$, so the possibility of a charge transfer in $LaPO_4$ particles was investigated. The emission and excitation spectra of a sample of $LaPO_4$:Yb in methanol is shown in FIG. 17.

In the excitation spectrum a broad band peaking at 250 nm observed. Excitation of the sample at this wavelength leads to typical $Yb^{3+}$ emission peaking at 980 nm. The only excited 4f level of $Yb^{3+}$ is the $^2F_{5/2}$ level, so the broad band at 250 nm is caused by charge transfer excitation. The peak of this charge transfer emission is blue shifted compared to $Eu^{3+}$ reflecting the higher reduction potential of $Yb^{3+}$ compared to $Eu^{3+}$.

Figure 18:
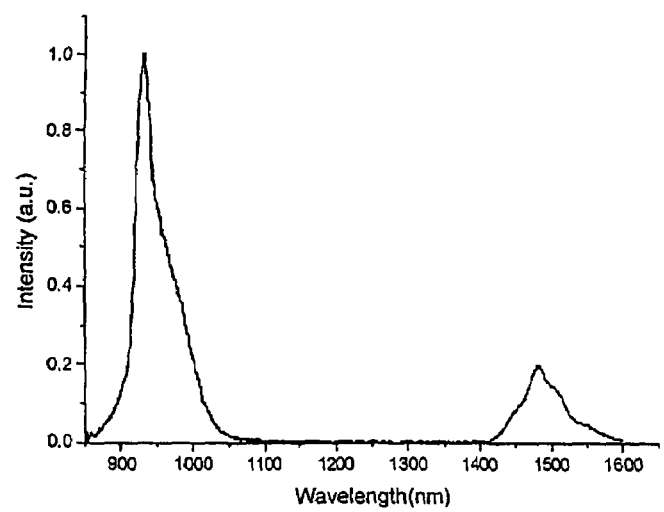
FIG. 18: Emission $\lambda_{ex.}$ 250 nm (top) and $\lambda_{ex.}$ 378 nm (middle) spectra of $LaPO_4$:Yb, Er particles in methanol. The bottom picture shows the excitation spectrum of the same sample collecting the emission at 1530 nm.
Figure 18:
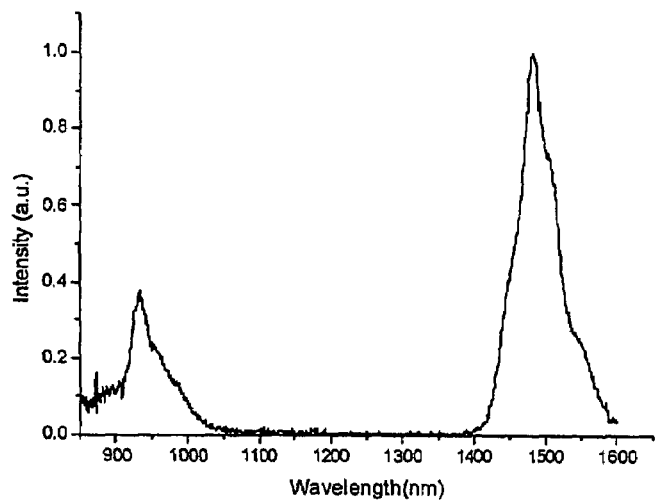
Figure 18:
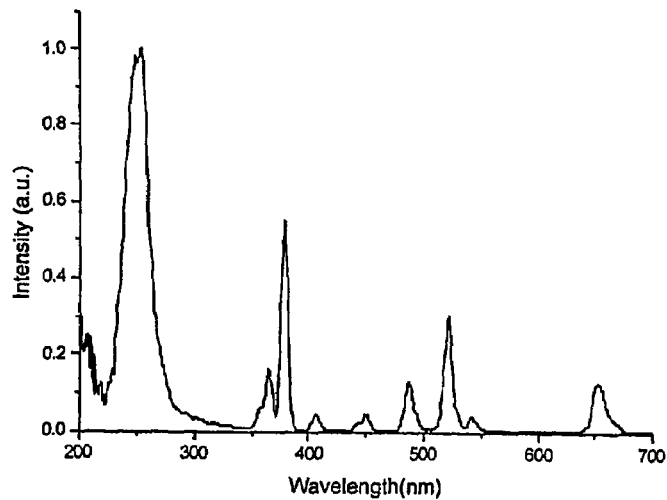

The emission and excitation spectra of $LaPO_4$ particles co-doped with 5% of each of $Yb^{3+}$ and $Er^{3+}$ are shown in FIG. 18.

The absorption lines of $Er^{3+}$ and a broad band peaking at 250 nm are visible in the excitation spectrum. The presence of this broad band is caused by charge transfer excitation of $Yb^{3+}$ followed by energy transfer to $Er^{3+}$. When the sample was excited in the broad band at 250 nm emission at 980 nm from $Yb^{3+}$ and at 1530 nm from $Er^{3+}$ was observed. The appearance of $Yb^{3+}$ emission means that energy transfer is not complete. The direct excitation of $Er^{3+}$ at 378 nm leads to $Er^{3+}$ emission at 1530 nm as expected, but also $Yb^{3+}$ emission at 980 nm is observed, showing that energy transfer from $Er^{3+}$ to $Yb^{3+}$ is also possible. This reverse process needs phonon energy from the surroundings because the $^4I_{11/2}$ energy level of $Er^{3+}$ lies a bit lower in energy than the $^2F_{5/2}$ level of $Yb^{3+}$. In $LaF_3$ particles energy transfer between $Yb^{3+}$ and $Er^{3+}$ is also observed after direct excitation of $Yb^{3+}$ into the $^2F_{5/2}$ level around 980 nm. In this matrix no charge transfer band is observed, similar to $Eu^{3+}$. Particles of $LaF_3$ co-doped with various amounts $Yb^{3+}$ and 5% $Er^{3+}$ were synthesized and the luminescence properties were determined in order to optimize the energy transfer.

Figure 19:
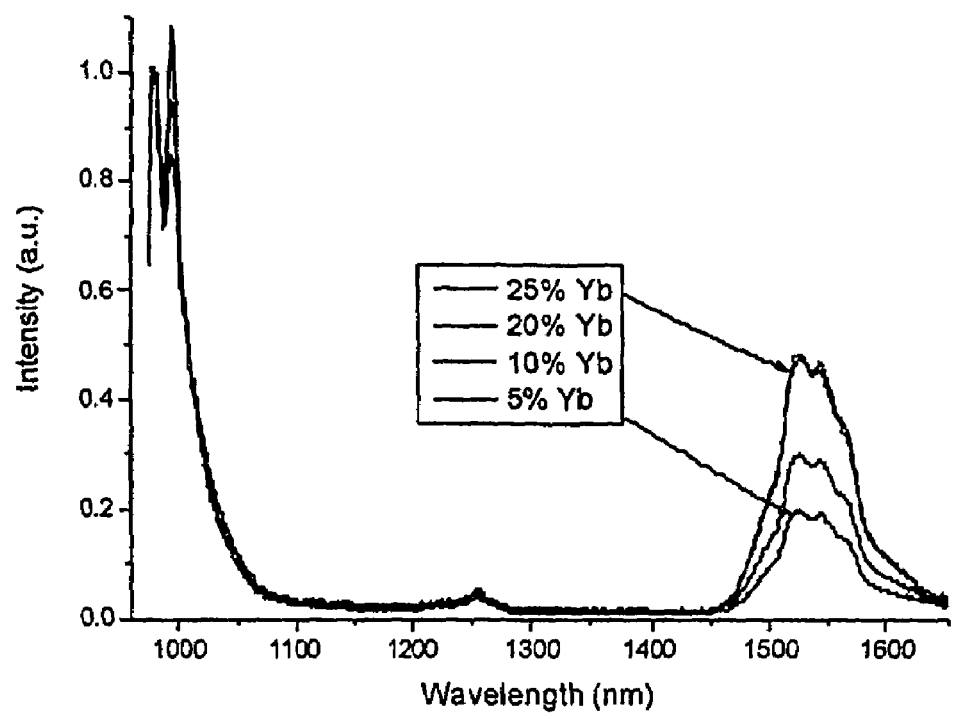
FIG. 19: Emission spectra (top) and excitation spectra (bottom) of $LaF_3$:Yb, Er with 5% $Er^{3+}$ and different amounts of $Yb^{3+}$. The particles were dissolved in $CH_2Cl_2$.
Figure 19:
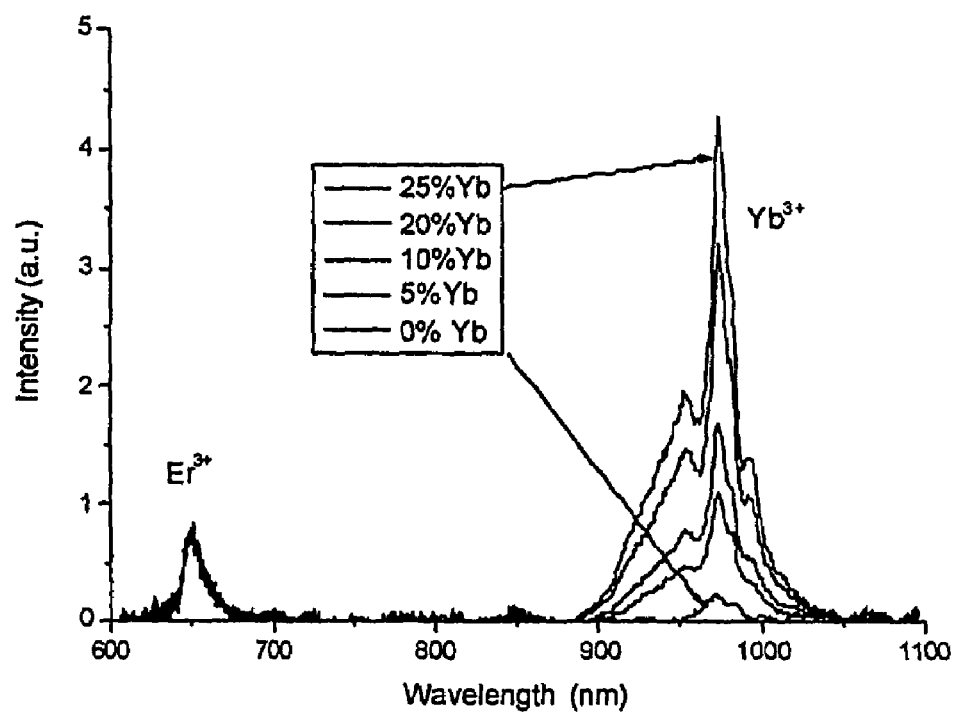

The emission spectra of $LaF_3$ particles doped with a varying amount of $Yb^{3+}$ and 5% $Er^{3+}$ excited at 940 nm are shown in FIG. 19. The emission spectra are normalized to the $Yb^{3+}$ emission. Excitation at 940 nm was chosen because $Er^{3+}$ has no absorption at this wavelength, so all emission from $Er^{3+}$ is formed through sensitized emission by $Yb^{3+}$. At 1530 nm, $Er^{3+}$ emission is clearly observed, proving the energy transfer between the ions. The $Yb^{3+}$ emission at 980 nm is still dominating, so energy transfer is not complete. By increasing the amount of $Yb^{3+}$ the relative $Er^{3+}$ emission increases, so the energy transfer becomes more efficient up to a doping concentration of 20% $Yb^{3+}$ where the maximum energy transfer is reached. Increasing the concentration of $Yb^{3+}$ above 25% does not increase the energy transfer further. At increasing $Yb^{3+}$ concentration the energy transfer becomes more efficient because the average distance between the ions decreases. It levels off when all the $Er^{3+}$ ions have at least one $Yb^{3+}$ ion as the nearest neighbor. The excitation spectra of $Er^{3+}$ luminescence at 1530 nm for samples doped with different amounts of $Yb^{3+}$ are also shown in FIG. 19. The excitation spectra are scaled to the $Er^{3+}$ absorption peak at 650 nm, because the amount of $Er^{3+}$ in the sample is constant. It can be seen that the excitation peak of $Er^{3+}$ in the sample without $Yb^{3+}$ around 980 nm is very low and that it can be increased by co-doping with $Yb3+$. Increasing the amount of $Yb^{3+}$ leads to a linear increase of the $Yb^{3+}$ peak compared to the $Er^{3+}$ peak, because more energy is absorbed by $Yb^{3+}$ ions. It was reported in the literature that energy transfer from $Yb^{3+}$ to $Er^{3+}$ in $Y_2O_2S$ nanoparticles is less efficient than in bulk material, because of the absence of low energy phonons. These low energy phonons are required to take up the small energy released when the excitation energy is transferred from $Yb^{3+}$ to $Er3+$. In the present case, in which the nanoparticles are capped with organic molecules these low energy phonons are present in the form of vibrational and rotational energies, thus facilitating a more efficient energy transfer.

EXAMPLE 11

Figure 20A:
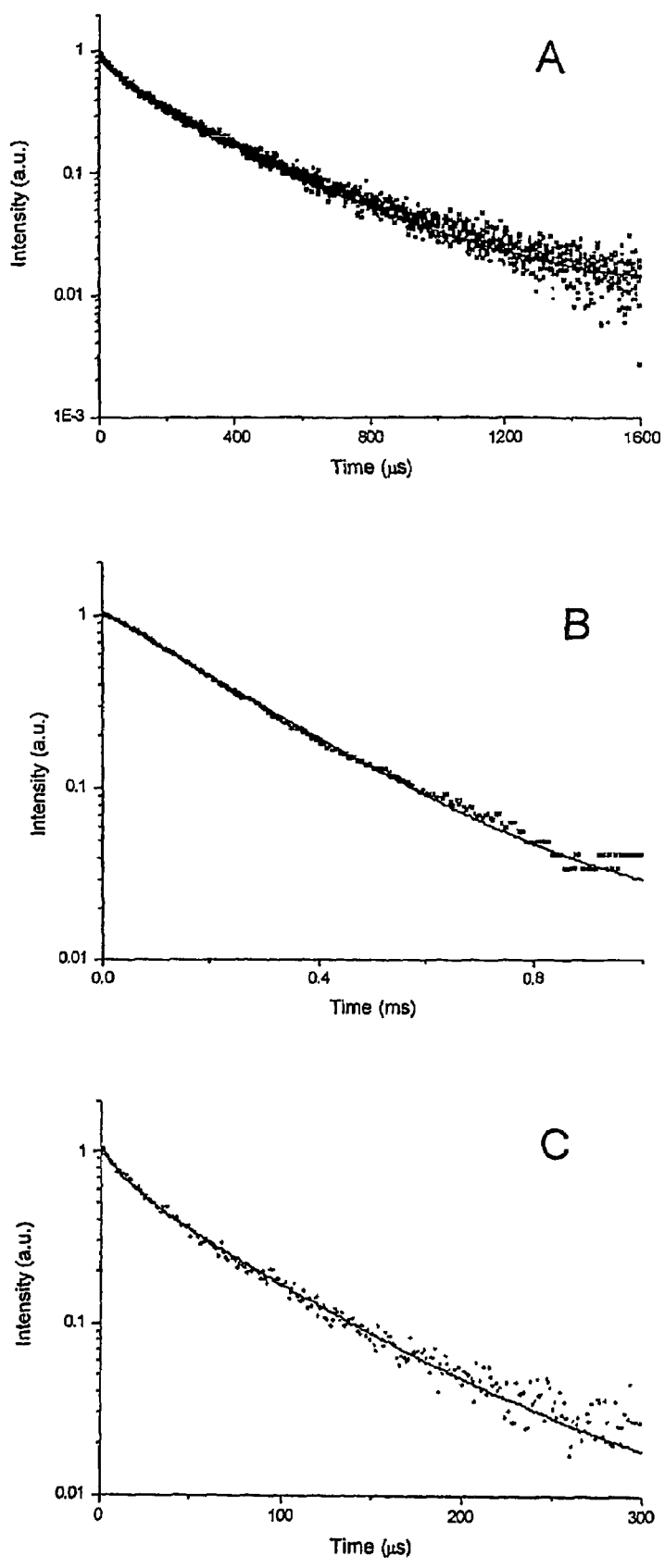
FIGS. 20A & B: Optical gain of a $LaF_3$:Nd doped polymer waveguide as a function of pump-power for a 10×10 μm channel pumped at 795 nm.
Figure 20B:
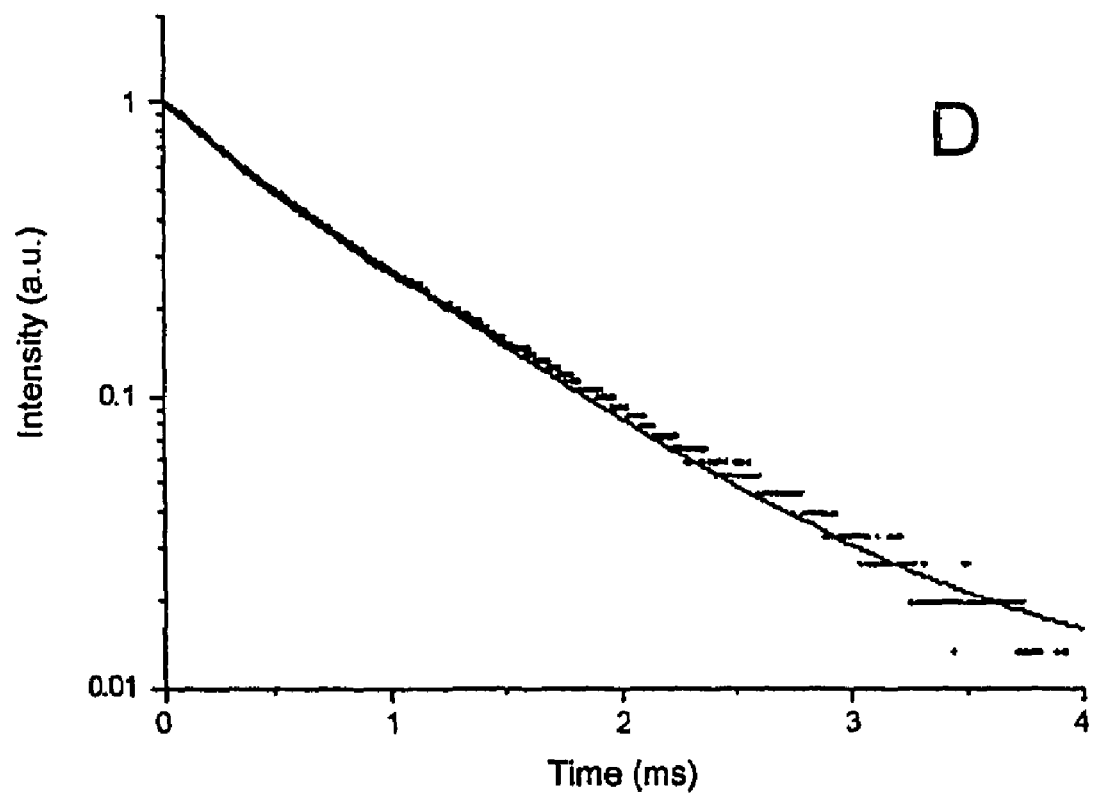

Decays of near-infrared emitting ions. Luminescence decays of NIR emitting ions could also be fitted using the model described above. Some decays with fits are shown in FIG. 20A&B. Table 3 gives the values of the fit constants $\tau_R$ and C.

TABLE 3

Fit parameters for the NIR emitting ions in the two different particles.[a]

| Particle | Solvent | $\tau_R$ (μs) | C(s$^{-1}$) | $\tau_{av}$ (μs) |
|---|---|---|---|---|
| $LaPO_4$: Nd | $CD_3OD$ | 90 | 107 | 68 |
| $LaF_3$: Nd | $CH_2Cl_2$ | 347 | 23.5 | 265 |
| $LaPO_4$: Er | $CD_3OD$ | 315 | 4.66 | 304 |
| $LaF_3$: Er | $CH_2Cl_2$ | 236 | 3.29 | 226 |
| $LaPO_4$: Pr | $CD_3OD$ | 4.0 | 57.3 | 3.7 |
| $LaF_3$: Ho | $CH_2Cl_2$ | 35 | 27 | 31 |

[a]All doping concentrations were 5%. The errors in $\tau_R$ are ≈3% and in C ≈10% determined The luminescence lifetimes reported for $Er^{3+}$ and $Nd^{3+}$ are very long compared to values reported previously in organic environment. An increase in the luminescence lifetime by a factor 10-1000 is observed. For $Nd^{3+}$ the values of the average lifetime and $\tau_R$ are higher for $LaF_3$ than for $LaPO_4$ reflecting the difference in the phonon energies of the matrices. This is the other way around for $Er^{3+}$. Both the value of $\tau_R$ and the average lifetimes are lower for the $LaF_3$:Er particles compared to the $LaPO_4$:Er particles. Not only is the quenching stronger, but the lower $\tau_R$ indicates that there are more quenching possibilities for $Er^{3+}$ remaining inside the particles. This can be a result of the higher reaction temperature for the $LaPO_4$ particles, which functions as a better annealing step compared to the $LaF_3$ particles. The average lifetimes of $Pr^{3+}$ and $Ho^{3+}$ are in the μs range reflecting the shorter radiative lifetimes of these ions. For $Pr^{3+}$ in a phosphate host, a lifetime of 70 μs for the $^1D_2$ level was reported in the literature and for $Ho^{3+}$ in $LaF_3$, a lifetime of the $^5F_5$ level of 780 μs was calculated.

Using the described model, different factors influencing the luminescence lifetimes of these particles were investigated. $Er^{3+}$ usually shows a large dependence on the doping concentration and when the particles are doped with different concentrations of $Er^{3+}$ this is indeed reflected in the values of $\tau_r$ and C (Table 4).

TABLE 4

Fit parameters for $LaF_3$: Er and $LaPO_4$: Er at different doping concentrations.[a]

| | $LaF_3$: Er | | $LaPO_4$: Er | |
|---|---|---|---|---|
| Concentration | $\tau_R$(μs) | C(s$^{-1}$) | $\tau_R$(μs) | C(s$^{-1}$) |
| 5% | 236 | 3.29 | 315 | 4.66 |
| 2% | 332 | 3.73 | 758 | 4.27 |
| 1% | 465 | 3.54 | 1070 | 2.92 |

[a]The errors in $\tau_R$ are ≈3% and in C ≈10% determined from duplicate measurements A decrease in $Er^{3+}$ concentration should not change the quenching constant C because the $Er^{3+}$ ions are still in the same crystal site and at the same average distance to the surface. $\tau_R$ should increase with a decreasing doping concentration because quenching processes like cross-relaxation and up-conversion become less important. This is clearly observed in the fitted values for $LaF_3$:Er with different $Er^{3+}$ concentrations. A pronounced increase in $\tau_R$ is observed when the concentration is lowered, while the C stays about the same for the concentrations used here. For the $LaPO_4$:Er particles the constant C does change and becomes lower at a lower doping concentration. The different surface termination of the particles can play a role here. One quenching path is the transfer of the excitation energy of ions in the core of the particles to ions closer to the surface followed by quenching. This process is dependent on the concentration of the doping ion, because energy transfer becomes more efficient at higher doping concentrations, but also on the surface termination. In the $LaF_3$ particles lanthanide ions are coordinated directly to the ligand and other possible quenchers, but in the case of the $LaPO_4$ particles $PO_4$ groups are at the surface. In addition, quenching by solvents with a different quenching strength can be described using this model. Fit values obtained for $LaPO_4$:Nd and $LaPO_4$:Eu in methanol with a different degree of deuteration are given in Table 5.

TABLE 5

Fit parameters for $LaPO_4$: Nd and $LaPO_4$: Eu in methanol with different degrees of deuteration.[a]

| Solvent | $Nd^{3+}$ | | $Eu^{3+}$ | |
| --- | --- | --- | --- | --- |
| | $\tau_R(\mu s)$ | $C(s^{-1})$ | $\tau_R(ms)$ | $C(s^{-1})$ |
| $CH_3OH$ | 87 | 733 | 7.0 | $4.06\ 10^{-2}$ |
| $CH_3OD$ | 91 | 214 | 6.9 | $1.18\ 10^{-2}$ |
| $CD_3OD$ | 90 | 107 | 6.9 | $1.31\ 10^{-2}$ |

The errors in $\tau R$ are ≈3% and in C ≈10% determined from duplicate measurements For all particles the same $\tau_R$ is found in agreement with the fact that the particle itself does not change. The C constants are different, as expected. A small quenching constant is found for the $Eu^{3+}$ ions, because the energy gap of $Eu^{3+}$ is relatively large and it is therefore less sensitive to quenching. In non-deuterated methanol the strongest quencher is the OH group and replacing this with an OD group leads to a large decrease in C. Replacement of the CH group by CD leads to another small decrease in quenching in the case of $Nd^{3+}$, but in the case of $Eu^{3+}$ the effect is negligible consistent with the larger energy gap between the excited state and the ground state for $Eu^{3+}$.

One factor not included in the model is the difference in refractive index between the core and the surrounding solvent. The radiative lifetime of the lanthanide ion is dependent on the refractive index of the surroundings and it was previously found that particles in solvents with a different refractive index show a different luminescence lifetime. The average lifetime for $LaF_3$:Eu particles dissolved in different solvents increased from 6.1 ms in a refractive index of 1.525 to a average lifetime of 7.3 ms in a solvent with a refractive index of 1.352. The effect of the refractive index on the luminescence lifetimes of a bi-exponential fit was primarily seen on the long component of the two lifetimes, not on the short one. The short component is mostly determined by surface quenching and for this reason the effect of the refractive index on the results of the model will be small, except for changing the $\tau_R$.

Another refinement of the model will be to take into account the size and size distribution of the particles. The size and size distribution is currently taken up by the constant C, averaging all the sizes in one batch. By taking into account the size and size distribution we could look systematically at the effect of different particle sizes on the luminescent lifetime.

EXAMPLE 12

Figure 21:
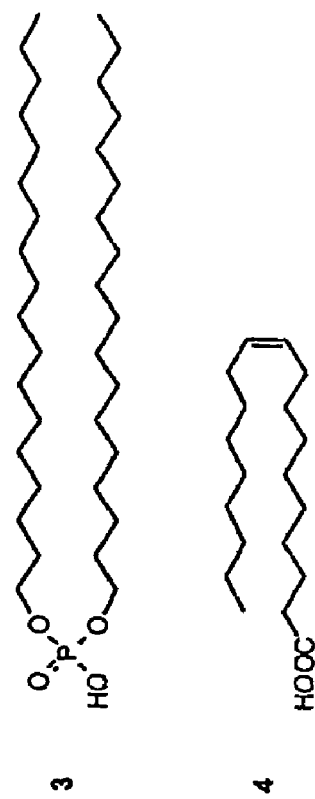
FIG. 21 Ligands used in the synthesis and for the exchange of $LaF_3$ nanoparticles
Figure 21:
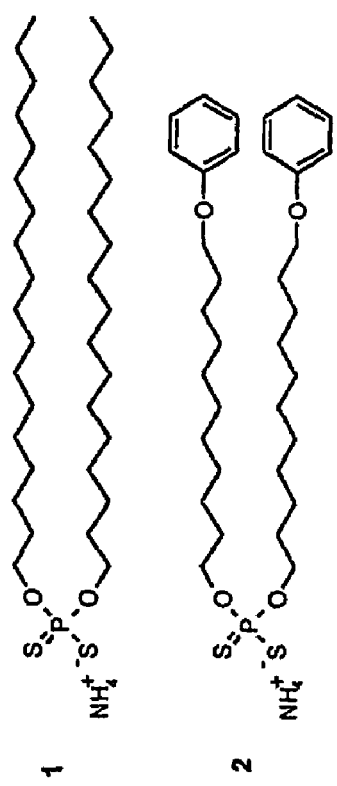

Surface modification of $LaF_3$ nanoparticles. One way of substituting a ligand for another ligand is by an exchange reaction. The $LaF_3$ nanoparticles were synthesized with ligands 1 and 2 in FIG. 21 as described above. These ligands have a dithiophosphate headgroup, which binds mildly to the nanoparticle surface, to allow the growth of the nanoparticles and coordinates strong enough to prevent aggregation of the nanoparticles. Oxygen bearing coordinating groups have a higher binding affinity towards lanthanide ions and examples of these ligands would be dioctadecyl phosphate and oleic acid (ligands 3 and 4) in FIG. 21, with a phosphate group or a carboxylic acid group.

Figure 22:
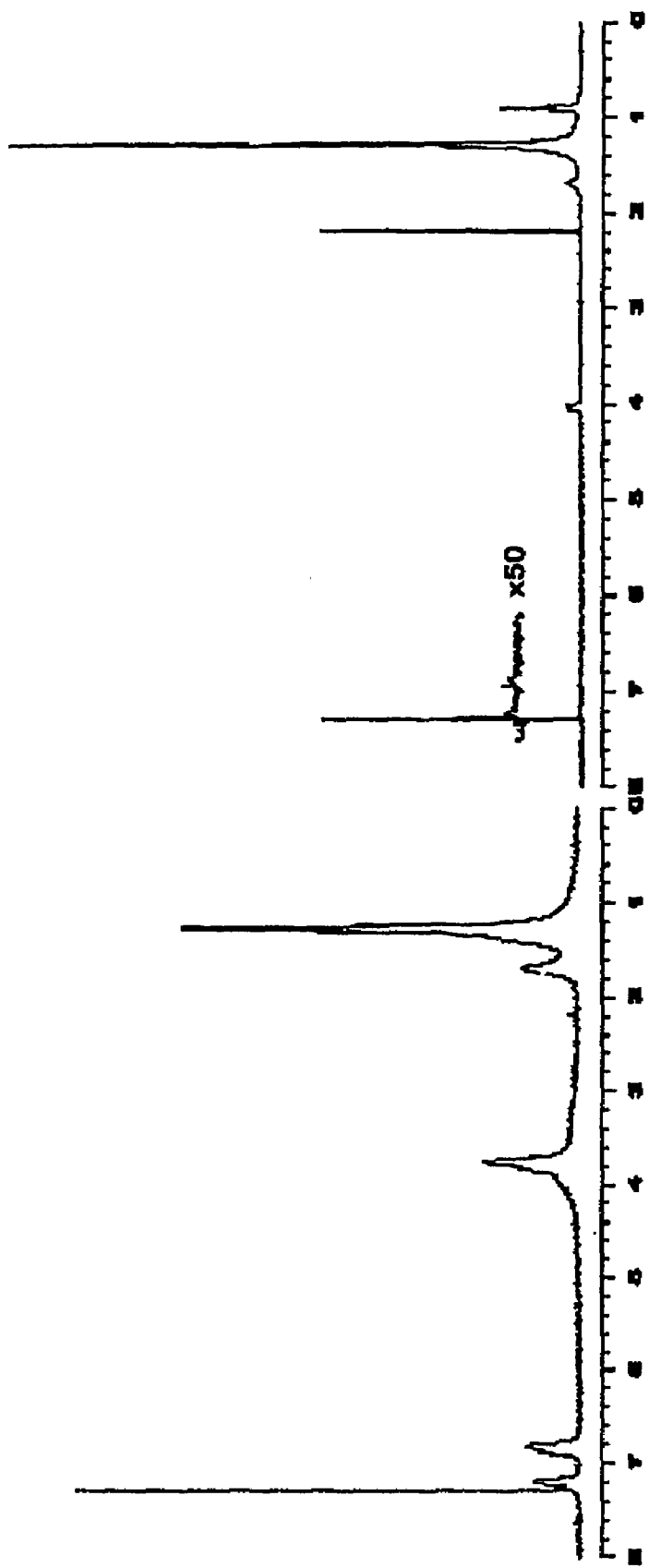
FIG. 22: $^1$H NMR spectra of $LaF_3$ nanoparticles synthesized with ligand 2 (left) and after exchange with ligand 3 (right).

The ligands used in the synthesis were exchanged by stirring a nanoparticle solution with ligand 3 or 4 and a small amount of base to ensure the deprotonation of the coordinating group. The exchange reaction of these ligands on the nanoparticles can be monitored using $^1H$ NMR. FIG. 22 shows the result of nanoparticles synthesized with ligand 2 and exchanged with the phosphate ligand 3.

Figure 23:
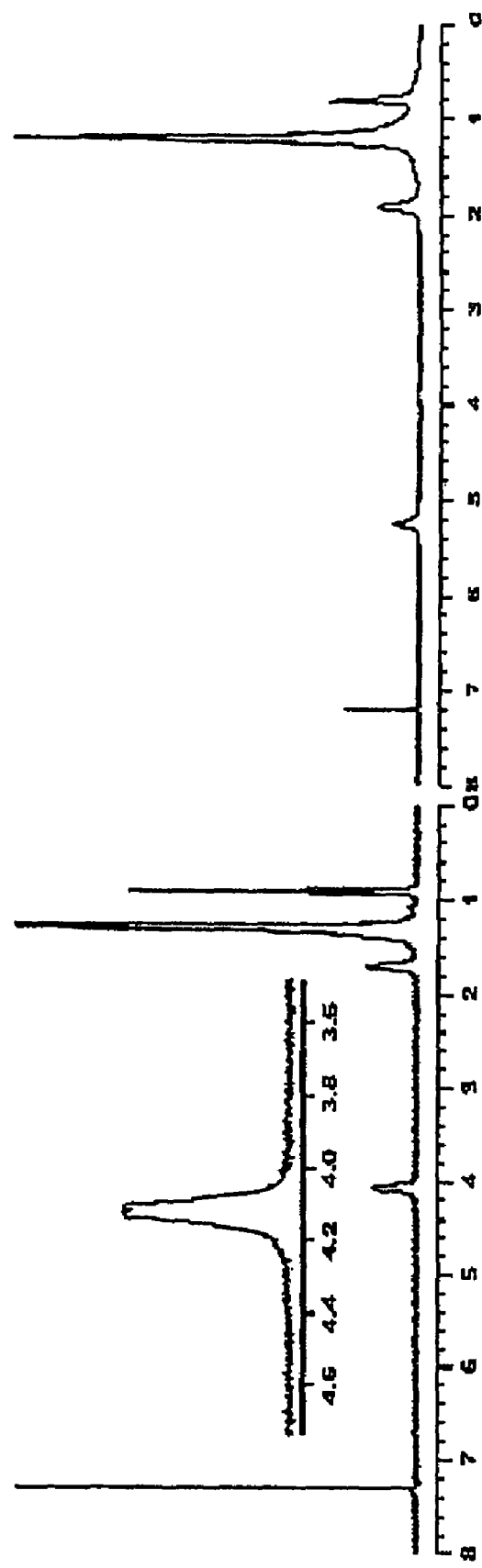
FIG. 23: $^1$H NMR spectrum of $LaF_3$ nanoparticles synthesized with ligand 1 before (left) and after (right) the exchange with oleic acid. The left picture shows an enlargement of the broad peak of the protons next to the dithiophosphate group.

The $^1H$ NMR of the nanoparticles obtained after the synthesis show broadened signals of the ligand due to coordination of the ligand to the nanoparticle surface. This broadening of the NMR signals of nanoparticle bound ligands can be ascribed to the inhomogeneous distribution of the magnetic environment around the nanoparticle and a reduction in rotational freedom of the ligand. No free ligand is present, because no sharp signals are observed for unbound ligand in solution. A complete exchange of the dithiophoshate ligand is accomplished as can be seen in the $^1H$ NMR spectrum of the exchanged product. The aromatic proton signals at 6.8 and 7.2 ppm of the dithiophosphate ligand have disappeared and the triplet of the $CH_3$ terminal group of the phosphate ligand is present at 0.9 ppm. The ligand exchange is accompanied by a small change in solubility. Before the exchange the nanoparticles were not soluble in apolar aliphatic solvents like hexane or pentane, but after the exchange they were. This is a confirmation that before the exchange the surface of the nanoparticles consists of the aromatic groups of the ligand making the nanoparticles soluble in aromatic solvents like toluene. After the exchange the surface of the nanoparticles consists of the $CH_3$ groups making the nanoparticles also soluble in hexane and pentane. FIG. 23 shows the $^1H$ NMR spectrum of $LaF_3$ nanoparticles synthesized with ligand 1, before and after the exchange with an excess of oleic acid. The ligands all contain long alkyl chains and in the proton spectrum these are mainly located between 0.9 and 2 ppm. It is difficult to observe changes in this region of the spectrum except for changes in the integrals. Protons next to the functional groups are shifted downfield and can be used to follow the exchange reaction.

The left spectrum shows the nanoparticles with ligand 1. This spectrum has a characteristic double triplet at 4.1 ppm of the protons next to the phosphor atom, but on the nanoparticles the signal is broadened and only a single broad peak is observed, as can be seen in the enlargement. The spectrum on the right shows the broadened signals of the oleic acid ligand coordinated to the surface of the nanoparticles after the exchange reaction. The exchange is complete, because the signal of ligand 1 at 4.1 ppm is absent and a peak of oleic acid at 5.2 ppm of the protons on the double bond is observed. These results confirm that the ligand used in the synthesis of $LaF_3$ nanoparticles can be exchanged completely for another ligand with a stronger binding coordinating group. This provides a straightforward method for the introduction of functional groups at the surface of the nanoparticles. The stability of the nanoparticles was not much influenced. Apparently the coordination of the ligand to the nanoparticle surface is not the limiting factor for the stability, but the size of the hydrocarbon tails is.

Figure 24:
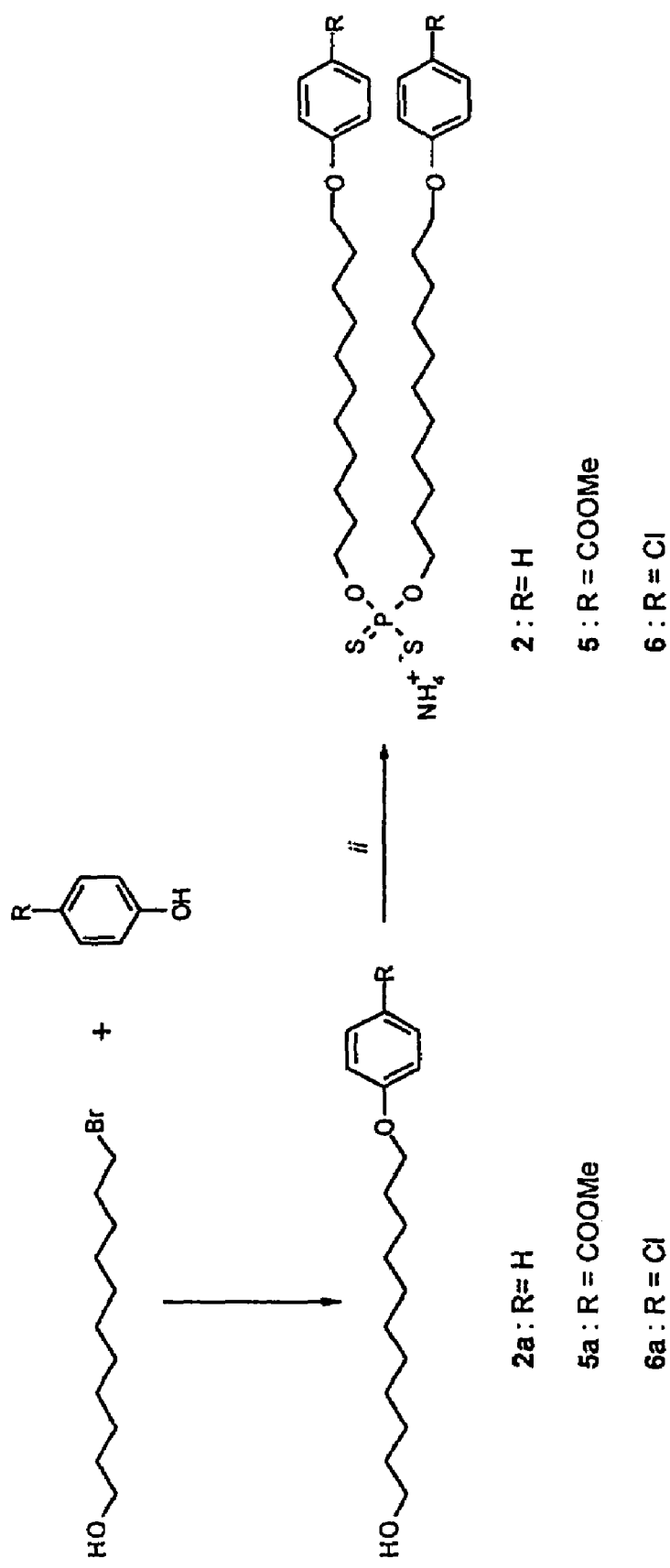
FIG. 24: Synthesis route for functional dithio ligands: i: $K_2CO_3$, acetonitril, reflux, yield: 99%; ii: $P_2S_5$, $NH_3$, yield: 60%.

Another possibility to functionalize the surface of the $LaF_3$ nanoparticles is to carry out the synthesis with ligands that already have functional groups. This is probably the most straightforward way to tune the solubility of the nanoparticles in different solvents. A synthesis route to obtain functionalized dithio ligands is shown FIG. 24. The synthesis of these ligands is similar to the synthesis of ligand 2, using a functionalized phenol instead of phenol. Every functionality that does not interfere in the second step of the reaction can be used, making this a versatile method to functionalize the surface of the LaF$_3$ nanoparticles. Nanoparticles synthesized with these ligands do show different solubilities. Nanoparticles synthesized with ligand 2 are soluble in apolar solvents like, toluene, dichloromethane, and chloroform. Nanoparticles synthesized with ligand 5 are soluble in solvents containing ester and ketone groups like, ethylacetate, cyclopentanone and γ-butyrolactone. The last two solvents are commonly used for the spin-coating of polymer solutions. The optical properties of the nanoparticles are independent on the functionalities of the ligand, so the functionalities do not interfere in the formation of the inorganic core of the nanoparticles. The same luminescence spectrum and luminescence lifetime was measured and no change in the nanoparticle cores was observed with TEM.

EXAMPLE 13

Figure 25:
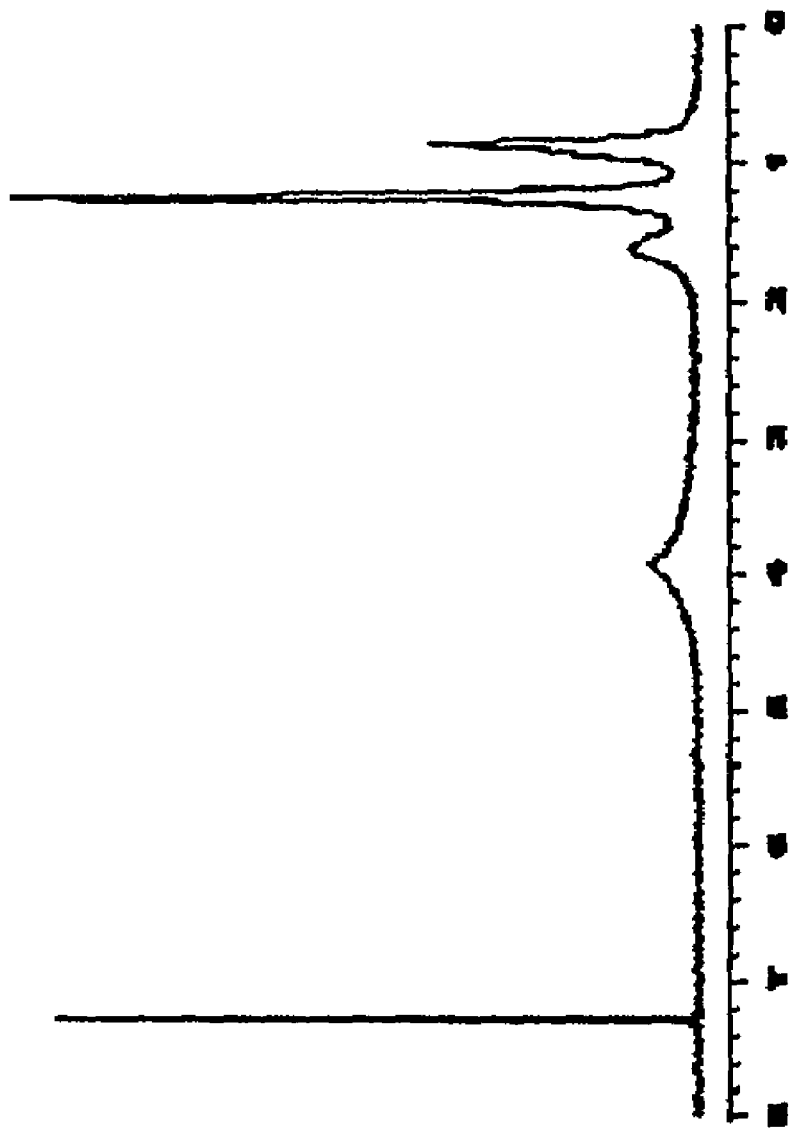
FIG. 25: $^1$H NMR of $LaPO_4$, surface modified by a reaction with dodecanol.
Figure 26:
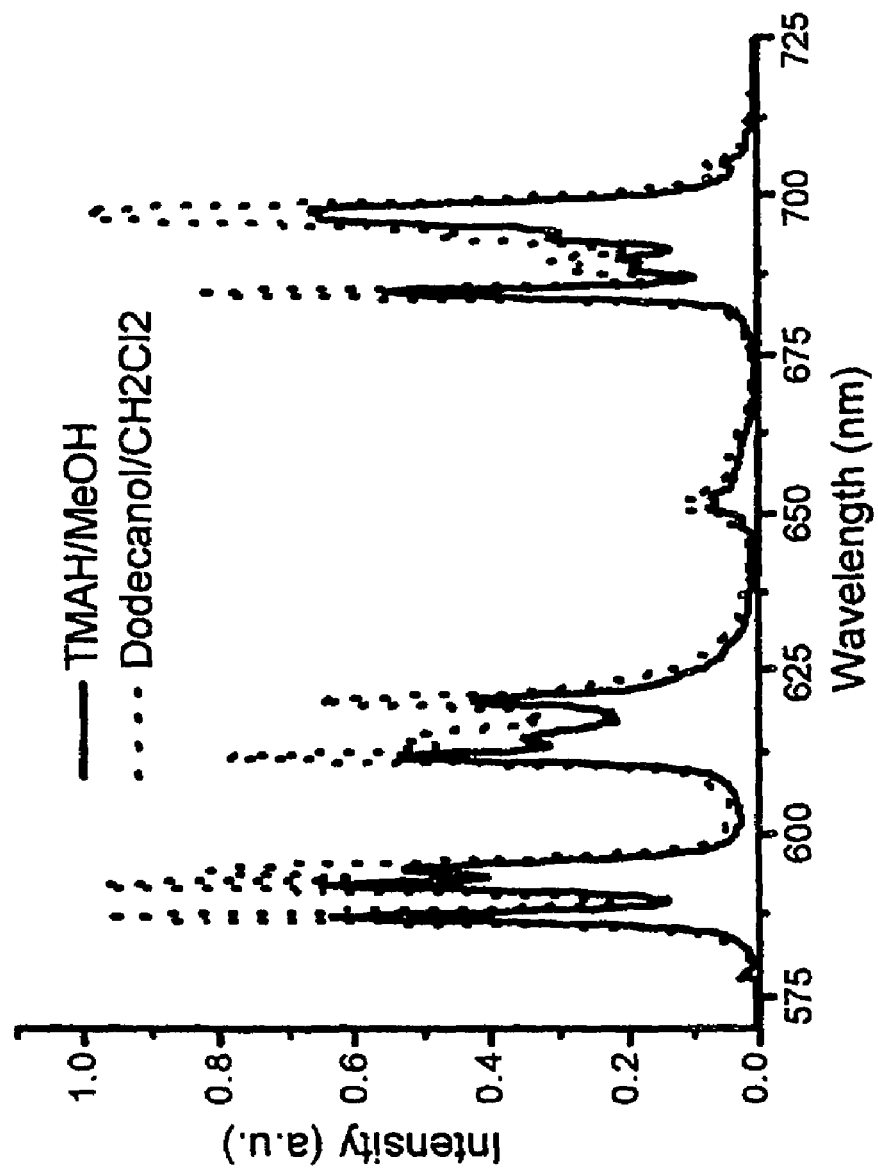
FIG. 26: Emission spectra of $LaPO_4$:Eu nanoparticles in methanol with tetramethylammonium hydroxide (TMAH) and after the surface reaction with dodecanol. The difference in intensity is for clarity.

Surface modification of LaPO$_4$ nanoparticles. The surface of LaPO$_4$ nanoparticles consists of phosphate groups and some bound ethylhexyl chains left after the synthesis of the nanoparticles. The surface of the nanoparticles is covered with OH groups of the phosphate groups, which provide the opportunity to covalently bind molecules to the surface. The presence of the OH groups was proven with solubility experiments. Directly after the synthesis, the nanoparticles were soluble in polar aprotic solvents like DMF and DMSO. This means that the surface has a polar nature, which is not consistent with a full coverage with ethylhexyl chains of the coordinating solvent. A full coverage with these apolar ligands would make the nanoparticles soluble in apolar solvents, like hexane, toluene, and dichloromethane. The nanoparticles can be solubilized in alcohols, such as methanol and iso-propanol by the addition of tetraalkyl ammonium hydroxides. The addition of tetraalkyl ammonium bromides does not lead to solubility in the alcohols, proving that the base is necessary to deprotonate the surface OH groups. Deprotonation of the surface OH groups leads to a negatively charged surface, that makes the coordination of the positively charged ammonium ions possible. For a functionalization reaction the OH surface groups can be reacted with alcohols, leading to phosphate esters. The OH groups of the surface phosphate groups were converted into chlorides by a reaction with phosphorus oxychloride. The surface of the nanoparticles can subsequently be functionalized by a reaction with an excess amount of dodecanol. The $^1$H NMR of this product is shown in FIG. 25. The $^1$H NMR signals of the dodecane chains are broadened due to the binding to the nanoparticles surface. The LaPO$_4$ nanoparticles before surface functionalization were only soluble in polar aprotic solvents like DMSO and DMF, but after the surface modification the nanoparticles are soluble in apolar solvents like toluene, chloroform and dichloromethane. The reaction of phosphorus oxychloride with the nanoparticles is a rigorous method to introduce the chlorides to the surface of the nanoparticles and characterization was performed to show that the nanoparticle core is still intact. TEM investigation of the reaction product showed that the nanoparticle cores are still intact and that no change in nanoparticle size and size distribution has occurred. Elemental analysis confirmed the presence of about 10% organic material in the product, which is consistent with a monolayer formation around 5 nm nanoparticles. Luminescence studies also revealed no change in the environment of the Eu$^{3+}$ ion when the surface modification is performed on Eu$^{3+}$ doped nanoparticles as shown in FIG. 26. The luminescence spectra have the same line positions and the same peak splitting showing that the Eu$^{3+}$ ion is still in the LaPO$_4$ matrix.

This reaction can thus be used to make the nanoparticles hydrophobic, making them soluble in a-polar solvents. The reaction also offers a way to introduce other functional groups on the surface of the nanoparticles, making the tunability of the solubility properties possible. Haase et al. reported the surface modification of these nanoparticles by heating them in dodecylamine. Nanoparticles with dodecylamine coordinated to the surface were also soluble in apolar solvents and could be precipitated from solution by the addition of methanol.

EXAMPLE 14

Figure 27:
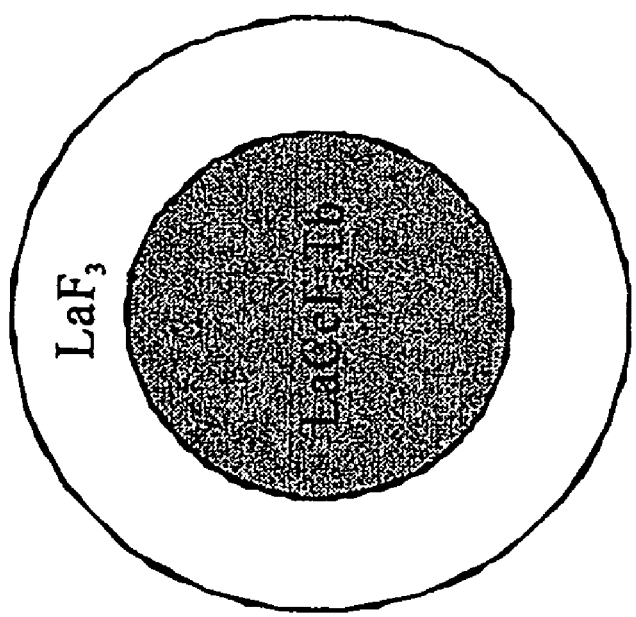
FIG. 27: Schematic of a core-shell nanoparticle, with a $LaCeF_3$:Tb core and a $LaF_3$ shell.

Synthesis of core-shell nanoparticles of LaF$_3$. The synthesis of core-shell nanoparticles can be an easy way to enhance the luminescence properties of lanthanide doped nanoparticles, because interaction with the high-energy vibrations of the surrounding organic environment can be reduced in this way. A schematic representation of such a core-shell nanoparticle is shown in FIG. 27. All the lanthanide ions involved in the luminescence of the nanoparticle are doped in the core and therefore have no direct interaction with the surface of the nanoparticle.

Figure 28:
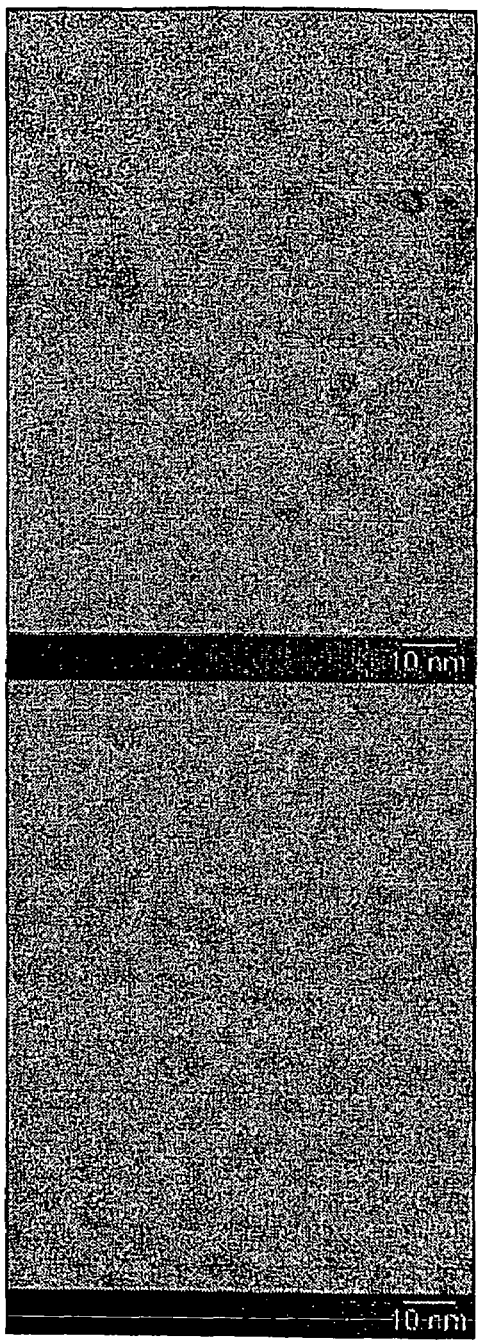
FIG. 28: TEM pictures of $LaCeF_3$Tb nanoparticles with the corresponding size distribution histograms, core (top) and core-shell (down).
Figure 28:
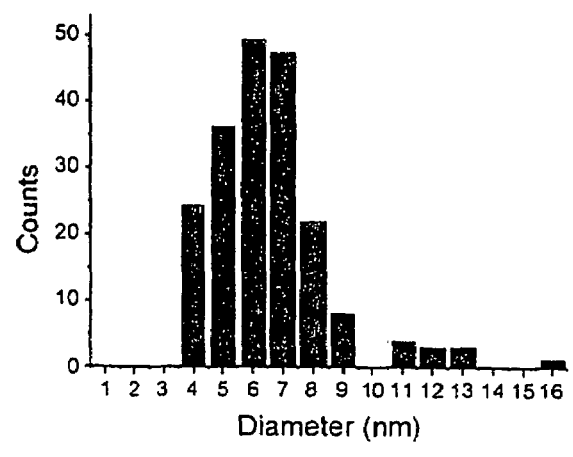
Figure 28:
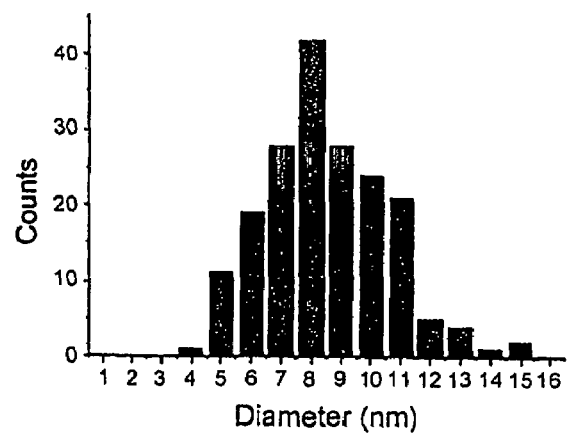

Above, we showed that the sizes of LaF$_3$ nanoparticles could be manipulated by changing the ratio of the ligand and reagents that form the core. This is a strong indication that the nanoparticles form after an initial nucleation followed by growth after the addition of more monomer. This mechanism allows the growth of a core-shell structure in one single synthesis step, by a stepwise addition of reagents. In the core-shell experiments, ammonium fluoride was used instead of sodium fluoride as the fluoride precursor, because this compound shows better solubility in water, making it possible to add fluoride precursor to the reaction mixture dissolved in a small amount of water. Core-shell nanoparticles with a core of La$_{0.4}$F$_3$Ce$_{0.45}$Tb$_{0.15}$ and a shell of LaF$_3$ were synthesized to study the influence of the shell on the quantum yield of the nanoparticles. During the growth of the shell no additional nucleation should occur, resulting in the formation of new un-doped nanoparticles. The size of the nanoparticles is a good indication for this. The size of the nanoparticles should increase roughly corresponding to an increase in volume that is similar to the amount of shell material added. The nanoparticle sizes before and after the growth of an un-doped shell around a LaF$_3$CeTb core were measured using TEM. FIG. 28 shows typical TEM pictures of core nanoparticles and core-shell nanoparticles, with the corresponding size distribution histograms. A growth of the nanoparticles is clearly observed from 7.0 nm with a size distribution of 28.1% for the core nanoparticles, to 9.0 nm with a size distribution of 22.7% for the core-shell nanoparticles, when the same amount of material was used for the shell as for the initial core. This increase in size corresponds to a two times increase in volume, indicating that all of the added monomer has grown on the existing core nanoparticles and no new nucleation has occurred. This is consistent with the finding in above where nanoparticles with different sizes were synthesized by changing the amount of ligand. The size distribution is the same in absolute value but because of the increased size it looks like it has narrowed. In this case the effective ligand ratio is also lowered after the addition of the shell monomer, making it possible to form larger nanoparticles.

To determine the effect of the undoped core around the nanoparticles, the quantum yields of $Ce^{3+}$ and $Tb^{3+}$ doped nanoparticles were determined by comparing the emission intensity with the emission intensity of quinine bisulfate. Upon excitation of the $Ce^{3+}$ absorption band at 282 nm, emission intensity of $Ce^{3+}$ at 350 nm and four emission peaks of $Tb^{3+}$ at 489, 543, 584, and 621 nm of the $^5D_4 \rightarrow {}^7F_J$ (J=3-6) were observed. The quantum yield of the emission was determined by measuring both the emission of $Ce^{3+}$ and $Tb^{3+}$. Three methods were used to grow a shell of $LaF_3$ around the core nanoparticles, which are described in the experimental section and differ in the way the shell reagents were added to the reaction mixture.

TABLE 6

Luminescence quantum yield of $LaCeF_3$: Tb core shell nanoparticles.

| Nanoparticles | Quantum Yield (%) |
|---|---|
| No shell | 24.4 |
| Method 1 | 42.7 |
| Method 2 | 41.7 |
| Method 3 | 54.2 |
| Control[a] | 27 |

[a]In the control experiment the nanoparticles are synthesized in the same size as the core-shell nanoparticles, but with out the core-shell structure The quantum yield of the core nanoparticles was very similar to the quantum yield determined above synthesized with NaF as the fluoride precursor, as an indication that the source of the fluoride ion has no influence on the optical properties of the nanoparticles. All methods to synthesize shell material were successful according to the quantum yield measurements. The best method was by growing the shell material by the alternate addition of small portions of the shell monomer. The quantum yield of nanoparticles coated in this way more than doubled. As a control experiment nanoparticles of the same size as the core-shell nanoparticles were synthesized, but with the core and shell mixed together to check if the increase in quantum yield is not caused by the dilution of the luminescent ions. Nanoparticles synthesized in this way had a quantum yield of 27%, only a little higher than the core nanoparticles, but clearly much lower than the core-shell nanoparticles. The $Ce^{3+}$ emission in these diluted nanoparticles was stronger compared to the core and the core-shell nanoparticles indicating that energy transfer from $Ce^{3+}$ to $Tb^{3+}$ is less efficient due to an increase in the average distance between the $Ce^{3+}$ and $Tb^{3+}$ ions. From this experiment it can be concluded that the increase in quantum yield is a result of the core-shell structure and not of nanoparticle size or a different distribution of the lanthanide ions in the nanoparticles.

Figure 29:
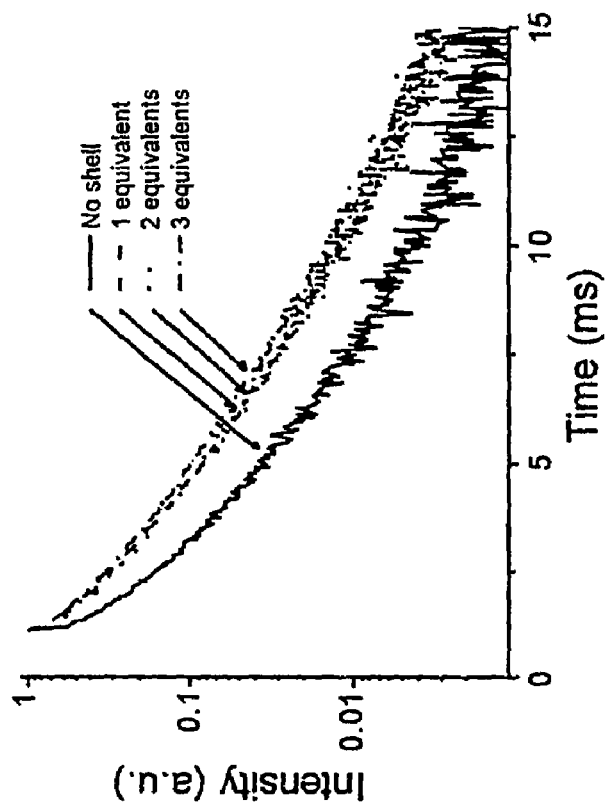
FIG. 29: Luminescence decay curves of the $^5D_0$ (left) and $^5D_1$ (right) level of $Eu^{3+}$ in $LaF_3$ nanoparticles with a different amount of shell material in toluene.
Figure 29:
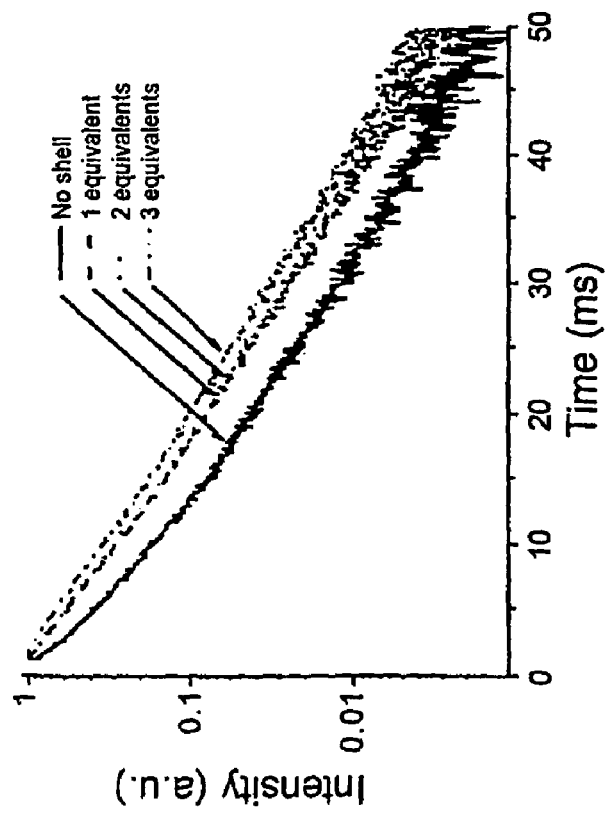

FIG. 29 shows the luminescence decay curves of both luminescent levels of the $Eu^{3+}$ ion in $LaF_3$ nanoparticles, with different amounts of shell material. The non-exponential decay of the $^5D_0$ level is clearly observed and when one excess of shell monomer was grown on the nanoparticles a large change in the decay was observed. The decay becomes almost single exponential and an increase in the luminescence lifetime was observed. The values obtained for the luminescence lifetime after a bi-exponential fit are shown in Table 7. The increase in luminescence lifetime shows the increased shielding from quenching groups at the surface and the shift in the two components of the luminescence lifetime shows the decay was almost mono-exponential after the growth of a shell around the core.

TABLE 7

Values of the bi-exponential fit on the decays of the $^5D_0$ and $^5D_1$ level of $LaF_3$: Eu nanoparticles with different amount of shell material in toluene.

| | $^5D_0$ | | $^5D_1$ | |
|---|---|---|---|---|
| | $\tau_1$ | $\tau_2$ | $\tau_1$ | $\tau_2$ |
| no shell | 7.9 (74%) | 3.1 (26%) | 2.0 (73%) | 0.65 (27%) |
| 1 fold excess | 9.7 (5.8%) | 5.3 (42%) | 2.3 (83%) | 0.72 (17%) |
| 2 fold excess | 9.9 (54%) | 5.6 (46%) | 2.4 (81%) | 0.78 (19%) |
| 3 fold excess | 9.5 (69%) | 5.4 (31%) | 2.5 (82%) | 0.80 (18%) | a) The percentages reflect the amount of the component contributing to the total lifetime.
b) The absolute errors in the fit are 0.2 ms in the lifetime and 5% in the component contributing to the total lifetime.

Figure 30:
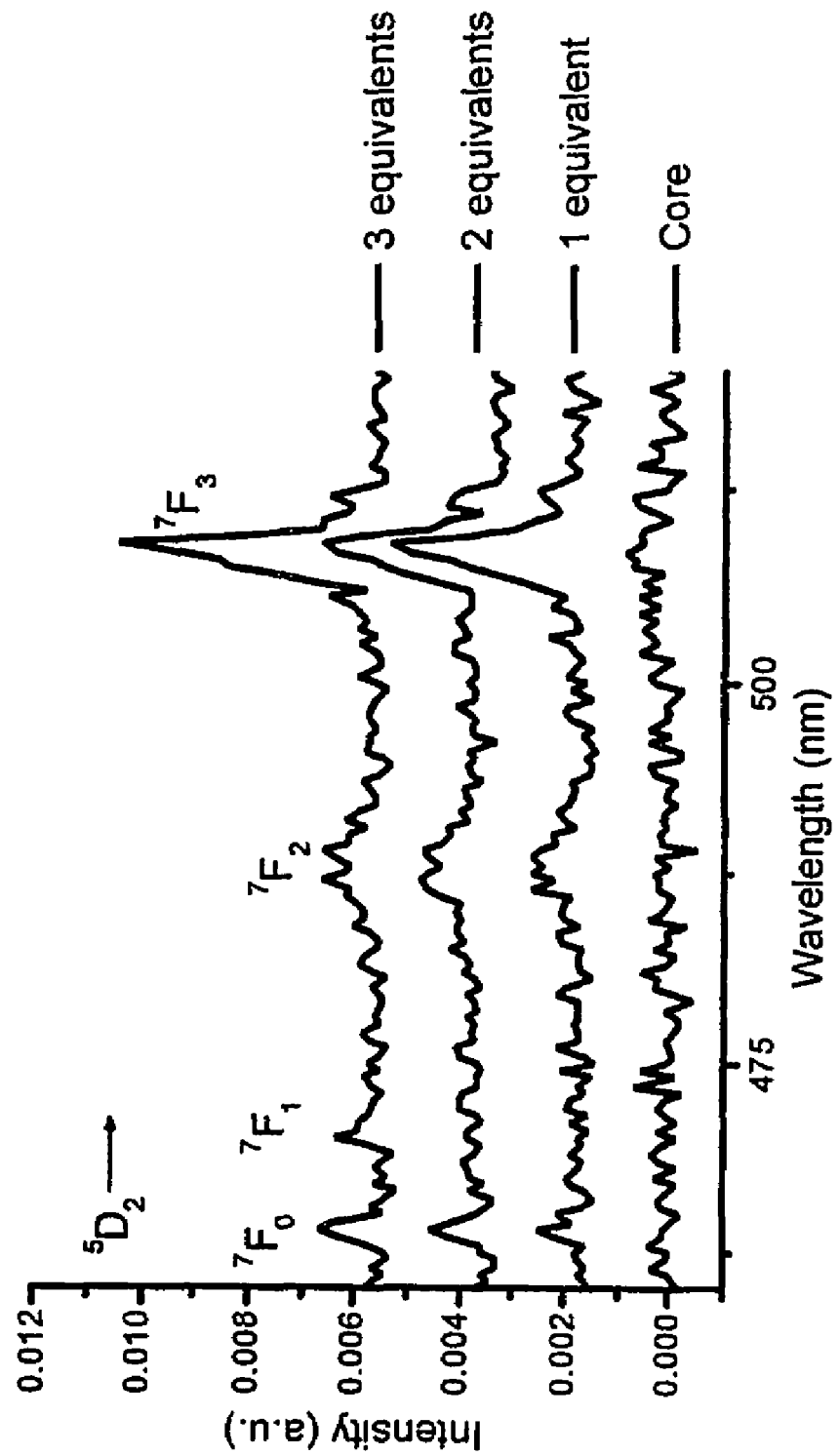
FIG. 30: Emission of the $^5D_2$ level of $Eu^{3+}$ in core-shell nanoparticles. The spectra are normalized to the emission of the $^5D_0 \rightarrow ^7F_1$ emission peak. The offset is for clarity.

The biggest change in the decay is observed after the addition of one excess of the shell material. The growth of more shell material has a smaller influence on the decay curve, but with the growth of a 3-fold excess a small rise in the decay curve is observed. This could be a result of reduced quenching of the higher $Eu^{3+}$ levels like the $^5D_1$, $^5D_2$, or $^5D_3$ levels. The fitting of this decay was started after a 5 ms after the excitation pulse due to the rise in the decay. As a result the values of the luminescence lifetime are lower than for the 2-fold excess. The effect of the shell on the luminescence lifetime of the $^5D_1$ decay is also shown in FIG. 29 and the corresponding values after a bi-exponential fit in Table 7. The effect is similar to what was observed for the $^5D_0$ level. The growth of one shell is enough to increase the luminescence lifetime and a thicker shell only has a small influence on the luminescence lifetime. In the emission spectrum the emission from the $^5D_2$ level is located between 460 and 520 nm. In the core nanoparticles, no emission from this level could be observed, as shown in FIG. 30.

After the growth of $LaF_3$ shell material emission lines start to appear at 464, 472, 489, and 509 nm of the $^5D_2 \rightarrow {}^7F_J$ (J=0-3) transitions. These lines slowly become stronger after the growth of more shell material, indicating reduced quenching of the $^5D_2$ level. In the bulk material emission from the $^5D_2$ level is also observed at this concentration and temperature.

CONCLUSIONS

Several methods were developed to functionalize the surface of $LaF_3$ and $LaPO_4$ nanoparticles. This functionalization has an important influence on the solubility of the nanoparticles, which is important for the processability of the system. The synthesis of core-shell nanoparticles for $LaF_3$ was successful, because the sizes of the nanoparticles were increased after growing a shell of undoped $LaF_3$ around the original core. The luminescence properties of the lanthanide ions were improved, which was demonstrated by the increase in quantum yield of $LaF_3CeTb$ nanoparticles and the increase in luminescence lifetime of the emissive levels of the $Eu^{3+}$ ion. The results show that it is possible to reduce the amount of quenchers coordinated to the lanthanide ions by the growth of an inorganic shell around the luminescent core.

EXAMPLE 15

Polymer Waveguide Amplifier Doped with LaF$_3$:Nd Nanoparticles.

PMMA Waveguides

Figure 31:
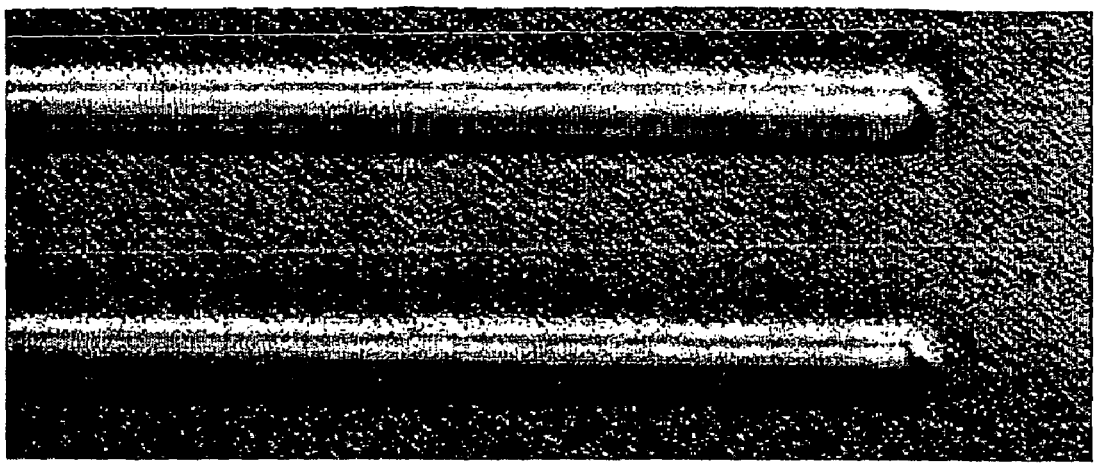
FIG. 31: 5 μm wide PMMA/$LaF_3$:Nd ridge structures on a $SiO_2$ wafer.

PMMA waveguides doped with 10% w/w LaF$_3$:Nd nanoparticles were made by spin-coating a solution of PMMA and the nanoparticles in chlorobenzene on a silicon wafer, coated with a layer of 3.2 μm of SiO$_2$. Ridge structures with a height of 1.45 μm were etched in the 3.3 μm thick polymer layer using reactive ion etching (RIE). The formation of a gray film over the substrate indicates that redepostion of material, probably lanthanide oxides, takes place during RIE. The method of RIE relies on the reaction of highly reactive ions and radicals to form volatile products that can be pumped away from the vacuum chamber. No volatile products can be formed with the lanthanide ions in this process, leading to the redepostion of the lanthanide salts. An optical microscope image of waveguide structures made in this way is shown in FIG. 31. It is clearly visible that the surface of the polymer next to the ridge structures is rough due to the redeposition, but the ridge structures itself seems to be smooth. The final device had air as the top cladding leading to a large difference in refractive index of the polymer (~1.49) and the top cladding.

The endfaces of the polymer waveguide can be made by cleaving the wafer or by dicing the wafer. Due to the weak adsorption of the polymer to the substrate, it was not possible to dice the wafer without destroying the polymer layer and cleaving of the substrate was the only possibility. Low loss endfaces can be made using the cleaving method, but the result is not very reproducible. The PMMA wafer contained waveguides with different width, from 10, 5, 4, 3, 2.5, 2 μm. The waveguides of 4 μm and less did not transmit any light at 1300 nm. The 5 μm channel was single-mode at the signal wavelength of 1319 nm and multi-mode at the pump wavelength of 578 nm, but the losses of this waveguide were substantial (18 dB at the signal wavelength). An excitation wavelength of 578 nm was chosen, because at this wavelength the Nd$^{3+}$ ion has the strongest absorption peak. The measurements were performed on the 10 μm wide channels, which were multi-mode, both at the signal and pump wavelength. Single mode optical fibers with a core diameter of 9 μm were used to couple the light into and out of the waveguide. The total chip losses (propagation and coupling losses) at the pump wavelength were 12 dB on the 10 μm wide channel and at the signal wavelength the losses were about 11 dB. The calculated coupling losses for the signal beam were at least 6 dB, so on the 3 cm device the propagation losses were in the order of 2 dB/cm. These relatively high propagation losses are probably caused by the rough sidewalls of the device.

Figure 32:
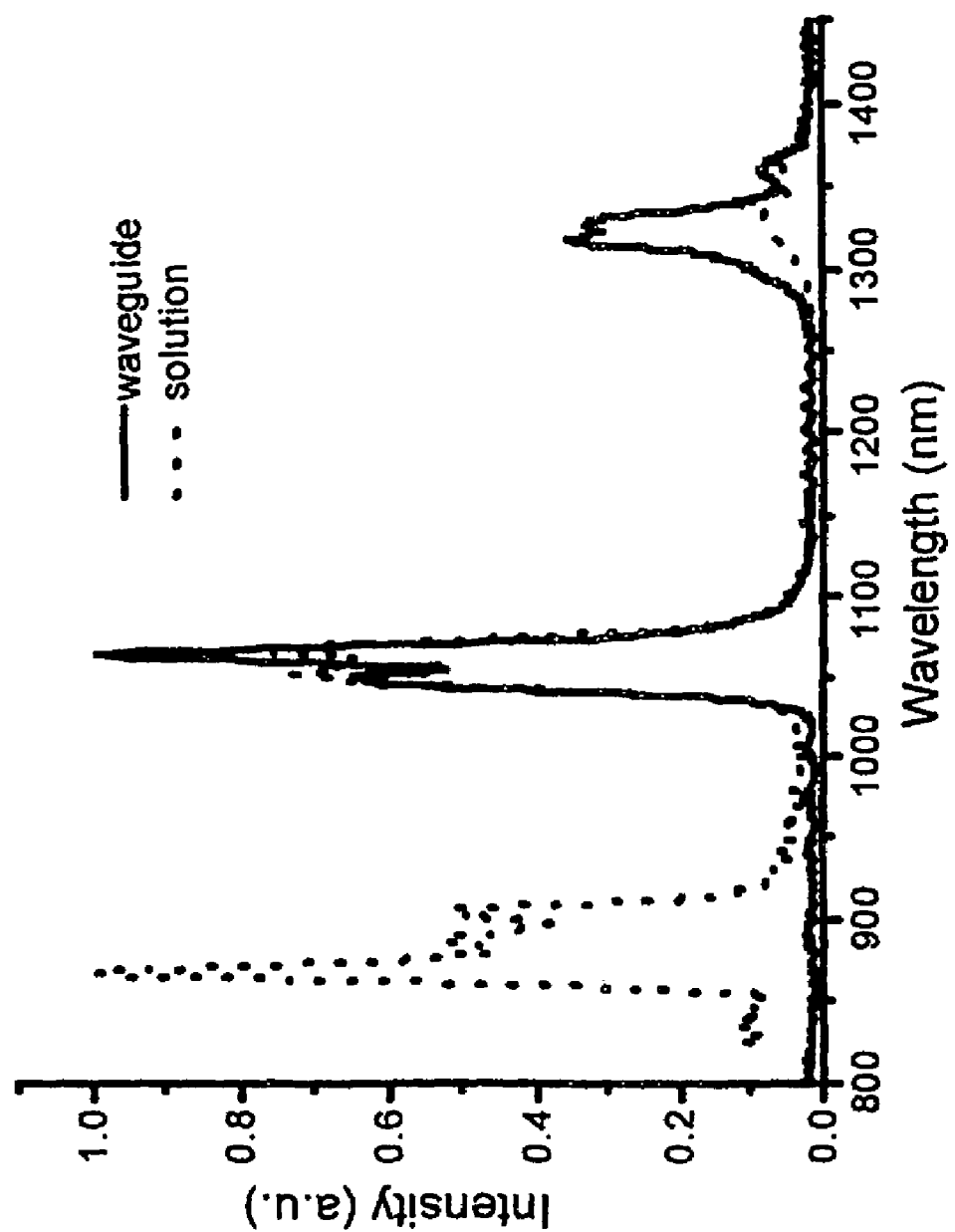
FIG. 32: Emission spectrum of $LaF_3$:Nd nanoparticles in solution and in the PMMA waveguide after excitation at 578 nm.

The continuous pump beam was butt-end coupled into the waveguide and the emission was collected at the end of the waveguide. The collected emission spectrum is shown in FIG. 32. The emission spectrum of the waveguide is compared to the emission spectrum of LaF$_3$:Nd nanoparticles in dichloromethane solution. The emission peaks of the $^4F_{3/2} \rightarrow ^4I_{11/2}$ and $^4F_{3/2} \rightarrow ^4I_{9/2}$ transitions of Nd$^{3+}$ at 1060 and 1330 nm were observed in both spectra.

Figure 33:
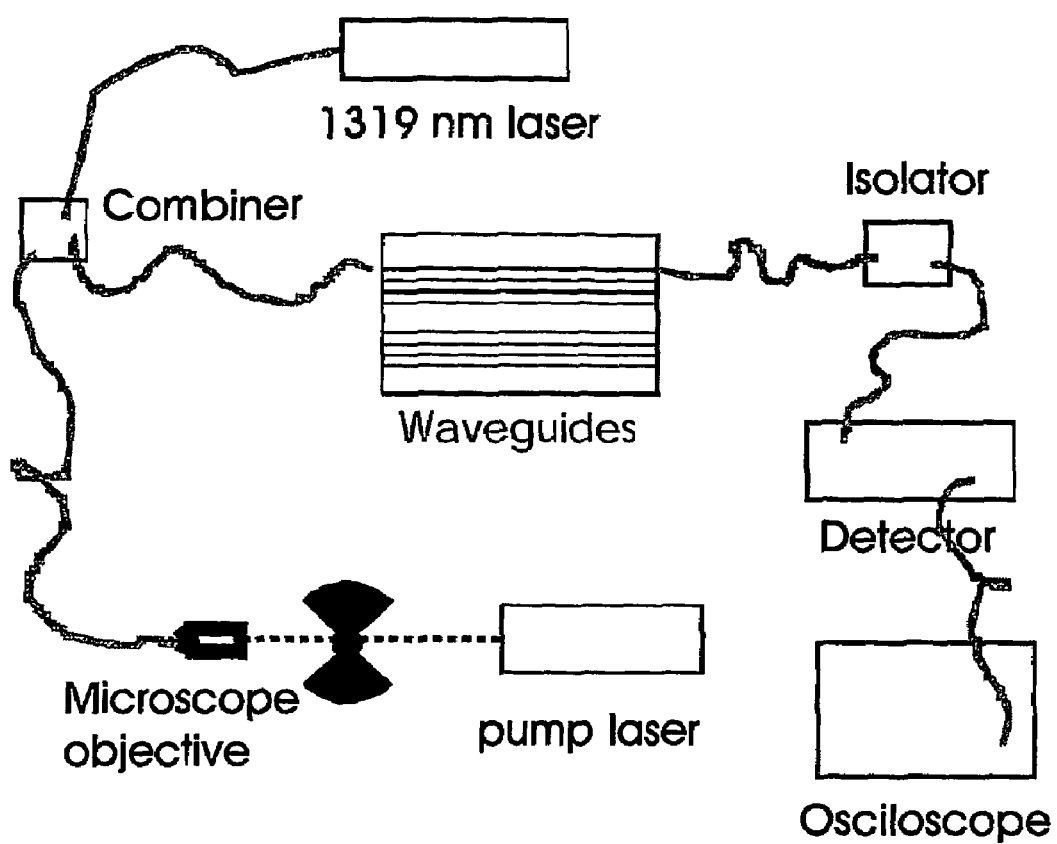
FIG. 33: Setup for the measurement of optical amplification on the waveguides.

The emission peak at 880 nm of the $^4F_{3/2} \rightarrow ^4I_{13/2}$ transition was not observed in the waveguide emission spectrum, because an isolator was used to filter out the pump light and this isolator also filtered out the 880 nm emission. The intensity ratio between the other two emission peaks was also different, because the isolator filtered out part of the 1060 nm emission. A sharp decrease in the 1330 nm peak is observed above 1340 nm, because of the overtone absorption of CH bonds in the waveguide. Amplification measurements on the waveguides were done using a setup as shown in FIG. 33. In order to measure amplification of the signal beam, the pump and signal light have to be combined before going into the waveguide. The pump and signal light were combined into a 9 μm core single mode fiber using a WDM and butt-end coupled into the waveguide. The intensity of the 1319 nm signal laser was unstable, so the pump light was chopped in order to measure the difference in signal intensity when the pump light is on and when the pump light is off. This configuration is only possible when all of the pump light is filtered out before the detector, or residual pump light will interfere with the amplified emission. The use of an isolator was found sufficient to filter out all of the pump light. The pump beam was chopped at 80 Hz for the amplification measurements and combined with the signal light coupled into the waveguide. The light coming out of the waveguide was collected using a multimode optical fiber with a core diameter of 50 μm and fed to a detector. The detector signal was shown on an oscilloscope. At a pumppower of 12 mW coupled into the device and a signal power of about 1 μW, a signal amplification of 0.3 dB was measured.

The gain showed a dependence on the pump wavelength between 570 and 590 nm, with the maximum gain corresponding to the absorption peak of the Nd$^{3+}$ ion at 578 nm. This amplification is equal to a signal increase of 10%, using the equation below for calculation from mW to dB, with $I_{in}$ the signal intensity without pump light and $I_{out}$ the signal intensity with pumplight, both in mW.

$$dB = 10 \times \log\left(\frac{I_{out}}{I_{in}}\right)$$

This signal increase measured with the detector could also be a result of spontaneous emission of the Nd$^{3+}$ ions. This can be studied by turning off the signal laser and measuring the intensity differences using a chopped pump laser. The effect of the spontaneous emission on the detector signal was approximately 1% of the amplification signal, so the effect of spontaneous emission can safely be ignored.

Considering the large coupling and propagation losses of the device net gain will not be possible in this waveguide. To decrease the coupling and propagation losses other waveguides were made using another polymer. The coupling losses can be decreased using a device structure that better fits the fiber light mode with the polymer waveguide mode and the propagation losses can be lowered using other techniques to make the waveguide structures, instead of RIE.

EXAMPLE 16

SU-8 waveguides

Figure 34:
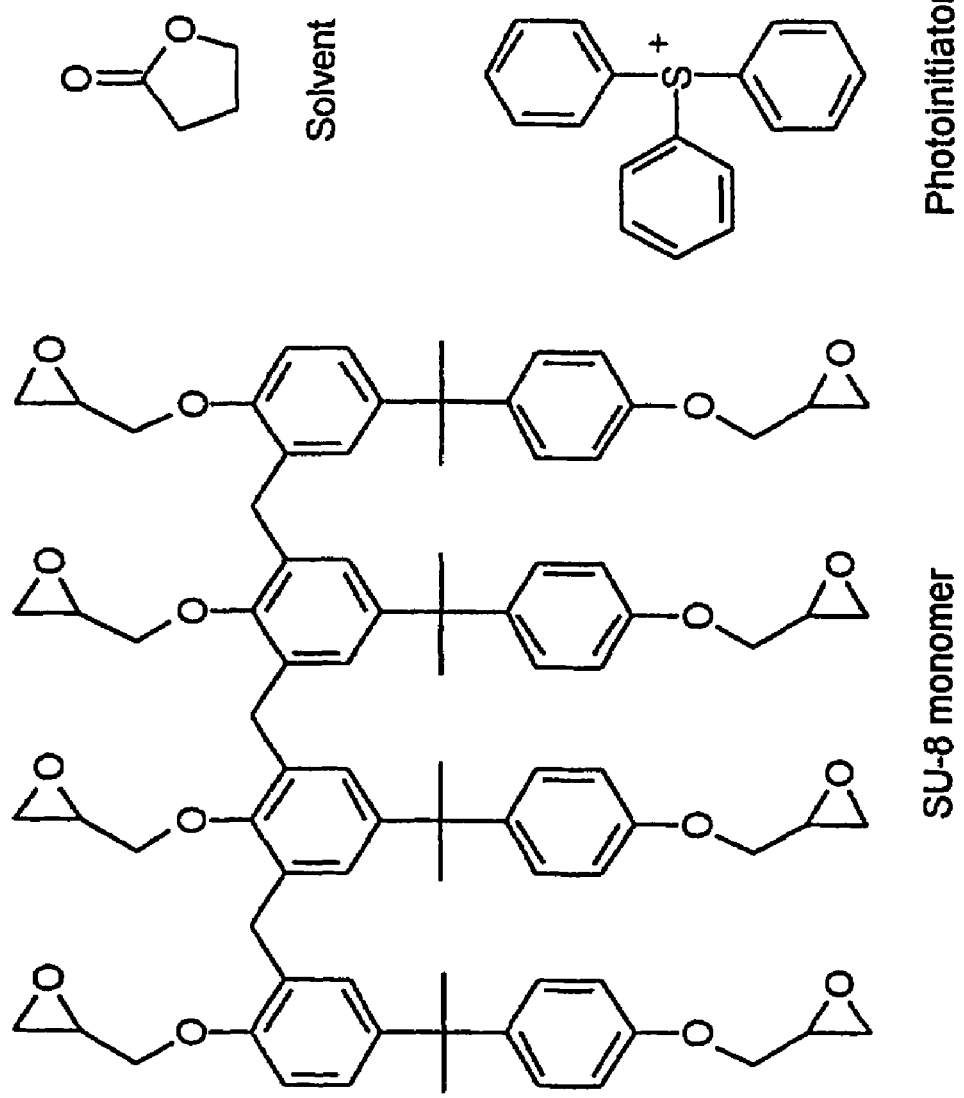
FIG. 34: Composition of a SU-8 negative photoresist solution.

Low loss waveguides of SU-8 have been fabricated. Nanoparticle doped SU-8 waveguides were made by mixing a LaF$_3$:Nd nanoparticle solution in γ-butyrolactone with a commercially available SU-8 solution in γ-butyrolactone. SU-8 is a negative photoresist that can be patterned by photolithography, without the use of RIE. The structures of the molecules in this photoresist solution are shown in FIG. 34.

The monomer consists of a bisphenol A epoxy resin that can be polymerized by acid catalysis. A sulfonium ion is used as the photoinitiator for the polymerization, which generates protons upon UV irradiation. The solvent used for the photoresist composition is γ-butyrolactone, of which the structure is also shown in FIG. 34. Due to the high refractive index of the polymer of 1.59, glass can be used as the substrate. The polymer shows good adhesion to glass, making it possible to dice the endfaces. Due to the strong cross-linking of the polymer it is also possible to apply a cladding over the device, without destroying the waveguide structures.

SU-8 layers doped with 20% w/w of the $LaF_3$:Nd nanoparticles were spincoated on 10 cm borosilicate wafers. The processing of the doped SU-8 was similar to the processing of the un-doped photoresist and only a few modifications were necessary. First of all, the temperatures at which the spin-coated layers were handled before the development had to be lowered compared to the SU-8 without nanoparticle doping. Temperatures above 75° C. lead to desorption of the ligand from the nanoparticle surface, which has a negative effect on the solubility of the nanoparticles in organic solvent. When the doped layers were handled at temperatures exceeding 75° C., a thin layer of insoluble nanoparticles remained on the substrate after development. For this reason the layers were heated at 65° C. for two hours after spin-coating to remove the solvent. After the development the layers were hard-baked at the usual temperature of 150° C., because in the highly cross-linked polymer the nanoparticles will not aggregate anymore. Another difference for the doped SU-8 layers compared to the SU-8 layers without nanoparticle doping was in the irradiation time. For the layers without nanoparticle doping the irradiation time was 10 seconds, but for the doped layers an irradiation time of 300 seconds was necessary. There can be several reasons for this increase in irradiation time. Most of the solvent is removed after the soft-bake step, even at 65° C., so it is unlikely that residual solvent is the reason for the increase in radiation time. A valid reason can be the slight desorption of ligand from the nanoparticle surface in the softbake step. This ligand can act as a base during the crosslinking of the polymer, slowing down the reaction rate. Another possibility is that the photoinitiator is not randomly distributed in the polymer film. The ligand monolayer around the nanoparticles creates a hydrophobic film, which can cause an inhomogeneous distribution of the photoinitiator.

The waveguides were finished by spin-coating a layer of HEMA-styrene on top of the device as a cladding, followed by dicing the endfaces.

Figure 35:
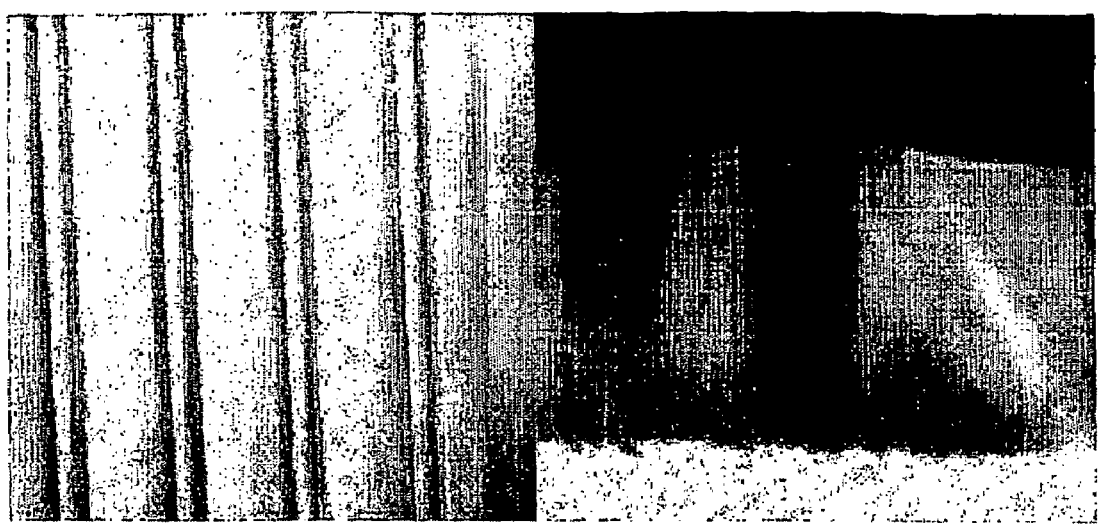
FIG. 35: Waveguides of SU-8 doped with 20% of $LaF_3$:Nd, (left) top few of waveguide channels, (right) cross-sectional view of a diced 5×10 μm channel.

Optical microscope pictures of the waveguides with the cladding on top are shown in FIG. 35. The left picture shows a top view of some channels covered with the cladding. The picture shows straight and smooth channels. The right picture shows a cross-sectional view of a 5 by 10 μm channel. It can be seen that the top of the channel is a bit wider than the bottom of the channel, which can be caused by the un-optimized irradiation conditions. During the irradiation the top of the polymer slab can heat up by the long wavelength components in the UV light source. Due to the higher temperature in the top layer the reaction rate was increased causing the top of the channel to be wider. After dicing the endfaces, the total length of the waveguide was 5.2 cm.

Optical pumping at 578 nm was not successful for the SU-8 device, because the polymer was not stable under high pump fluxes of this wavelength. Yellowing of the polymer at the high temperatures of the hard bake step is probably the cause of this instability. The yellowing of the polymer is probably caused by the photoinitiator, leading to absorptions well into the visible part of the spectrum, even at 578 nm.

Another possibility to excite the $Nd^{3+}$ ions is at 795 nm. The absorption of this peak is a bit weaker, but an advantage of this wavelength is that pump and signal wavelength are closer together, making it more easy to match the pump and signal light mode. $Nd^{3+}$-doped fiber amplifiers are usually pumped at this wavelength for this reason and because a large variety of cheap pump-lasers is available at this wavelength. It is unlikely that the yellowing in the SU-8 polymer is also present at this wavelength. The optical fibers had to be connected to the device for the pumping at 795 nm, because the pump laser and a good alignment setup were not available at the same place. Optical fibers with a 9 μm core were connected to the device by using glue curable by UV light. A laser operating at 850 nm was used for the alignment and with the glue between the fibers and the device a minimum loss of 7 dB over the entire device for a 10 by 10 μm channel was measured, including the coupling losses. The propagation losses of this waveguide were in the order of 1 dB/cm or less, assuming coupling losses of 1-2 dB. These losses are very similar to a waveguide without nanoparticle doping, showing that the nanoparticles are well dispersed in the polymer and do not contribute significantly to scattering losses. The losses were increased to 12 dB at 850 nm after curing of the glue by UV irradiation. This increase in the losses can be a result of stress in the glue resulting from an inhomogeneous curing, or as a result of the instability of SU-8 towards UV light.

Figure 36:
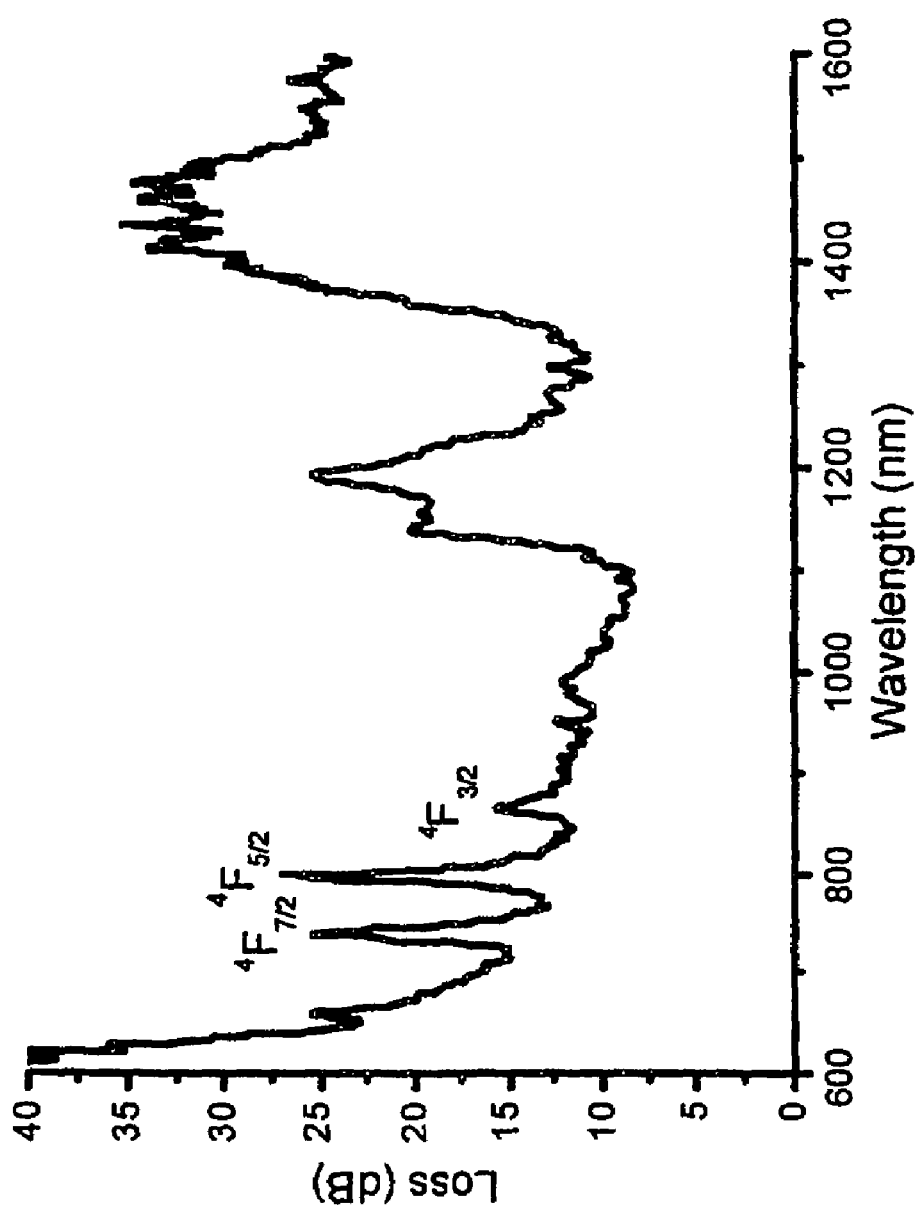
FIG. 36: Chip losses of the pigtailed SU-8/$LaF_3$:Nd waveguide.

The chip losses of the waveguide were determined using a white light source and the loss spectrum is shown in FIG. 36. The minimum loss of 8.5 dB over the entire device is around 1100 nm and at the signal wavelength of 1319 nm, the loss is 11.5 dB. At 738, 798, and 863 the $Nd^{3+}$ absorption lines are observed originating from the ground state level to the $^4F_{7/2}$, $^4F_{5/2}$, and the $^4F_{3/2}$ levels respectively. Below 700 nm the losses of the device increase strongly due to the yellowing effect of the polymer.

Figure 37:
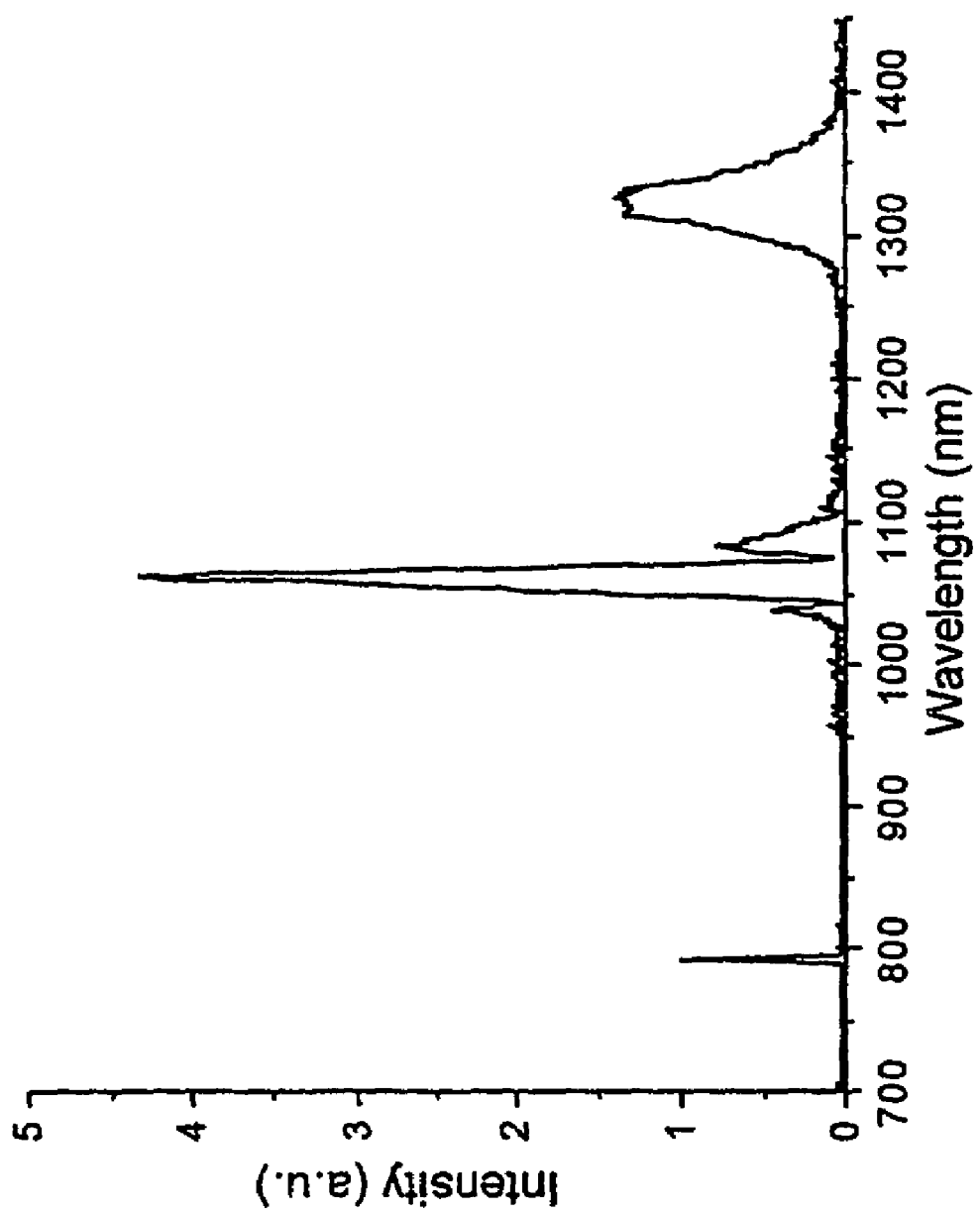
FIG. 37: $Nd^{3+}$ emission spectrum measured at the end of the SU-8/$LaF_3$:Nd waveguide after pumping at 795 nm.

The minimum loss window around 1300 nm can clearly be observed, with the overtone absorptions of the CH bonds around 1200 nm and above 1400 nm. The high losses around 1500 nm show that this polymer is unsuitable for waveguiding at this wavelength. The emission spectrum of $Nd^{3+}$ after pumping the waveguide at 795 nm with 50 mW of input power and collecting the emission at the end of the waveguide structure is shown in FIG. 37. The different ratio of the 1060 and the 1330 nm emission peaks compared to the emission spectrum in solution was caused by the filters, the same as for the PMMA device. A small peak of the pump laser at 795 nm is still observed, but this small signal did not interfere with the amplification measurement. Amplification measurements were performed using the same setup as used for the PMMA device. The pump beam and signal beam were coupled in one 9 μm fiber using a 2×2 splitter for the amplification measurement. Due to the high losses originating from the splitter, only 5 mW of pumppower could be coupled into the device. Using a chopped pump beam and leading the detector signal into the oscilloscope, a signal amplification of 0.1 dB could be measured on the 10 by 10 μm channel of 5.2 cm length.

EXAMPLE 17

Modelling of the Amplification

Several models have been described to calculate the optical gain in $Nd^{3+}$-doped glass fibers. The simplified model described in the appendix can be used to calculate the optical gain that can be reached in the polymer waveguides. This model does not take into account the losses of the chip, the effect of excited state absorption (ESA), and amplified spontaneous emission (ASE). When these effects take place the measured optical gain will be lower than the calculated gain. The last two processes will deplete the excited state of the $Nd^{3+}$ ion by the absorption of a signal photon (ESA), or by amplification of light at another wavelength than the desired signal wavelength (ASE). When these processes take place the actual population of the excited state will be lower than the calculated one. The $Nd^{3+}$ scheme for optical amplification is a 4-level system because the $^4I_{13/2}$ level is not the ground state and non-radiative decay from the $^4I_{13/2}$ level to the $^4I_{9/2}$ ground state is very fast. As a result the $^4I_{13/2}$ is always empty and a population inversion is always present. Amplification now only depends on the amount of ions that are in the $^4F_{3/2}$ excited state.

Factors that influence the amplification are the concentration of the lanthanide ion and the length of the device. Not taking into account any losses in the device, these factors counteract each other. When the concentration of the lanthanide ion is doubled, the length of the device can be halved to have the same amplification. This is of course different when losses and the effect of concentration quenching are taken into account. In glass fibers the losses are very low and concentration quenching lowers the luminescent lifetime of the ions even at concentrations below 1%. As a result, fiber amplifiers are very long, extending to several meters. For integrated devices the length of the amplifier has to be reduced in order to fit the amplifier on a small chip. As a consequence, the concentration of the lanthanide ion has to be increased in order to have sufficient amplification. The optical losses are usually a bit higher for polymers compared to glass materials, making the requirement for a shorter device even more important. Two other factors of the waveguide design that have an influence on the amplification are the pump power and the cross-section of the channel. The pump density (power/area) determines the amount of ions that are in the excited state. At a higher pump density more ions will be in the excited state. The luminescence lifetime is another important factor in the amplification scheme. It is a measure for the amount of time an ion spends in the excited state and at a fixed pump-power it determines directly how much of the population is in the excited state. The emission cross-section determines how much stimulated emission there will be. The higher the emission cross-section the more stimulated emission and the more amplification of the signal. The emission cross-section and the luminescence lifetime are related to each other and this ratio will be the best when the quantum yield is unity.

Figure 38:
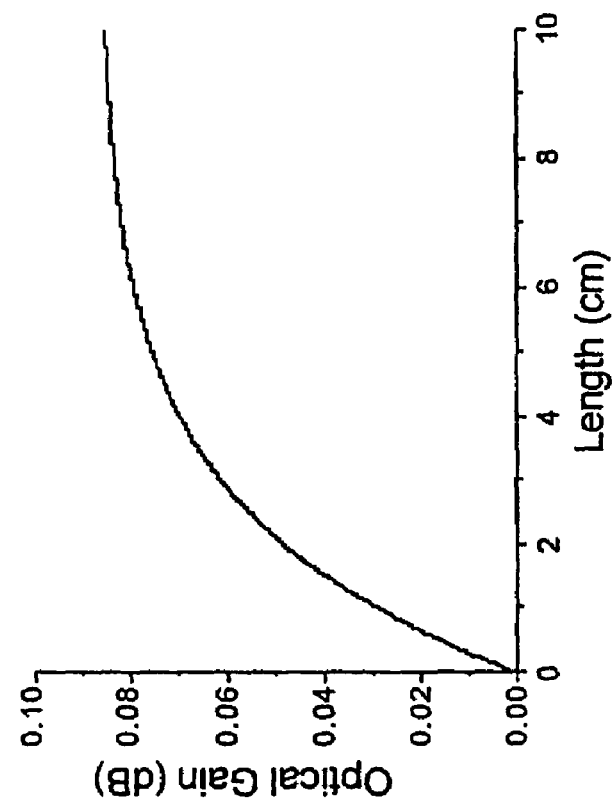
FIG. 38: Amplification calculated for (left) the PMMA 10×3.3 μm waveguide for a pump power of 12 mW at 578 nm and the 10×10 μm SU-8 waveguide for a pump power of 5 mW at 795 nm.
Figure 38:
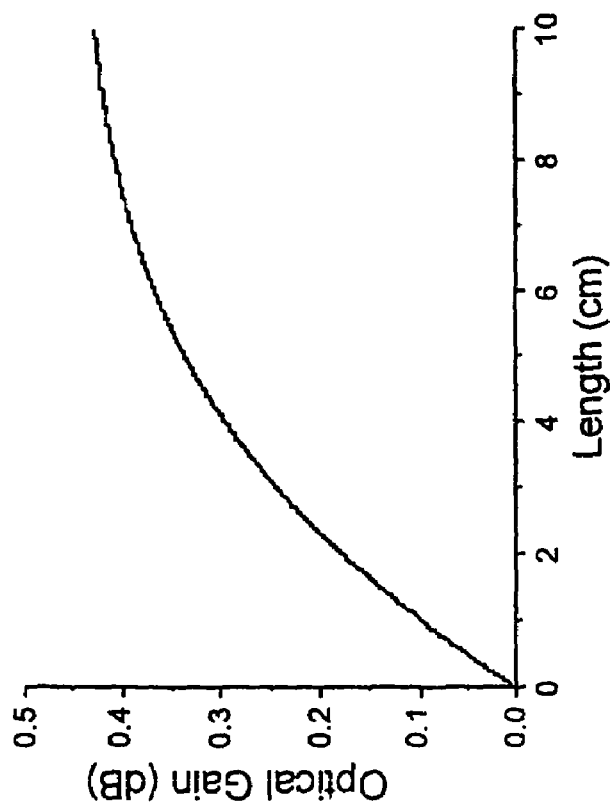
Figure 39:
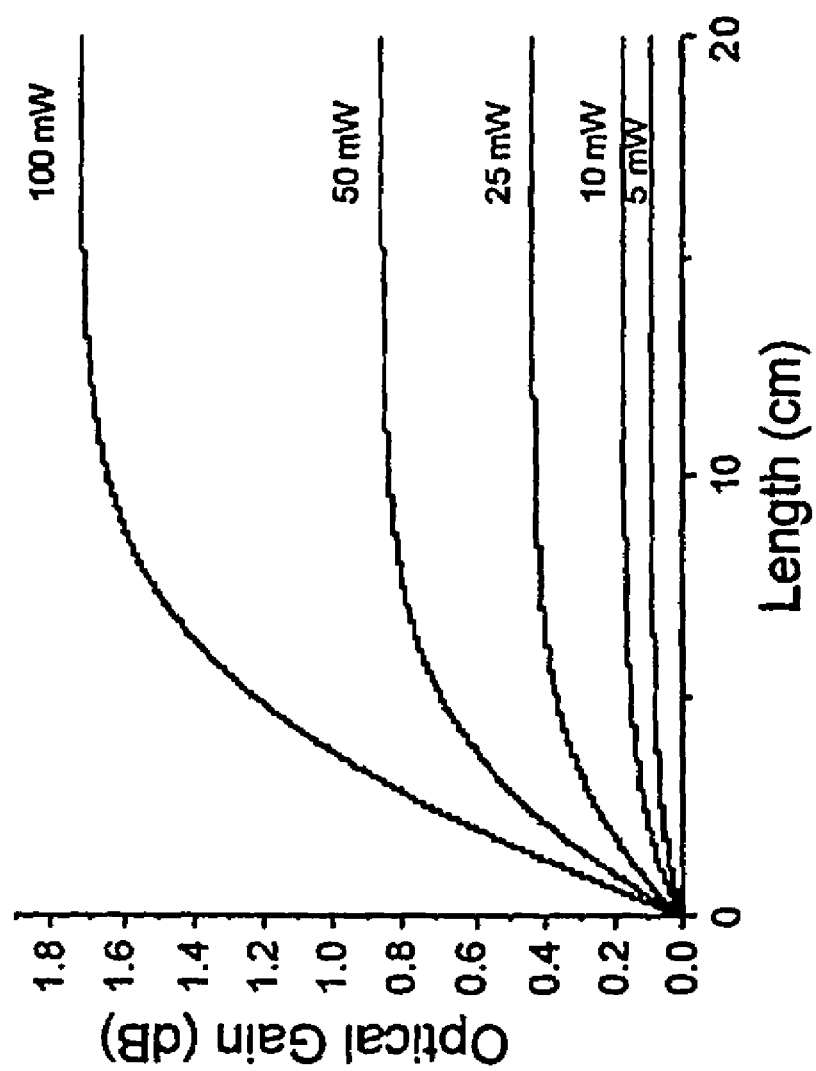
FIG. 39: Optical gain of a $LaF_3$:Nd doped polymer waveguide as a function of pump-power for a 10×10 μm channel pumped at 795 nm.

The calculated amplification for the PMMA and SU-8 waveguide channels are shown in FIG. 38, for the pumppowers of 12 mW and 5 mW, respectively, and for the channel sizes used in the experiments. The PMMA device was only 3 cm long and at this length the maximum amplification is not yet reached. The calculated value of 0.25 dB for a 3 cm chip is lower than the measured value of 0.3 dB but this is probably within experimental error, considering the approximations in the calculation. SU-8 waveguide had a length of 5.2 cm and at this length the maximum gain is almost reached. In this case the measured gain of 0.1 dB is also slightly higher than the calculated gain of 0.08 dB. The calculated values correspond very well with the measured values and further evaluation of the amplification results can be done theoretically. Higher gain can be obtained by improving the waveguide design and by coupling more pump light into the device. The theoretical optical gain of an SU-8 waveguide channel, with dimensions of 10 by 10 μm, as a function of the pump-power is shown in FIG. 39. It is clearly observed that the gain increases substantially when the pump-power is increased from 5 mW to 100 mW. A pump-power of 100 mW is often reported for amplification measurements and should be obtainable under optimized conditions.

Figure 40:
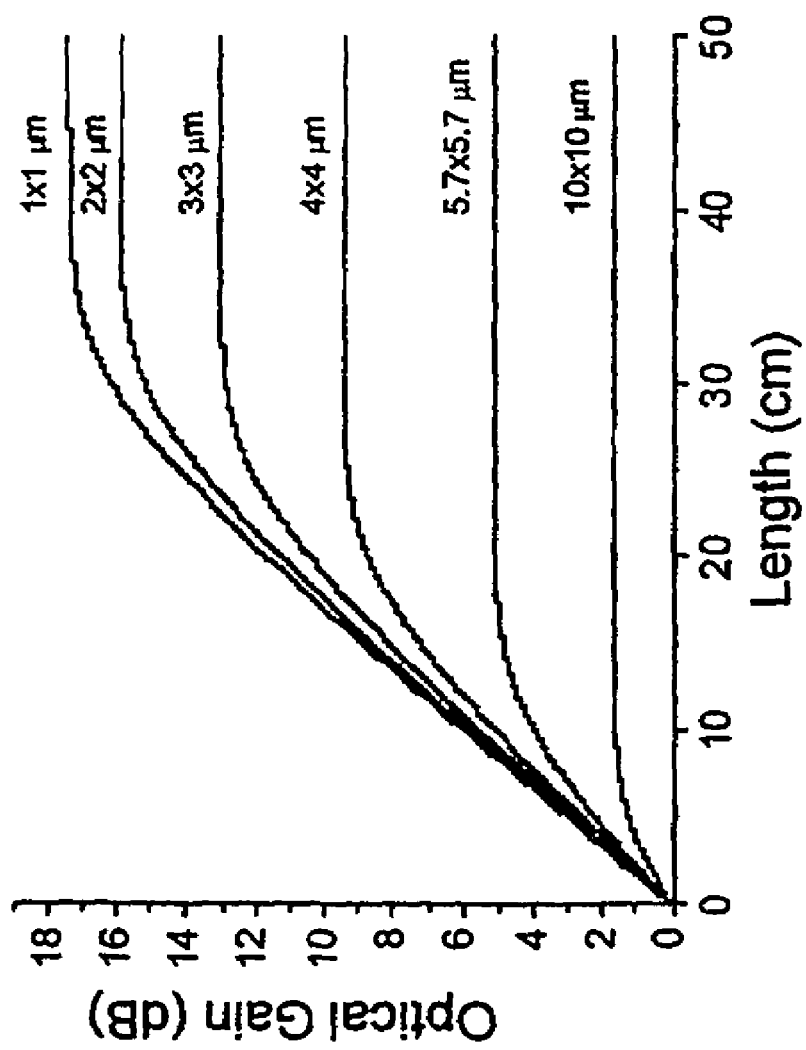
FIG. 40: Optical gain of a LaF$_3$:Nd polymer waveguide as a function of the dimensions of the waveguide. The pump-power is fixed at 100 mW.

The length of the device, or the concentration of $Nd^{3+}$ ions in the waveguide have to be increased in order to measure the maximum obtainable gain at these higher pump powers. Another large performance increase can be reached when the size of the channel is decreased as shown in FIG. 40. Decreasing the size of the channel increases the density of the pump power, so the effect is similar to an increase in pump power. The pump power in these calculations was at a constant 100 mW and the effect on the optical gain is similar to increasing the pump-power. With channel dimensions of 4×4 μm the optical gain is close to 10 dB, which is similar to the gain obtained for a $Nd^{3+}$-doped fiber amplifier. To observe this gain experimentally the length of the device has to be increased to about 25 cm, or the concentration of $Nd^{3+}$ has to be increased 5 times.

Figure 41:
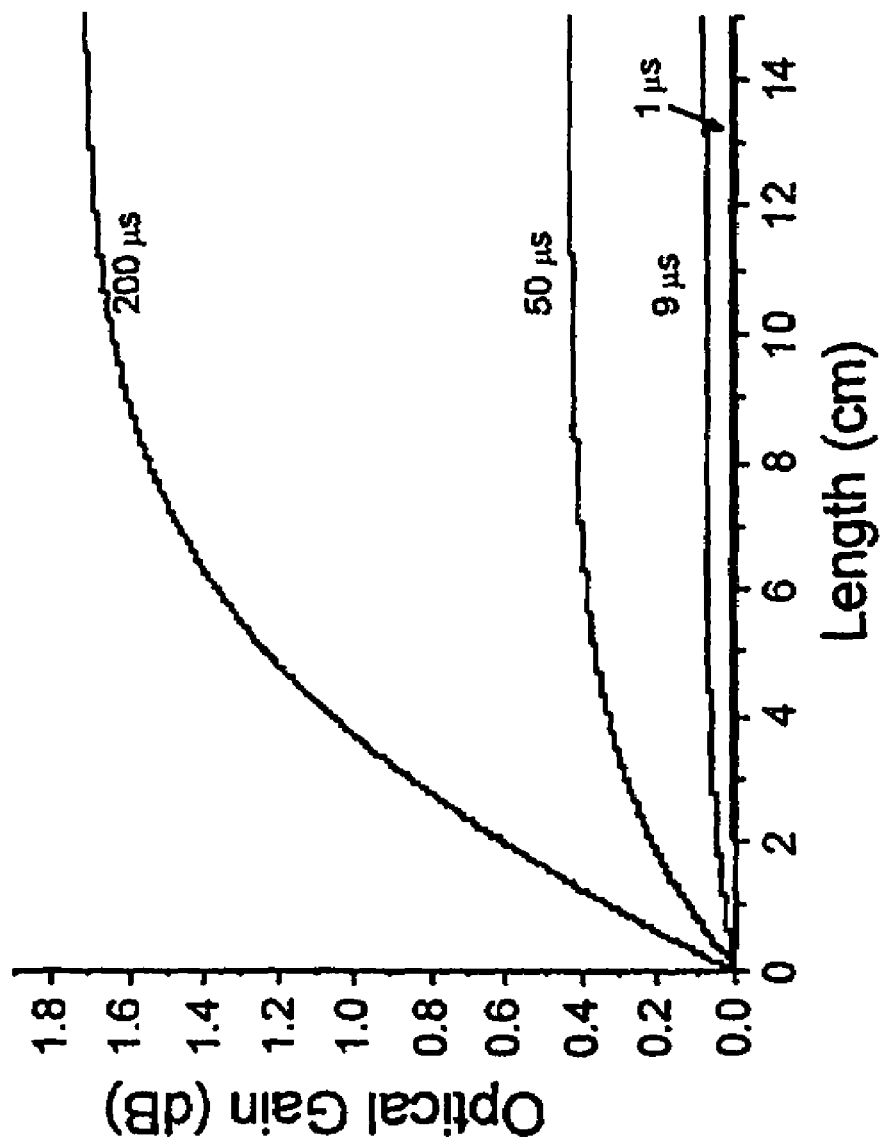
FIG. 41: Optical gain calculated for different luminescence lifetimes. The pump power is 100 mW and the channel dimensions are 10 by 10 mm.

In order to show that the measured gain is a result of the increase in luminescence lifetime of the $Nd^{3+}$ ion in the nanoparticles, compared to organic complexes, the optical gain as a function of the luminescence lifetime is shown in FIG. 41, for a 10 by 10 μm waveguide channel and a pump power of 100 mW.

The amplification is limited to only 0.009 dB for a luminescence lifetime of 1 μs, which is generally observed for complexes with CH bonds close to the lanthanide ion. The highest luminescence lifetime of $Nd^{3+}$ observed in organic systems so far was 9 μs and for this luminescence lifetime the optical gain is limited to 0.08 dB. For a luminescence lifetime of 200 μs as observed in the $LaF_3$:Nd nanoparticles the optical is 1.7 dB for this device. In these calculations it is assumed that the absorption and emission cross-sections of $Nd^{3+}$ is the same in the different materials. Small differences in these values may be observed due to changes in symmetry, but these differences will not compensate for the large difference in optical amplification that is observed. It is very clear that with the luminescence lifetimes observed in organic complexes it will be difficult to measure the small gain. The increase in luminescence lifetime we obtained, by doping the $Nd^{3+}$ ion in the $LaF_3$ nanoparticles is responsible for the fact that we were able to measure optical gain. The doping of $Nd^{3+}$ ions into the $LaF_3$ nanoparticles leads to optical properties that allow amplification close to what is observed in $Nd^{3+}$-doped glass fiber amplifiers.

Amplification measurements using other ions should also be possible. The $Er^{3+}$ ion, which is commonly used in optical fiber amplifiers, also shows emission in the $LaF_3$ nanoparticles, but for amplification at 1530 nm other polymers have to be used to reduce the optical loss at the signal wavelength. The organic ligand that is protecting the nanoparticles from aggregation also contains a lot of CH bonds, but the total amount of ligand is low in the whole system and a proof of principle should be possible for amplification by $Er^{3+}$ ions as well with this ligand and a halogenated polymer.

CONCLUSIONS

Polymer waveguides were successfully doped with $LaF_3$:Nd nanoparticles. The emission spectra of $Nd^{3+}$ show that the nanoparticles are in the waveguides and the optical losses of the waveguide indicate that the nanoparticles are not clustered and therefore have a small contribution to scattering in the waveguide. Optical gain was demonstrated. For the PMMA waveguides an amplification of 0.3 dB at 1319 nm at a pump power of 12 mW was measured and for the SU-8 waveguides an amplification of 0.1 dB at a pump power of only 5 mW was measured. Theoretical calculations show that increasing the confinement of the pump and signal beam and an increase in pump power should lead to an amplification of 8 dB for a 4 by 4 μm channel, which is very close to the amplification that is obtained in glass fiber amplifiers doped with $Nd^{3+}$. It is shown theoretically that this amplification is due to the increase in luminescence lifetime compared to organic complexes and that amplification with the luminescence lifetimes of organic complexes is very limited. The use of these organically soluble nanoparticles is therefore a major advantage over the use of lanthanide complexes as the gain material in polymer hosts.

The invention claimed is:

1. A photonic material, comprising:
   a core comprising at least one nanoparticle, said nanoparticle comprising an inorganic material and at least one luminescent ion, said inorganic material suitably selected to bind said luminescent ion; and
   an envelope comprising a suitably selected organic stabilizing layer overlying said core, wherein said organic stabilizing layer comprises a functional group-presenting material having at least one functional group that binds at least one luminescent ion.

2. The photonic material of claim 1, wherein said organic stabilizing layer is suitably selected for reducing quenching.

3. The photonic material of claim 1, wherein said luminescent ion is a lanthanide ion.

4. The photonic material of claim 1, wherein said functional group-presenting material comprises at least one ligand.

5. The photonic material of claim 4, wherein said ligand is selected to be suitable for ligand exchange reactions.

6. The photonic material of claim 1, wherein said functional group-presenting material is a polymer.

7. The photonic material of claim 1 wherein said organic stabilizing layer is self-assembled.

8. The photonic material of claim 1 wherein said organic stabilizing layer further comprises hole conductors, electron conductors, or a suitably selected combination of hole conductors and electron conductors.

9. The photonic material of claim 8, wherein said hole conductors comprise heterocyclic compounds.

10. The hole conductors of claim 9, wherein said heterocyclic compounds are aromatic amines.

11. The electron conductors of claim 8, wherein said electron conductors are aromatic or heterocyclic compounds with suitably selected reduction potentials.

12. The photonic material of claim 11, wherein said aromatic or heterocyclic compounds are oxadiazoles, 1,2,4-triazoles, 1,3,5-triazines, quinoxalines, oligo- and polythiophenes, and oligo- and polypyrroles.

13. The photonic material of claim 1, wherein said envelope is suitably selected for preparing a sol-gel derived material.

14. The photonic material of claim 1, wherein said envelope is suitably selected for solubility in an aqueous environment.

15. The photonic material of claim 1, wherein said envelope is suitably selected to permit modification of said functional groups.

16. The photonic material of claim 1, wherein said at least one luminescent ion is a lanthanide ion.

17. The photonic material of claim 16, wherein said lanthanide ion is selected from Ce, Pr, Nd, Sm, Eu, Gd, Tb, Dy, Ho, Er, Tm or Yb.

18. The photonic material of claim 17, wherein said lanthanide ion is selected from Ce, Pr, Nd, Sm, Eu, Gd, Tb, Dy, Ho, Er, Tm, Yb or combinations thereof such that said photonic material emits in the UV-Vis wavelength range.

19. The photonic material of claim 17, wherein said lanthanide ions are selected from Ce, Pr, Nd, Sm, Eu, Gd, Tb, Dy, Ho, Er, Tm, Yb or combinations thereof, such that said photonic material emits in the near-infrared wavelength range.

20. The photonic material of claim 1, wherein said inorganic material is a semiconductor or an insulator, suitably selected to promote sensitized emissions.

21. The photonic material of claim 20, wherein said inorganic material is a semiconductor.

22. The photonic material of claim 21, wherein said semiconductor is selected from $Al_2S_3$, $Ga_2O_3$, $In_2O_3$, InP, GaAs, InAs, $TiO_2$, $Ga_2X_3$, $In_2X_3$, or $Ln_2X_3$, where Ln=lanthanide and X=S, Se, or Te.

23. The photonic material of claim 22 wherein said semiconductor is $Al_2S_3$ and said luminescent ion is Eu.

24. The photonic material of claim 20, wherein said inorganic material is an insulator.

25. The photonic material of claim 24, wherein said insulator is selected from $LaPO_4$, $GdPO_4$, $YbPO_4$, $LuPO_4$, $LaF_3$, $LaVO_4$, $YVO_4$, $LnPO_4$ (Ln=lanthanide or Y), $LnVO_4$ (Ln=lanthanide or Y), $LnX_3$ (Ln=lanthanide and X=Cl, Br, or I).

26. The photonic material of claim 25 wherein said insulator is $LaF_3$.

27. The photonic material of claim 1, further comprising a suitably selected inorganic shell for shielding said core from quenchers, said inorganic shell located between said core and said envelope.

28. The photonic material of claim 27 wherein said shell comprises a suitably selected semi-conductor.

29. The photonic material of claim 28 wherein said shell comprises a semi-conductor selected from $Al_2S_3$, $Ga_2O_3$, $In_2O_3$, InP, GaAs, InAs, $TiO_2$, $Ga_2X_3$, $In_2X_3$, or $Ln_2X_3$, where Ln=lanthanide and X=S, Se, or Te.

30. The photonic material of claim 27 wherein said shell comprises an insulator.

31. The photonic material of claim 30 wherein said insulator comprises $LnX_3$, wherein X is a halide.

32. The photonic material of claim 30 wherein said insulator is $LaPO_4$.

33. The photonic material of claim 31 wherein said insulator is $LaF_3$.

34. The photonic material of claim 30, wherein said insulator is selected from $GdPO_4$, $LuPO_4$, or $YPO_4$.

35. The photonic material of claim 27, wherein said shell further comprises at least one luminescent ion.

36. The photonic material of claim 35, wherein said at least one luminescent ion is a lanthanide ion.

37. The photonic material of claim 36, wherein said lanthanide ion is selected from Ce, Pr, Nd, Sm, Eu, Gd, Th, Dy, Ho, Er, Tm or Yb.

38. The photonic material of claim 37, wherein said lanthanide ion is selected from Ce, Pr, Nd, Sm, Eu, Gd, Th, Dy, Ho, Er, Tm, Yb or combinations thereof such that said photonic material emits in the UV-Vis wavelength range.

39. The photonic material of claim 38, wherein said lanthanide ions are selected from Ce, Pr, Nd, Sm, Eu, Gd, Th, Dy, Ho, Er, Tm, Yb or combinations thereof, such that said photonic material emits in the near-infrared wavelength range.

40. A method of preparing a photonic material, comprising:
   selecting a suitable inorganic material and a suitably luminescent ion;
   preparing at least one nanoparticle therefrom to provide a core; and enveloping said core with a suitably selected organic material to provide an envelope, wherein said organic material comprises a functional group-presenting material and at least one functional group that binds the suitably luminescent ion.

41. The method of claim 40, further comprising selecting said organic material to reduce quenching.

42. The method of claim 40, wherein said functional groups are exchanged.

43. The method of claim 40, further comprising selecting a suitable inorganic material to provide a shell, covering said core with said shell and enveloping said shell with said envelope.

44. A photonic material, comprising:
a core comprising at least one nanoparticle, the nanoparticle comprising (a) an inorganic material selected from $LaPO_4$, $GdPO_4$, $YbPO_4$, $LuPO_4$, $LaF_3$, $LaVO_4$, $YVO_4$, $YPO_4$, $LnPO_4$, $YVO_4$, $LnVO_4$, $LnCl_3$, $LnBr_3$, $LnI_3$, $Al_2S_3$, $Ga_2O_3$, $In_2O_3$, InP, GaAs, InAs, $TiO_2$, $Ga_2X_3$, $In_2X_3$, or $Ln_2X_3$, where Ln=lanthanide and X=S, Se, or Te; and (b) at least one lanthanide ion selected from Ce, Pr, Nd, Sm, Eu, Gd, Th, Dy, Ho, Er, Tm, Yb, or combinations thereof, wherein the inorganic material binds the at least one lanthanide ion; and an envelope comprising a suitably selected organic stabilizing layer overlying the core, wherein the organic stabilizing layer has at least one functional group that binds the at least one lanthanide ion, the organic stabilizing layer further comprising aromatic amine hole conductors, electron conductors, or a suitably selected combination of aromatic amine hole conductors and electron conductors, wherein the electron conductors are oxadiazoles, 1,2,4-triazoles, 1,3,5-triazines, quinoxalines, oligothiophenes, polythiophenes, oligopyrroles, or polypyrroles.

* * * * *